United States Patent
Tsukada et al.

(10) Patent No.: US 10,081,703 B2
(45) Date of Patent: Sep. 25, 2018

(54) POLYMERIZABLE COMPOSITION FOR OPTICAL MATERIAL AND OPTICAL MATERIAL

(71) Applicant: MITSUI CHEMICALS, INC., Minato-ku, Tokyo (JP)

(72) Inventors: Hidetaka Tsukada, Omuta (JP); Shinsuke Ito, Omuta (JP); Naoyuki Kakinuma, Omuta (JP); Kenichi Goto, Chiba (JP); Toshihiko Nakagawa, Ichihara (JP); Satoshi Yamasaki, Chiba (JP)

(73) Assignee: MITSUI CHEMICALS, INC., Minato-Ku, Tokyo (JP)

( * ) Notice: Subject to any disclaimer, the term of this patent is extended or adjusted under 35 U.S.C. 154(b) by 0 days.

(21) Appl. No.: 15/114,232

(22) PCT Filed: Feb. 5, 2015

(86) PCT No.: PCT/JP2015/053305
§ 371 (c)(1),
(2) Date: Jul. 26, 2016

(87) PCT Pub. No.: WO2015/119220
PCT Pub. Date: Aug. 13, 2015

(65) Prior Publication Data
US 2017/0009002 A1   Jan. 12, 2017

(30) Foreign Application Priority Data

Feb. 6, 2014  (JP) .................................. 2014-021774
Feb. 6, 2014  (JP) .................................. 2014-021775

(51) Int. Cl.
*C08G 18/72* (2006.01)
*C08G 18/73* (2006.01)
(Continued)

(52) U.S. Cl.
CPC ........ *C08G 18/722* (2013.01); *B29C 45/0001* (2013.01); *B29C 45/0053* (2013.01);
(Continued)

(58) Field of Classification Search
CPC ......... G02B 1/041; C08L 75/04; C08L 81/00; C08J 2375/04; C08J 5/00; C08G 18/244;
(Continued)

(56) References Cited

U.S. PATENT DOCUMENTS 3,897,397 A * 7/1975 Russell ................ C08G 18/701
524/904
5,087,758 A   2/1992 Kanemura et al.
(Continued)

FOREIGN PATENT DOCUMENTS

CN   103347852 A   10/2013
JP   02-270859 A   11/1990
(Continued)

OTHER PUBLICATIONS

International Search Report (PCT/ISA/210) dated Mar. 10, 2015, by the Japanese Patent Office as the International Searching Authority for International Application No. PCT/JP2015/053305.
(Continued)

*Primary Examiner* — Thao T Tran
(74) *Attorney, Agent, or Firm* — Buchanan, Ingersoll & Rooney PC

(57) ABSTRACT

Disclosed is a polymerizable composition for an optical material containing polyisocyanate (a) including aliphatic polyisocyanate (a1) and a modified aliphatic polyisocyanate (a2); and polythiol (b) having a di- or higher functional thiol group, in which the modified aliphatic polyisocyanate (a2) is contained in the polyisocyanate (a) in the amount of less than or equal to 60 weight %.

13 Claims, 2 Drawing Sheets

Specification includes a Sequence Listing.

(51) Int. Cl.
  *C08G 18/38* (2006.01)
  *G02B 1/04* (2006.01)
  *B29C 45/00* (2006.01)
  *B29D 11/00* (2006.01)
  *C08G 18/75* (2006.01)
  *C08J 5/00* (2006.01)
  *C08G 18/24* (2006.01)
  *B29L 11/00* (2006.01)

(52) U.S. Cl.
  CPC ...... *B29D 11/00009* (2013.01); *C08G 18/244* (2013.01); *C08G 18/3876* (2013.01); *C08G 18/73* (2013.01); *C08G 18/755* (2013.01); *C08G 18/758* (2013.01); *C08J 5/00* (2013.01); *G02B 1/041* (2013.01); *B29L 2011/0016* (2013.01); *C08J 2375/04* (2013.01)

(58) Field of Classification Search
  CPC .. C08G 18/3876; C08G 18/722; C08G 18/73; C08G 18/755; C08G 18/758; B29C 45/0001; B29C 45/0053; B29D 11/00009; B29L 2011/0016
  USPC ............ 351/41, 159.01; 359/642; 428/423.1; 528/85
  See application file for complete search history.

(56) References Cited

U.S. PATENT DOCUMENTS

| | | | |
|---|---|---|---|
| 5,191,055 A | 3/1993 | Kanemura et al. | |
| 5,608,115 A | 3/1997 | Okazaki et al. | |
| 5,837,797 A | 11/1998 | Okazaki et al. | |
| 6,100,362 A | 8/2000 | Okazaki et al. | |
| 9,000,119 B2 | 4/2015 | Ryu et al. | |
| 9,234,069 B2 | 1/2016 | Nakagawa et al. | |
| 9,371,413 B2 | 6/2016 | Nakagawa et al. | |
| 9,376,404 B2 | 6/2016 | Nakagawa et al. | |
| 9,720,137 B2* | 8/2017 | Yamasaki | G02B 1/041 |
| 2008/0036964 A1* | 2/2008 | Miura | B29D 11/0073 351/159.27 |
| 2010/0216905 A1* | 8/2010 | Kuwamura | B29C 41/18 521/170 |
| 2010/0292430 A1 | 11/2010 | Ryu et al. | |
| 2011/0034660 A1 | 2/2011 | Ryu et al. | |
| 2011/0269914 A1 | 11/2011 | Ryu et al. | |
| 2013/0079486 A1* | 3/2013 | Hidesaki | C07C 263/10 528/65 |
| 2013/0158146 A1* | 6/2013 | Greszta-Franz | C08G 18/3876 521/170 |

FOREIGN PATENT DOCUMENTS

| | | | |
|---|---|---|---|
| JP | 07-252207 A | | 10/1995 |
| JP | 2003-098301 A | | 4/2003 |
| JP | 2010-190919 A | | 9/2010 |
| JP | 2011-012141 A | | 1/2011 |
| JP | 2011-225863 A | | 11/2011 |
| JP | 2011226047 A | * | 11/2011 |
| WO | WO 2009/098887 A1 | | 8/2009 |
| WO | WO 2011/016229 A1 | | 2/2011 |

OTHER PUBLICATIONS

Written Opinion (PCT/ISA/237) dated Mar. 10, 2015, by the Japanese Patent Office as the International Searching Authority for International Application No. PCT/JP2015/053305.

Office Action issued by the Chinese Patent Office in corresponding Chinese Patent Application No. 201580007093.3 dated Mar. 16, 2018 (8 pages).

* cited by examiner

```
                         SEQUENCE LISTING

<160> NUMBER OF SEQ ID NOS: 4

<210> SEQ ID NO 1
<211> LENGTH: 47
<212> TYPE: DNA
<213> ORGANISM: Artificial
<220> FEATURE:
<223> OTHER INFORMATION: Primer

<400> SEQUENCE: 1
aaggtaccac aaaaaggata aaacaatgaa cgttattgca atattga                    47

<210> SEQ ID NO 2
<211> LENGTH: 30
<212> TYPE: DNA
<213> ORGANISM: Artificial
<220> FEATURE:
<223> OTHER INFORMATION: Primer

<400> SEQUENCE: 2
agtctagatt atttttgct ttcttctttc                                       30

<210> SEQ ID NO 3
<211> LENGTH: 2177
<212> TYPE: DNA
<213> ORGANISM: Escherichia coli
<220> FEATURE:
<221> NAME/KEY: CDS
<222> LOCATION: (24)..(2171)

<400> SEQUENCE: 3
ggtaccacaa aaaggataaa aca atg aac gtt att gca ata ttg aat cac atg        53
                          Met Asn Val Ile Ala Ile Leu Asn His Met
                            1               5                  10
```

-continued

| | | |
|---|---|---|
| ggg gtt tat ttt aaa gaa gaa ccc atc cgt gaa ctt cat cgc gcg ctt<br>Gly Val Tyr Phe Lys Glu Glu Pro Ile Arg Glu Leu His Arg Ala Leu<br>15 20 25 | | 101 |
| gaa cgt ctg aac ttc cag att gtt tac ccg aac gac cgt gac gac tta<br>Glu Arg Leu Asn Phe Gln Ile Val Tyr Pro Asn Asp Arg Asp Asp Leu<br>30 35 40 | | 149 |
| tta aaa ctg atc gaa aac aat gcg cgt ctg tgc ggc gtt att ttt gac<br>Leu Lys Leu Ile Glu Asn Asn Ala Arg Leu Cys Gly Val Ile Phe Asp<br>45 50 55 | | 197 |
| tgg gat aaa tat aat ctc gag ctg tgc gaa gaa att agc aaa atg aac<br>Trp Asp Lys Tyr Asn Leu Glu Leu Cys Glu Glu Ile Ser Lys Met Asn<br>60 65 70 | | 245 |
| gag aac ctg ccg ttg tac gcg ttc gct aat acg tat tcc act ctc gat<br>Glu Asn Leu Pro Leu Tyr Ala Phe Ala Asn Thr Tyr Ser Thr Leu Asp<br>75 80 85 90 | | 293 |
| gta agc ctg aat gac ctg cgt tta cag att agc ttc ttt gaa tat gcg<br>Val Ser Leu Asn Asp Leu Arg Leu Gln Ile Ser Phe Phe Glu Tyr Ala<br>95 100 105 | | 341 |
| ctg ggt gct gct gaa gat att gct aat aag atc aag cag acc act gac<br>Leu Gly Ala Ala Glu Asp Ile Ala Asn Lys Ile Lys Gln Thr Thr Asp<br>110 115 120 | | 389 |
| gaa tat atc aac act att ctg cct ccg ctg act aaa gca ctg ttt aaa<br>Glu Tyr Ile Asn Thr Ile Leu Pro Pro Leu Thr Lys Ala Leu Phe Lys<br>125 130 135 | | 437 |
| tat gtt cgt gaa ggt aaa tat act ttc tgt act cct ggt cac atg ggc<br>Tyr Val Arg Glu Gly Lys Tyr Thr Phe Cys Thr Pro Gly His Met Gly<br>140 145 150 | | 485 |
| ggt act gca ttc cag aaa agc ccg gta ggt agc ctg ttc tat gat ttc<br>Gly Thr Ala Phe Gln Lys Ser Pro Val Gly Ser Leu Phe Tyr Asp Phe<br>155 160 165 170 | | 533 |
| ttt ggt ccg aat acc atg aaa tct gat att tcc att tca gta tct gaa<br>Phe Gly Pro Asn Thr Met Lys Ser Asp Ile Ser Ile Ser Val Ser Glu<br>175 180 185 | | 581 |
| ctg ggt tct ctg ctg gat cac agt ggt cca cac aaa gaa gca gaa cag<br>Leu Gly Ser Leu Leu Asp His Ser Gly Pro His Lys Glu Ala Glu Gln<br>190 195 200 | | 629 |
| tat atc gct cgc gtc ttt aac gca gac cgc agc tac atg gtg acc aac<br>Tyr Ile Ala Arg Val Phe Asn Ala Asp Arg Ser Tyr Met Val Thr Asn<br>205 210 215 | | 677 |
| ggt act tcc act gcg aac aaa att gtt ggt atg tac tct gct cca gca<br>Gly Thr Ser Thr Ala Asn Lys Ile Val Gly Met Tyr Ser Ala Pro Ala<br>220 225 230 | | 725 |
| ggc agc acc att ctg att gac cgt aac tgc cac aaa tcg ctg acc cac<br>Gly Ser Thr Ile Leu Ile Asp Arg Asn Cys His Lys Ser Leu Thr His<br>235 240 245 250 | | 773 |
| ctg atg atg atg agc gat gtt acg cca atc tat ttc cgc ccg acc cgt<br>Leu Met Met Met Ser Asp Val Thr Pro Ile Tyr Phe Arg Pro Thr Arg<br>255 260 265 | | 821 |
| aac gct tac ggt att ctt ggt ggt atc cca cag agt gaa ttc cag cac<br>Asn Ala Tyr Gly Ile Leu Gly Gly Ile Pro Gln Ser Glu Phe Gln His<br>270 275 280 | | 869 |
| gct acc att gct aag cgc gtg aaa gaa aca cca aac gca acc tgg ccg<br>Ala Thr Ile Ala Lys Arg Val Lys Glu Thr Pro Asn Ala Thr Trp Pro<br>285 290 295 | | 917 |
| gta cat gct gta att acc aac tct acc tat gat ggt ctg ctg tac aac<br>Val His Ala Val Ile Thr Asn Ser Thr Tyr Asp Gly Leu Leu Tyr Asn<br>300 305 310 | | 965 |
| acc gac ttc atc aag aaa aca ctg gat gtg aaa tcc atc cac ttt gac<br>Thr Asp Phe Ile Lys Lys Thr Leu Asp Val Lys Ser Ile His Phe Asp<br>315 320 325 330 | | 1013 |

-continued

| | |
|---|---|
| tcc gcg tgg gtg cct tac acc aac ttc tca ccg att tac gaa ggt aaa<br>Ser Ala Trp Val Pro Tyr Thr Asn Phe Ser Pro Ile Tyr Glu Gly Lys<br>335                                340                      345 | 1061 |
| tgc ggt atg agc ggt ggc cgt gta gaa ggg aaa gtg att tac gaa acc<br>Cys Gly Met Ser Gly Gly Arg Val Glu Gly Lys Val Ile Tyr Glu Thr<br>            350                      355                      360 | 1109 |
| cag tcc act cac aaa ctg ctg gcg gcg ttc tct cag gct tcc atg atc<br>Gln Ser Thr His Lys Leu Leu Ala Ala Phe Ser Gln Ala Ser Met Ile<br>        365                      370                      375 | 1157 |
| cac gtt aaa ggt gac gta aac gaa gaa acc ttt aac gaa gcc tac atg<br>His Val Lys Gly Asp Val Asn Glu Glu Thr Phe Asn Glu Ala Tyr Met<br>380                                385                      390 | 1205 |
| atg cac acc acc act tct ccg cac tac ggt atc gtg gcg tcc act gaa<br>Met His Thr Thr Thr Ser Pro His Tyr Gly Ile Val Ala Ser Thr Glu<br>395                                400                      405                      410 | 1253 |
| acc gct gcg gcg atg atg aaa ggc aat gca ggt aag cgt ctg atc aac<br>Thr Ala Ala Ala Met Met Lys Gly Asn Ala Gly Lys Arg Leu Ile Asn<br>                      415                      420                      425 | 1301 |
| ggt tct att gaa cgt gcg atc aaa ttc cgt aaa gag atc aaa cgt ctg<br>Gly Ser Ile Glu Arg Ala Ile Lys Phe Arg Lys Glu Ile Lys Arg Leu<br>        430                      435                      440 | 1349 |
| aga acg gaa tct gat ggc tgg ttc ttt gat gta tgg cag ccg gat cat<br>Arg Thr Glu Ser Asp Gly Trp Phe Phe Asp Val Trp Gln Pro Asp His<br>                445                      450                      455 | 1397 |
| atc gat acg act gaa tgc tgg ccg ctg cgt tct gac agc acc tgg cac<br>Ile Asp Thr Thr Glu Cys Trp Pro Leu Arg Ser Asp Ser Thr Trp His<br>460                                465                      470 | 1445 |
| ggc ttc aaa aac atc gat aac gag cac atg tat ctt gac ccg atc aaa<br>Gly Phe Lys Asn Ile Asp Asn Glu His Met Tyr Leu Asp Pro Ile Lys<br>475                                480                      485                      490 | 1493 |
| gtc acc ctg ctg act ccg ggg atg gaa aaa gac ggc acc atg agc gac<br>Val Thr Leu Leu Thr Pro Gly Met Glu Lys Asp Gly Thr Met Ser Asp<br>                      495                      500                      505 | 1541 |
| ttt ggt att ccg gcc agc atc gtg gcg aaa tac ctc gac gaa cat ggc<br>Phe Gly Ile Pro Ala Ser Ile Val Ala Lys Tyr Leu Asp Glu His Gly<br>                      510                      515                      520 | 1589 |
| atc gtt gtt gag aaa acc ggt ccg tat aac ctg ctg ttc ctg ttc agc<br>Ile Val Val Glu Lys Thr Gly Pro Tyr Asn Leu Leu Phe Leu Phe Ser<br>        525                      530                      535 | 1637 |
| atc ggt atc gat aag acc aaa gca ctg agc ctg ctg cgt gct ctg act<br>Ile Gly Ile Asp Lys Thr Lys Ala Leu Ser Leu Leu Arg Ala Leu Thr<br>540                                545                      550 | 1685 |
| gac ttt aaa cgt gcg ttc gac ctg aac ctg cgt gtg aaa aac atg ctg<br>Asp Phe Lys Arg Ala Phe Asp Leu Asn Leu Arg Val Lys Asn Met Leu<br>555                                560                      565                      570 | 1733 |
| ccg tct ctg tat cgt gaa gat cct gaa ttc tat gaa aac atg cgt att<br>Pro Ser Leu Tyr Arg Glu Asp Pro Glu Phe Tyr Glu Asn Met Arg Ile<br>                      575                      580                      585 | 1781 |
| cag gaa ctg gct cag aat atc cac aaa ctg att gtt cac cac aat ctg<br>Gln Glu Leu Ala Gln Asn Ile His Lys Leu Ile Val His His Asn Leu<br>                590                      595                      600 | 1829 |
| ccg gat ctg atg tat cgc gca ttt gaa gtg ctg ccg acg atg gta atg<br>Pro Asp Leu Met Tyr Arg Ala Phe Glu Val Leu Pro Thr Met Val Met<br>605                                610                      615 | 1877 |
| act ccg tat gct gca ttc cag aaa gag ctg cac ggt atg acc gaa gaa<br>Thr Pro Tyr Ala Ala Phe Gln Lys Glu Leu His Gly Met Thr Glu Glu<br>        620                      625                      630 | 1925 |
| gtt tac ctc gac gaa atg gta ggt cgt att aac gcc aat atg atc ctt<br>Val Tyr Leu Asp Glu Met Val Gly Arg Ile Asn Ala Asn Met Ile Leu | 1973 |

```
                       635            640              645              650
ccg tac ccg ccg gga gtt cct ctg gta atg ccg ggt gaa atg atc acc         2021
Pro Tyr Pro Pro Gly Val Pro Leu Val Met Pro Gly Glu Met Ile Thr
                655              660              665 gaa gaa agc cgt ccg gtt ctg gag ttc ctg cag atg ctg tgt gaa atc         2069
Glu Glu Ser Arg Pro Val Leu Glu Phe Leu Gln Met Leu Cys Glu Ile
            670              675              680 ggc gct cac tat ccg ggc ttt gaa acc gat att cac ggt gca tac cgt         2117
Gly Ala His Tyr Pro Gly Phe Glu Thr Asp Ile His Gly Ala Tyr Arg
        685              690              695 cag gct gat ggc cgc tat acc gtt aag gta ttg aaa gaa gaa agc aaa         2165
Gln Ala Asp Gly Arg Tyr Thr Val Lys Val Leu Lys Glu Glu Ser Lys
    700              705              710 aaa taa tctaga                                                          2177
Lys
715

<210> SEQ ID NO 4
<211> LENGTH: 715
<212> TYPE: PRT
<213> ORGANISM: Escherichia coli

<400> SEQUENCE: 4

Met Asn Val Ile Ala Ile Leu Asn His Met Gly Val Tyr Phe Lys Glu
1               5                   10                  15

Glu Pro Ile Arg Glu Leu His Arg Ala Leu Glu Arg Leu Asn Phe Gln
            20                  25                  30

Ile Val Tyr Pro Asn Asp Arg Asp Leu Leu Lys Leu Ile Glu Asn
        35                  40                  45

Asn Ala Arg Leu Cys Gly Val Ile Phe Asp Trp Asp Lys Tyr Asn Leu
    50                  55                  60

Glu Leu Cys Glu Glu Ile Ser Lys Met Asn Glu Asn Leu Pro Leu Tyr
65                  70                  75                  80

Ala Phe Ala Asn Thr Tyr Ser Thr Leu Asp Val Ser Leu Asn Asp Leu
                85                  90                  95

Arg Leu Gln Ile Ser Phe Phe Glu Tyr Ala Leu Gly Ala Ala Glu Asp
            100                 105                 110

Ile Ala Asn Lys Ile Lys Gln Thr Thr Asp Glu Tyr Ile Asn Thr Ile
        115                 120                 125

Leu Pro Pro Leu Thr Lys Ala Leu Phe Lys Tyr Val Arg Glu Gly Lys
    130                 135                 140

Tyr Thr Phe Cys Thr Pro Gly His Met Gly Thr Ala Phe Gln Lys
145                 150                 155                 160

Ser Pro Val Gly Ser Leu Phe Tyr Asp Phe Phe Gly Pro Asn Thr Met
                165                 170                 175

Lys Ser Asp Ile Ser Ile Ser Val Ser Glu Leu Gly Ser Leu Leu Asp
            180                 185                 190

His Ser Gly Pro His Lys Glu Ala Glu Gln Tyr Ile Ala Arg Val Phe
        195                 200                 205

Asn Ala Asp Arg Ser Tyr Met Val Thr Asn Gly Thr Ser Thr Ala Asn
    210                 215                 220

Lys Ile Val Gly Met Tyr Ser Ala Pro Ala Gly Ser Thr Ile Leu Ile
225                 230                 235                 240

Asp Arg Asn Cys His Lys Ser Leu Thr His Leu Met Met Met Ser Asp
                245                 250                 255

Val Thr Pro Ile Tyr Phe Arg Pro Thr Arg Asn Ala Tyr Gly Ile Leu
```

```
             260                 265                 270
Gly Gly Ile Pro Gln Ser Glu Phe Gln His Ala Thr Ile Ala Lys Arg
            275                 280                 285
Val Lys Glu Thr Pro Asn Ala Thr Trp Pro Val His Ala Val Ile Thr
            290                 295                 300
Asn Ser Thr Tyr Asp Gly Leu Leu Tyr Asn Thr Asp Phe Ile Lys Lys
305                 310                 315                 320
Thr Leu Asp Val Lys Ser Ile His Phe Asp Ser Ala Trp Val Pro Tyr
                325                 330                 335
Thr Asn Phe Ser Pro Ile Tyr Glu Gly Lys Cys Gly Met Ser Gly Gly
                340                 345                 350
Arg Val Glu Gly Lys Val Ile Tyr Glu Thr Gln Ser Thr His Lys Leu
            355                 360                 365
Leu Ala Ala Phe Ser Gln Ala Ser Met Ile His Val Lys Gly Asp Val
            370                 375                 380
Asn Glu Glu Thr Phe Asn Glu Ala Tyr Met Met His Thr Thr Thr Ser
385                 390                 395                 400
Pro His Tyr Gly Ile Val Ala Ser Thr Glu Thr Ala Ala Ala Met Met
                405                 410                 415
Lys Gly Asn Ala Gly Lys Arg Leu Ile Asn Gly Ser Ile Glu Arg Ala
                420                 425                 430
Ile Lys Phe Arg Lys Glu Ile Lys Arg Leu Arg Thr Glu Ser Asp Gly
            435                 440                 445
Trp Phe Phe Asp Val Trp Gln Pro Asp His Ile Asp Thr Thr Glu Cys
            450                 455                 460
Trp Pro Leu Arg Ser Asp Ser Thr Trp His Gly Phe Lys Asn Ile Asp
465                 470                 475                 480
Asn Glu His Met Tyr Leu Asp Pro Ile Lys Val Thr Leu Leu Thr Pro
                485                 490                 495
Gly Met Glu Lys Asp Gly Thr Met Ser Asp Phe Gly Ile Pro Ala Ser
                500                 505                 510
Ile Val Ala Lys Tyr Leu Asp Glu His Gly Ile Val Val Glu Lys Thr
            515                 520                 525
Gly Pro Tyr Asn Leu Leu Phe Leu Phe Ser Ile Gly Ile Asp Lys Thr
            530                 535                 540
Lys Ala Leu Ser Leu Leu Arg Ala Leu Thr Asp Phe Lys Arg Ala Phe
545                 550                 555                 560
Asp Leu Asn Leu Arg Val Lys Asn Met Leu Pro Ser Leu Tyr Arg Glu
                565                 570                 575
Asp Pro Glu Phe Tyr Glu Asn Met Arg Ile Gln Glu Leu Ala Gln Asn
                580                 585                 590
Ile His Lys Leu Ile Val His His Asn Leu Pro Asp Leu Met Tyr Arg
            595                 600                 605
Ala Phe Glu Val Leu Pro Thr Met Val Met Thr Pro Tyr Ala Ala Phe
            610                 615                 620
Gln Lys Glu Leu His Gly Met Thr Glu Glu Val Tyr Leu Asp Glu Met
625                 630                 635                 640
Val Gly Arg Ile Asn Ala Asn Met Ile Leu Pro Tyr Pro Pro Gly Val
                645                 650                 655
Pro Leu Val Met Pro Gly Glu Met Ile Thr Glu Glu Ser Arg Pro Val
                660                 665                 670
Leu Glu Phe Leu Gln Met Leu Cys Glu Ile Gly Ala His Tyr Pro Gly
            675                 680                 685
```

```
Phe Glu Thr Asp Ile His Gly Ala Tyr Arg Gln Ala Asp Gly Arg Tyr
    690                 695                 700
Thr Val Lys Val Leu Lys Glu Glu Ser Lys Lys
705                 710                 715
```

POLYMERIZABLE COMPOSITION FOR OPTICAL MATERIAL AND OPTICAL MATERIAL

TECHNICAL FIELD

The present invention relates to a polymerizable composition for an optical material containing polyisocyanate including aliphatic polyisocyanate and polythiol, and an optical material and a plastic lens obtained by using the polymerizable composition for an optical material.

BACKGROUND ART

Glass has been mainly used as a material used as an optical material from the related art, and recently, plastic for an optical material has been variously developed and has been widely used as an alternative to the glass. A plastic material such as an acrylic resin, an aliphatic carbonate resin, a polycarbonate resin, and a polythiourethane resin has been mainly used as a lens material such as spectacles from the viewpoint of excellent optical properties, light weight, cracking resistance, and excellent molding properties.

A polythiourethane resin disclosed in Patent Documents 1 and 2 has been proposed as a plastic lens material having an excellent balance in properties of heat resistance, strength, and the like, and a high refractive index. In Patent Documents 1 and 2, aliphatic polyisocyanate is exemplified.

In addition, the plastic material has been used for improving performance, but in a plastic material using fossil resources, the influences on the global environment such as scarcity of resources or carbon dioxide gas emissions have been a concern, and thus, application of biomass resources such as a plant-derived material to development of the material has been considered.

A spectacle lens which is obtained by injection molding using a polycarbonate resin having a constituent unit derived from isosorbide as a main component has been proposed as the plastic lens material obtained by using the plant-derived material (Patent Document 3).

In addition, an optical polyurethane resin composition which is formed of a polyisocyanate component including a modified aliphatic polyisocyanate, and a polyol component has been proposed (Patent Document 4). Furthermore, a compound obtained from the plant-derived material is not disclosed.

In addition, a composition which contains organic polyisocyanate containing an isocyanurate-modified hexamethylene diisocyanate, and a compound having two or more active hydrogen groups has been proposed (Patent Document 5). Furthermore, in Patent Document 5, the compound obtained from the plant-derived material is not disclosed. Furthermore, in examples, polyisocyanate formed only of the modified isocyanurate is used.

RELATED DOCUMENT

Patent Document

[Patent Document 1] Japanese Laid-open Patent Publication No. 2-270859
[Patent Document 2] Japanese Laid-open Patent Publication No. 7-252207
[Patent Document 3] Japanese Laid-open Patent Publication No. 2010-190919
[Patent Document 4] Japanese Laid-open Patent Publication No. 2011-12141
[Patent Document 5] Japanese Laid-open Patent Publication No. 2003-98301

SUMMARY OF THE INVENTION

That is, an object of the present invention is to provide a polythiourethane-based polymerizable composition from which an optical material having excellent properties of transparency, a refractive index, heat resistance, strength, and the like is obtained, and an optical material obtained from the polythiourethane-based polymerizable composition.

As a result of intensive studies of the present inventors, it has been found that an optical material having excellent properties including transparency, a refractive index, heat resistance, strength, and the like can be obtained by a composition containing polyisocyanate including a predetermined aliphatic polyisocyanate, and polythiol, and thus, the present invention has been completed.

That is, the present invention can be described as follows.

[1] A polymerizable composition for an optical material, containing: polyisocyanate (a) including aliphatic polyisocyanate (a1) and a modified aliphatic polyisocyanate (a2); and polythiol (b) having a di- or higher functional thiol group, in which the modified aliphatic polyisocyanate (a2) is contained in the polyisocyanate (a) in the amount of less than or equal to 60 weight %.

[2] The polymerizable composition for an optical material according to [1], in which the modified aliphatic polyisocyanate (a2) is a mononuclear isocyanurate of the aliphatic polyisocyanate.

[3] The polymerizable composition for an optical material according to [1] or [2], in which the aliphatic polyisocyanate (a1) and/or the aliphatic polyisocyanate in the modified aliphatic polyisocyanate (a2) is obtained from a plant-derived material.

[4] The polymerizable composition for an optical material according to any one of [1] to [3], in which the aliphatic polyisocyanate (a1) and/or the aliphatic polyisocyanate in the modified aliphatic polyisocyanate (a2) is at least one selected from 1,5-pentamethylene diisocyanate, 1,6-hexamethylene diisocyanate, 1,7-heptamethylene diisocyanate, lysine diisocyanate, lysine triisocyanate, dimer acid diisocyanate, octamethylene diisocyanate, and decamethylene diisocyanate.

[5] The polymerizable composition for an optical material according to any one of [1] to [4], in which the polythiol (b) is at least one selected from 4-mercaptomethyl-1,8-dimercapto-3,6-dithiaoctane, 4,8-, 4,7-, or 5,7-dimercaptomethyl-1,11-dimercapto-3,6,9-trithiaundecane, pentaerythritol tetrakis(2-mercaptoacetate), pentaerythritol tetrakis(3-mercaptopropionate), 2,5-bis(mercaptomethyl)-1,4-dithiane, bis(mercaptoethyl)sulfide, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithietane, 1,1,2,2-tetrakis(mercaptomethylthio)ethane, 3-mercaptomethyl-1,5-dimercapto-2,4-dithiapentane, tris(mercaptomethylthio)methane, and ethylene glycol bis(3-mercaptopropionate).

[6] The polymerizable composition for an optical material according to any one of [1] to [5], in which the polythiol (b) is polythiol obtained from a plant-derived material, and is at least one selected from 4-mercaptomethyl-1,8-dimercapto-3,6-dithiaoctane, and 4,8-, 4,7-, or 5,7-dimercaptomethyl-1,11-dimercapto-3,6,9-trithiaundecane.

[7] The polymerizable composition for an optical material according to any one of [1] to [6], further containing: a non-metal catalyst.

[8] A molding, containing: a resin obtained by polymerizing and curing the polymerizable composition for an optical material according to any one of [1] to [7].

[9] The molding according to [8], in which the resin has a degree of biomass of greater than or equal to 25%.

[10] The molding according to [8] or [9], in which the molding has a Tg of higher than or equal to 60° C.

[11] An optical material formed of the molding according to any one of [8] to [10].

[12] A plastic spectacle lens formed of the molding according to any one of [8] to [10].

[13] A plastic polarization lens, comprising: a polarizing film; and a layer formed of the molding according to any one of [8] to [10], wherein the layer is laminated on at least one surface of the polarizing film.

[14] A method for manufacturing a plastic spectacle lens, including: a step of injecting the polymerizable composition for an optical material according to any one of [1] to [7] which has viscosity at 20° C. of 20 mPa·s to 1000 mPa·s into a lens casting mold; and a step of polymerizing and curing the polymerizable composition for an optical material.

[15] The method for manufacturing of a plastic spectacle lens according to [14], in which in the step of injecting the polymerizable composition for an optical material, the viscosity of the polymerizable composition for an optical material at 20° C. is 20 mPa·s to 800 mPa·s.

[16] A method for manufacturing of a plastic polarization lens, including: a step of fixing a polarizing film into a lens casting mold in a state in which at least one surface of the polarizing film is separated from a mold; a step of injecting the polymerizable composition for an optical material according to any one of [1] to [7] which has viscosity at 20° C. of 20 mPa·s to 1000 mPa·s into a gap between the polarizing film and the mold; and a step of laminating a layer formed of a polythiourethane resin on at least one surface of the polarizing film by polymerizing and curing the polymerizable composition for an optical material.

[17] The method for manufacturing a plastic polarization lens according to [16], in which in the step of injecting the polymerizable composition for an optical material, the viscosity of the polymerizable composition for an optical material at 20° C. is 20 mPa·s to 800 mPa·s.

According to the polymerizable composition for an optical material of the present invention, it is possible to provide an optical material formed of a polythiourethane resin having excellent properties of transparency, a refractive index, heat resistance, strength, and the like, and it is possible to provide a plastic lens which contributes to the preservation of the global environment and is globally environmentally friendly by using a compound obtained from a plant-derived material.

DESCRIPTION OF EMBODIMENTS

Figure 1:
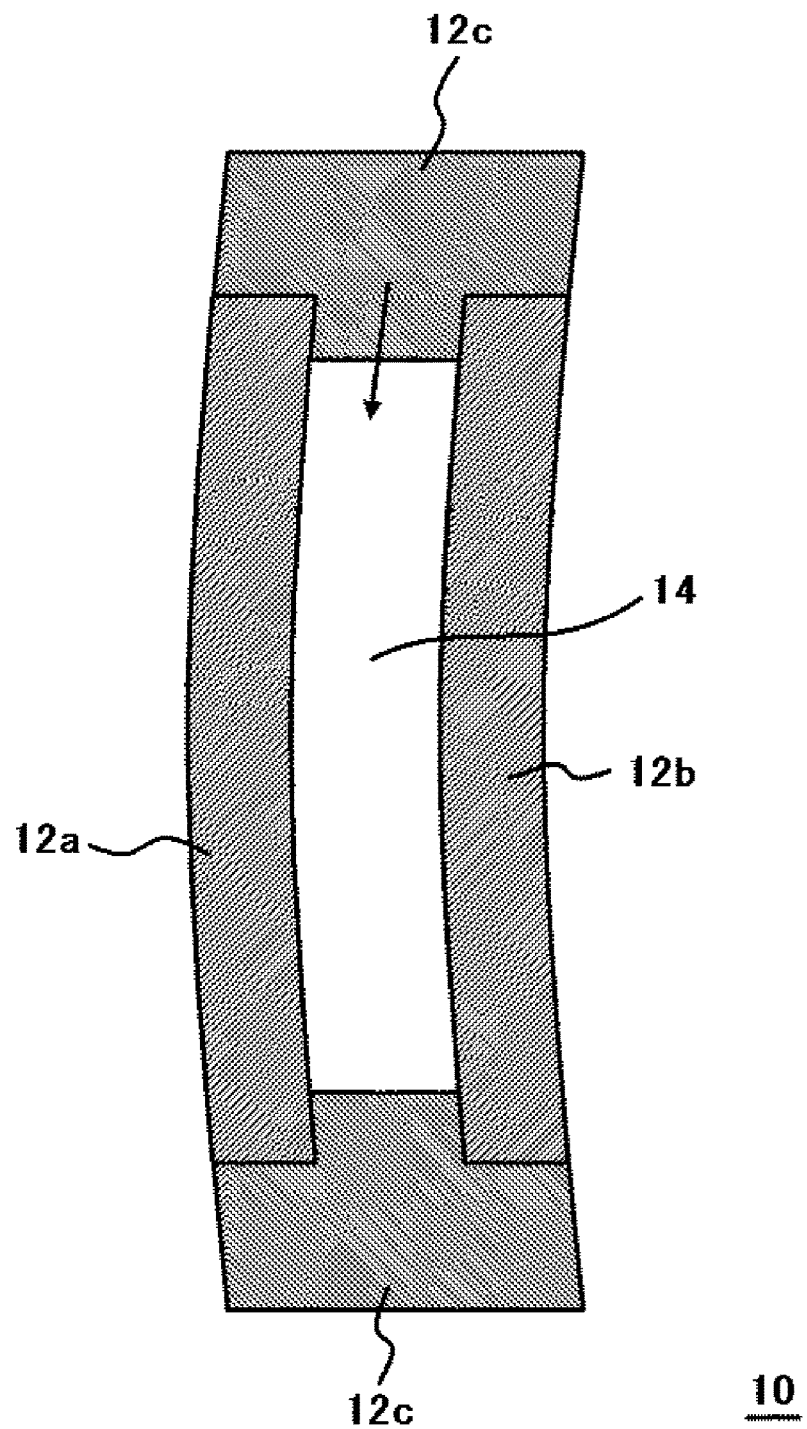
FIG. 1 is a sectional view schematically illustrating a casting mold for manufacturing a plastic spectacle lens which is used in an embodiment.

A polymerizable composition for an optical material of the present invention, and a manufacturing method of an optical material will be described by suitably using the drawings. Furthermore, in all of the drawings, the same reference numerals are applied to the same constituents, and the description thereof will not be repeated.

A polymerizable composition for an optical material of the embodiment contains polyisocyanate (a) including aliphatic polyisocyanate (a1) and a modified aliphatic polyisocyanate (a2); and polythiol (b) having a di- or higher functional thiol group.

(Polyisocyanate (a))

The polyisocyanate (a) includes the aliphatic polyisocyanate (a1) and the modified aliphatic polyisocyanate (a2).

Examples of the aliphatic polyisocyanate (a1) and the aliphatic polyisocyanate in the modified aliphatic polyisocyanate (a2) may include trimethylene diisocyanate, tetramethylene diisocyanate, 1,5-pentamethylene diisocyanate, 1,6-hexamethylene diisocyanate, 1,7-heptamethylene diisocyanate, 2,2,4-trimethyl hexamethylene diisocyanate, 2,4,4-trimethyl hexamethylene diisocyanate, lysine diisocyanate methylester, lysine diisocyanate, lysine triisocyanate, m-xylylene diisocyanate, α,α,α',α'-tetramethyl xylylene diisocyanate, bis(isocyanate methyl)naphthalene, mesitylene triisocyanate, bis(isocyanate methyl)sulfide, bis(isocyanate ethyl)sulfide, bis(isocyanate methyl)disulfide, bis(isocyanate ethyl)disulfide, bis(isocyanate methylthio)methane, bis (isocyanate ethylthio)methane, bis(isocyanate ethylthio)ethane, bis(isocyanate methylthio) ethane, dimer acid diisocyanate, octamethylene diisocyanate, decamethylene diisocyanate, and the like, and may preferably include acyclic aliphatic polyisocyanate such as 1,5-pentamethylene diisocyanate, 1,6-hexamethylene diisocyanate, 1,7-heptamethylene diisocyanate, lysine diisocyanate, lysine triisocyanate, dimer acid diisocyanate, octamethylene diisocyanate, and decamethylene diisocyanate, and the like, and may more preferably include chain aliphatic polyisocyanate such as 1,5-pentamethylene diisocyanate, 1,6-hexamethylene diisocyanate, 1,7-heptamethylene diisocyanate, lysine diisocyanate, lysine triisocyanate, octamethylene diisocyanate, and decamethylene diisocyanate, and the like. The aliphatic polyisocyanates may be used alone, or two or more may be used in combination.

Examples of the modified aliphatic polyisocyanate (a2) include a multimeric, a biuret modified, an allophanate modified, an oxadiazinetrione modified, a polyol modified aliphatic polyisocyanate, and the like.

Examples of the multimer of the aliphatic polyisocyanate include a dimer such as uretedione, uretonimine, and carbodiimide, as well as a trimer or higher multimer such as isocyanurate and iminooxadiane dione.

Isocyanurate of the aliphatic polyisocyanate is can be obtained from a reaction of the aliphatic polyisocyanate in the presence of a known isocyanurate catalyst.

The biuret modified aliphatic polyisocyanate can be obtained by treating the aliphatic polyisocyanate with for example, water, tertiary alcohol (for example, t-butyl alcohol, and the like), secondary amine (for example, dimethyl amine, diethyl amine, and the like), and the like, and allowing the reaction to proceed in the presence of a known biuret-formed catalyst.

The allophanate modified aliphatic polyisocyanate can be obtained by treating the aliphatic polyisocyanate with monoalcohol (monohydric alcohol, for example, alcohol having 1 to 10 carbon atoms), and then allowing the reaction to proceed in the presence of a known allophanate catalyst.

The oxadiazine trione aliphatic polyisocyanate can be obtained by treating the aliphatic polyisocyanate with carbon dioxide.

The iminooxadiane dione modified aliphatic polyisocyanate can be obtained from a reaction of the aliphatic polyisocyanate in the presence of a known iminooxadiane dione catalyst.

The polyol modified aliphatic polyisocyanate can be obtained by treating the aliphatic polyisocyanate with alcohol. Examples of the alcohol which is used for obtaining the modified aliphatic polyisocyanate may include tertiary alcohol, monoalcohol, and polyhydric alcohol, and may preferably include trihydric alcohol such as glycerin and trimethylol propane, and it is more preferable that the alcohol is a plant-derived compound.

The modified aliphatic polyisocyanate (a2) may be used alone, or two or more may be used in combination.

Among the modified aliphatic polyisocyanate (a2), the multimer of the aliphatic polyisocyanate is preferable, and a mononuclear isocyanurate (a trimer) of the aliphatic polyisocyanate is more preferable.

In the embodiment, the aliphatic polyisocyanate (a1) included in the polyisocyanate (a) may be identical to or different from the aliphatic polyisocyanate used for obtaining the modified aliphatic polyisocyanate (a2), and may include at least one selected therefrom. From the viewpoint of the effect of the present invention, it is preferable that the aliphatic polyisocyanate (a1) is identical to the aliphatic polyisocyanate used for obtaining the modified aliphatic polyisocyanate (a2).

A reaction mixture obtained at the time of preparing the modified aliphatic polyisocyanate (a2) can be used as the polyisocyanate (a). In this case, the reaction mixture contains the aliphatic polyisocyanate (a1) and the modified aliphatic polyisocyanate (a2). That is, in the embodiment, the polyisocyanate (a) can be denoted as a polyisocyanate composition (a). In addition, the polyisocyanate (a) can be obtained by mixing at least one aliphatic polyisocyanate (a1) which is identical to or different from the aliphatic polyisocyanate used for preparing the modified aliphatic polyisocyanate with the prepared modified aliphatic polyisocyanate.

The polyisocyanate (a) may contain the modified aliphatic polyisocyanate (a2) in the amount of less than or equal to 60 weight %, preferably 1 weight % to 60 weight %, more preferably 5 weight % to 55 weight %, even more preferably 10 weight % to 50 weight %, and particularly preferably 30 weight % to 50 weight %. By containing the modified product in the range described above, a molding formed of the polythiourethane resin having excellent properties including transparency, a refractive index, heat resistance, strength, and the like can be obtained. Further, in a case where the aliphatic polyisocyanate (a1) is obtained from the plant-derived material, the heat resistance is improved while maintaining the degree of biomass at a high level by containing the modified aliphatic polyisocyanate (a2) in the range described above, and thus, it is possible to provide a molding having excellent other properties of transparency, a refractive index, strength, and the like, and an excellent balance in the properties.

In a case where the amount of the modified aliphatic polyisocyanate (a2) in the polyisocyanate (a) is greater than 60 weight %, it is not preferable since there is a case where a function as an optical material is not obtained due to the occurrence of air bubbles, distortion, and the like in the prepared lens.

In the embodiment, it is preferable that the aliphatic polyisocyanate (a1) or the aliphatic polyisocyanate of the modified aliphatic polyisocyanate (a2) is the aliphatic polyisocyanate obtained from the plant-derived material, and it is more preferable that both of the aliphatic polyisocyanate (a1) and the aliphatic polyisocyanate of the modified aliphatic polyisocyanate (a2) are the aliphatic polyisocyanate obtained from the plant-derived material.

Examples of the plant-derived aliphatic polyisocyanate include 1,5-pentamethylene diisocyanate, 1,6-hexamethylene diisocyanate, 1,7-heptamethylene diisocyanate, lysine diisocyanate, lysine triisocyanate, dimer acid diisocyanate, octamethylene diisocyanate, decamethylene diisocyanate, and the like, and the plant-derived aliphatic polyisocyanates may be used alone or two or more may be used in combination. It is preferable that the plant-derived aliphatic polyisocyanate is the 1,5-pentamethylene diisocyanate.

The plant-derived aliphatic polyisocyanate is obtained, for example, by subjecting a plant-derived divalent carboxylic acid to acid amidation and reduction, and converting the plant-derived divalent carboxylic acid into a terminal amino group, then treating the terminal amino group with phosgene, and converting the amino group into an isocyanate group.

In addition, the plant-derived polyisocyanate can be obtained by using an amino acid which is the plant-derived material as a raw material, and by converting the amino group into an isocyanate group.

For example, a pentamethylene diisocyanate can be obtained by subjecting lysine to decarbonation treatment to decarbonate the carboxyl group of the lysine, and then converting an amino group into an isocyanate group. Examples of the pentamethylene diisocyanate may include 1,5-pentamethylene diisocyanate.

By using the aliphatic polyisocyanate obtained from the plant-derived material and the modified product thereof in a polymerizable composition, it is possible to provide a molding formed of a polythiourethane resin having a high degree of biomass of greater than or equal to 25% and excellent properties of transparency, a refractive index, heat resistance, strength, and the like.

For example, in pentamethylene diisocyanate obtained from phosgenation of pentamethylene diamine which is obtained by a biochemical method disclosed in Pamphlet of International Publication No. WO2012/121291, or a salt thereof, no or low amount of impurities having a tetrahydropyridine skeleton are included, and thus, a molding to be obtained which is formed of a polythiourethane resin has excellent properties of transparency, a hue, a refractive index, heat resistance, strength, and the like.

In addition to the polyisocyanate (a), the polymerizable composition for an optical material of the embodiment may contain at least one selected from alicyclic polyisocyanate, aromatic polyisocyanate, and heterocyclic polyisocyanate.

Examples of the alicyclic polyisocyanate may include 3-isocyanato methyl-3,5,5-trimethyl cyclohexyl isocyanate, isophorone diisocyanate, 4,4'-, 2,4'-, or 2,2'-dicyclohexyl methane diisocyanate or a mixture thereof, 1,4- or 1,3-bis (isocyanato methyl) cyclohexane or a mixture thereof, 1,4- or 1,3-bis(isocyanato ethyl) cyclohexane or a mixture thereof, bis(isocyanato methyl)-bicyclo[2.2.1] heptane, 1,3-cyclopentane diisocyanate, 1,4- or 1,3-cyclohexane diisocyanate or a mixture thereof, methyl-2,4-cyclohexane diisocyanate, methyl-2,6-cyclohexane diisocyanate, 3,8-bis (isocyanato methyl)tricyclodecane, 3,9-bis(isocyanato methyl)tricyclodecane, 4,8-bis(isocyanato methyl)tricyclodecane, 4,9-bis(isocyanato methyl)tricyclodecane, and the like.

Examples of the alicyclic polyisocyanate preferably include isophorone diisocyanate, 4,4'-, 2,4'-, or 2,2'-dicyclohexyl methane diisocyanate or a mixture thereof, 1,4- or 1,3-bis(isocyanato methyl)cyclohexane or a mixture thereof, 1,4- or 1,3-bis(isocyanato ethyl)cyclohexane or a mixture thereof, and bis(isocyanato methyl)-bicyclo[2.2.1] heptane.

Furthermore, the bis(isocyanato methyl)-bicyclo[2.2.1] heptane is a mixture of isomers of 2,5-bis(isocyanato methyl)-bicyclo[2.2.1] heptane and 2,6-bis(isocyanato methyl)-bicyclo[2.2.1] heptane. In the embodiment, the compound formed of the mixture of the isomer is used as one kind of compound. The alicyclic polyisocyanates may be used alone or two or more may be used in combination.

Examples of the aromatic polyisocyanate may include tolylene diisocyanate, 4,4'-diphenyl methane diisocyanate, 2,4'-diphenyl methane diisocyanate, phenylene diisocyanate, and the like. The aromatic polyisocyanates may be used alone, or two or more may be used in combination.

Examples of the aromatic polyisocyanate preferably include tolylene diisocyanate. By using the tolylene diisocyanate, the obtained resin molding may have an excellent operability and performance.

Examples of the tolylene diisocyanate include 2,4-tolylene diisocyanate, 2,6-tolylene diisocyanate, or a mixture of the 2,4-tolylene diisocyanate and the 2,6-tolylene diisocyanate, and in the embodiment, it is preferable that examples of the tolylene diisocyanate include the 2,4-tolylene diisocyanate. Specifically, the 2,4-tolylene diisocyanate may be used alone, or the mixture of the 2,4-tolylene diisocyanate and the 2,6-tolylene diisocyanate may be used, and in a case where the mixture is used, it is more preferable that a mixing ratio of the 2,4-tolylene diisocyanate and the 2,6-tolylene diisocyanate is 75:25 to 85:15.

Examples of the heterocyclic polyisocyanate may include 2,5-diisocyanato thiophene, 2,5-bis(isocyanato methyl)thiophene, 2,5-diisocyanato tetrahydrothiophene, 2,5-bis(isocyanato methyl)tetrahydrothiophene, 3,4-bis(isocyanato methyl)tetrahydrothiophene, 2,5-diisocyanato-1,4-dithiane, 2,5-bis(isocyanato methyl)-1,4-dithiane, 4,5-diisocyanato-1,3-dithiolane, 4,5-bis(isocyanato methyl)-1,3-dithiolane, and the like. The heterocyclic polyisocyanates may be used alone, or two or more may be used in combination.

It is preferable that the alicyclic polyisocyanate, the aromatic polyisocyanate, the heterocyclic polyisocyanate, or the aliphatic polyisocyanate which may be used in combination is the plant-derived material, and a compound which is not obtained from the plant-derived material can be used. As it is used, the compound is may be used such that the degree of biomass of the polythiourethane resin is in a predetermined range (greater than or equal to 25%).

(Polythiol (b) Having Di- or Higher Functional Thiol Group)

In the embodiment, examples of the polythiol (b) (hereinafter, simply referred to as polythiol (b)) having a di- or higher functional thiol group may include an aliphatic polythiol compound such as methane dithiol, 1,2-ethane dithiol, 1,2,3-propane trithiol, 1,2-cyclohexane dithiol, bis(2-mercaptoethyl)thioether, tetrakis(mercaptomethyl)methane, diethylene glycol bis(2-mercaptoacetate), diethylene glycol bis(3-mercaptopropionate), ethylene glycol bis(2-mercaptoacetate), ethylene glycol bis(3-mercaptopropionate), trimethylol propane tris(2-mercaptoacetate), trimethylol propane tris(3-mercaptopropionate), trimethylol ethane tris(2-mercaptoacetate), trimethylol ethane tris(3-mercaptopropionate), pentaerythritol tetrakis(2-mercaptoacetate), pentaerythritol tetrakis(3-mercaptopropionate), bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptomethylthio) methane, bis(2-mercaptoethylthio) methane, bis(3-mercaptopropylthio) methane, 1,2-bis(mercaptomethylthio)ethane, 1,2-bis(2-mercaptoethylthio)ethane, 1,2-bis(3-mercaptopropylthio) ethane, 1,2,3-tris(mercaptomethylthio)propane, 1,2,3-tris(2-mercaptoethylthio) propane, 1,2,3-tris(3-mercaptopropylthio) propane, 4-mercaptomethyl-1,8-dimercapto-3,6-dithiaoctane, 3-mercaptomethyl-1,5-dimercapto-2,4-dithiapentane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethyl thiomethyl)methane, tetrakis(2-mercaptoethyl thiomethyl)methane, tetrakis(3-mercaptopropyl thiomethyl)methane, bis(2,3-dimercaptopropyl)sulfide, 2,5-dimercaptomethyl-1,4-dithiane, 2,5-dimercapto-1,4-dithiane, 2,5-dimercaptomethyl-2,5-dimethyl-1,4-dithiane, and ester of a thioglycolic acid and a mercaptopropionic acid thereof, hydroxy methyl sulfide bis(2-mercaptoacetate), hydroxy methyl sulfide bis(3-mercaptopropionate), hydroxy ethyl sulfide bis(2-mercaptoacetate), hydroxy ethyl sulfide bis(3-mercaptopropionate), hydroxy methyl disulfide bis(2-mercaptoacetate), hydroxy methyl disulfide bis(3-mercaptopropionate), hydroxy ethyl disulfide bis(2-mercaptoacetate), hydroxy ethyl disulfide bis(3-mercaptopropionate), 2-mercaptoethyl ether bis(2-mercaptoacetate), 2-mercaptoethyl ether bis(3-mercaptopropionate), thiodiglycolic acid bis(2-mercaptoethyl ester), thiodipropionic acid bis(2-mercaptoethyl ester), dithiodiglycolic acid bis(2-mercaptoethyl ester), dithiodipropionic acid bis(2-mercaptoethyl ester), 1,1,3,3-tetrakis(mercaptomethylthio)propane, 1,1,2,2-tetrakis(mercaptomethylthio)ethane, tris(mercaptomethylthio)methane, and tris(mercaptoethylthio)methane;

an aromatic polythiol compound such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,3,5-trimercaptobenzene, 1,3,5-tris(mercaptomethyl)benzene, 1,3,5-tris(mercaptomethylene oxy)benzene, 1,3,5-tris(mercaptoethylene oxy)benzene, 2,5-toluene dithiol, 3,4-toluene dithiol, 1,5-naphthalene dithiol, and 2,6-naphthalene dithiol;

a heterocyclic polythiol compound such as 2-methyl amino-4,6-dithiol-sym-triazine, 3,4-thiophene dithiol, bismuthiol, 4,6-bis(mercaptomethylthio)-1,3-dithiane, and 2-(2,2-bis(mercaptomethylthio) ethyl)-1,3-dithietane; and the like, and at least one thereof may be used.

Further, an oligomer of the polythiol compound or a halogen substituent such as a chlorine substituent and a bromine substituent is also may be used.

It is preferable that at least one selected from 4-mercaptomethyl-1,8-dimercapto-3,6-dithiaoctane, 4,8-, 4,7-, or 5,7-dimercaptomethyl-1,11-dimercapto-3,6,9-trithiaundecane, pentaerythritol tetrakis(2-mercaptoacetate), pentaerythritol tetrakis(3-mercaptopropionate), 2,5-bis(mercaptomethyl)-1,4-dithiane, bis(mercaptoethyl)sulfide, 1,1,3,3-tetrakis(mercaptomethylthio)propane, 4,6-bis(mercaptomethylthio)-1,3-dithiane, 2-(2,2-bis(mercaptomethylthio) ethyl)-1,3-dithietane, 1,1,2,2-tetrakis(mercaptomethylthio)ethane, 3-mercaptomethyl-1,5-dimercapto-2,4-dithiapentane and tris(mercaptomethylthio)methane, and ethylene glycol bis(3-mercaptopropionate) is may be used as the polythiol (b).

Further, among them, the polythiol obtained from the plant-derived material is more preferably used.

Examples of the polythiol obtained from the plant-derived material include 4-mercaptomethyl-1,8-dimercapto-3,6-dithiaoctane, and 4,8-, 4,7-, or 5,7-dimercaptomethyl-1,11-dimercapto-3,6,9-trithiaundecane which are synthesized by using epichlorohydrin manufactured from the glycerin as a raw material obtained from the plant-derived material through chlorination and epoxidation, and at least one polythiol may be used. Furthermore, the glycerin can be obtained by using hydrolysis or ester exchange treatment from fatty acid ester of glycerin contained in vegetable oil and fat such as rapeseed oil, palm oil, castor oil, and olive oil, and by being extracted as the glycerin.

For example, in a case of the 4-mercaptomethyl-1,8-dimercapto-3,6-dithiaoctane, it can be manufactured through a) a step of adding two molecules of 2-mercaptoethanol into epichlorohydrin manufactured from naturally originated glycerin, preferably plant-derived glycerin, through chlorination and epoxidation, and b) a step of synthesizing 4-mercaptomethyl-1,8-dimercapto-3,6-dithiaoctane through a decomposition step of a base which is continuous to a reaction with respect to a sulfurizing agent such as thiourea.

By using the polythiol obtained from plant-derived material in the polymerizable composition, it is possible to provide a molding formed of a polythiourethane resin having a high degree of biomass of greater than or equal to 25% and excellent properties of transparency, a refractive index, heat resistance, strength, and the like.

It is preferable that the polythiol (b) to be used is obtained from the plant-derived material, and a compound which is not obtained from the plant-derived material is also may be used. As it is used, the compound is may be used such that the degree of biomass of the polythiourethane resin is in a predetermined range (greater than or equal to 25%).

(Catalyst)

A known catalyst such as an organic metal compound, amines, phosphonium salts, or an acid may be used as a catalyst of a polymerization reaction in which a polythiourethane resin can be obtained from the polymerizable composition for an optical material of the embodiment.

Examples of the organic metal compound include a compound containing tin, titanium, mercury, zinc, bismuth, zirconium, manganese, nickel, cobalt, copper, lead, and the like. Examples of the organic metal compound include an organic tin compound such as tin acetate, tin octylate, tin oleate, tin laurate, dibutyl tin diacetate, dimethyl tin dilaurate, dibutyl tin dilaurate, dibutyl tin dimercaptide, dibutyl tin maleate, dibutyl tin dineodecanoate, dioctyl tin dimercaptide, dioctyl tin dilaurate, dimethyl tin dichloride, and dibutyl tin dichloride, an organic lead compound such as lead octanoate and lead naphthenate, an organic zinc compound such as zinc naphthenate, an organic manganese compound such as manganese naphthenate, an organic nickel compound such as nickel naphthenate, an organic cobalt compound such as cobalt naphthenate, an organic copper compound such as copper octenate, and an organic bismuth compound such as bismuth octylate and bismuth neodecanoate.

Examples of the amines include tertiary amines such as triethyl amine, tri-n-propyl amine, triisopropyl amine, tri-n-butyl amine, triisobutyl amine, N,N-dimethyl benzyl amine, N-methyl morpholine, N,N-dimethyl cyclohexyl amine, dimethyl dipropylene triamine, pentamethyl diethylene triamine, bis(2-dimethyl aminoethyl)ether, N-methyl morpholine, N,N'-dimethyl piperazine, triethylene diamine, N,N,N',N'-tetramethyl ethylene diamine, and bicyclooctane diamine (DABCO), quaternary ammonium salts such as tetrabutyl ammonium bromide and tetraethyl ammonium hydroxide, imidazoles such as imidazole, 1,2-dimethyl imidazole, N-benzyl-2-methyl imidazole, and 2-ethyl-4-imidazole, pyrazoles such as pyrazole and 3,5-dimethyl pyrazole, and hindered amines such as 1,2,2,6,6-pentamethyl-4-piperidinol, 1,2,2,6,6-pentamethyl-4-hydroxy ethyl-4-piperidinol, methyl-1,2,2,6,6-pentamethyl-4-piperidyl sebacate, a mixture of the methyl-1,2,2,6,6-pentamethyl-4-piperidyl sebacate and the bis(1,2,2,6,6-pentamethyl-4-piperidyl)sebacate, bis(1,2,2,6,6-pentamethyl-4-piperidyl)sebacate, bis(2,2,6,6-tetramethyl-1-(octyl oxy)-4-piperidyl)sebacate, bis(1,2,2,6, 6-pentamethyl-4-piperidyl)[[3,5-bis(1,1-dimethyl ethyl)-4-hydroxy phenyl] methyl] butyl malonate, and tetrakis(1,2, 2,6,6-pentamethyl-4-piperidyl)butane-1,2,3,4-tetracarboxylate.

Amines such as imidazoles, pyrazoles, and hindered amines which also function as a blocking agent for an isocyanate group are preferable as the amines, and the imidazoles and the hindered amines are more preferable.

The hindered amine is also used as a light stabilizer, and examples of a commercially available product may include Lowilite 76 and Lowilite 92 manufactured by Chemtura Corporation, Tinuvin 144, Tinuvin 292, and Tinuvin 765 manufactured by BASF SE, ADEKA STAB LA-52 and ADEKA STAB LA-72 manufactured by ADEKA CORPORATION, JF-95 manufactured by JOHOKU CHEMICAL CO., LTD, and the like.

Examples of the phosphonium salts include a phosphonium salt compound such as tetramethyl phosphonium chloride, tetraethyl phosphonium chloride, tetrapropyl phosphonium chloride, tetrabutyl phosphonium chloride, tetrahexyl phosphonium chloride, tetraoctyl phosphonium chloride, ethyl triphenyl phosphonium chloride, tetraphenyl phosphonium chloride, butyl triphenyl phosphonium chloride, benzyl triphenyl phosphonium chloride, methoxy methyl triphenyl phosphonium chloride, tetramethyl phosphonium bromide, tetraethyl phosphonium bromide, tetrapropyl phosphonium bromide, tetrabutyl phosphonium bromide, tetrahexyl phosphonium bromide, tetraoctyl phosphonium bromide, ethyl triphenyl phosphonium bromide, tetraphenyl phosphonium bromide, butyl triphenyl phosphonium bromide, benzyl triphenyl phosphonium bromide, methoxy methyl triphenyl phosphonium bromide, ethyl triphenyl phosphonium acetate, ethyl triphenyl phosphonium iodide, tetraethyl phosphonium hydroxide, tetrabutyl phosphonium hydroxide, tetraphenyl phosphonium tetrakis(4-methyl phenyl)borate, tetraphenyl phosphonium tetraphenyl borate, and tetrabutyl phosphonium-o,o-diethyl phosphorodithioate.

Examples of acids include a sulfonic acid such as a methane sulfonic acid, a benzene sulfonic acid, and a toluene sulfonic acid, and an acidic phosphoric acid ester such as a phosphoric acid monoester and a phosphoric acid diester. A specific example of the acidic phosphoric acid ester is represented by Formula (1).

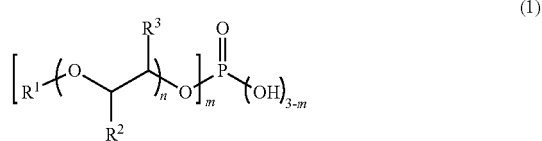

(1)

In the formula, m represents an integer of 1 or 2, n represents an integer of 0 to 18, R1 represents an alkyl group having 1 to 20 carbon atoms, and R2 and R3 each independently represent a hydrogen atom, a methyl group, or an ethyl group. It is preferable that the number of carbon atoms in [ ]m is 4 to 20.

In Formula (1), examples of R1 may include an organic residue derived from a straight chain aliphatic compound such as methane, ethane, propane, butane, pentane, hexane, heptane, octane, nonane, decane, undecane, dodecane, tetradecane, and hexadecane; an organic residue derived from a branched chain aliphatic compound such as 2-methyl propane, 2-methyl butane, 2-methyl pentane, 3-methyl pentane, 3-ethyl pentane, 2-methyl hexane, 3-methyl hexane, 3-ethyl hexane, 2-methyl heptane, 3-methyl heptane, 4-methyl heptane, 3-ethyl heptane, 4-ethyl heptane, 4-propyl heptane, 2-methyl octane, 3-methyl octane, 4-methyl octane, 3-ethyl octane, 4-ethyl octane, and 4-propyl octane; an organic residue derived from an alicyclic compound such as cyclopentane, cyclohexane, 1,2-dimethyl cyclohexane, 1,3-dimethyl cyclohexane, and 1,4-dimethyl cyclohexane; and the like, but are not limited only to these exemplified compounds.

The acidic phosphoric acid ester is also used as a releasing agent for manufacturing a plastic lens, and examples of a commercially available product may include Zelec UN manufactured by STEPAN Company, JP Series manufactured by JOHOKU CHEMICAL CO., LTD, Phosphanol Series manufactured by TOHO Chemical Industry Co., Ltd., AP Series and DP Series manufactured by DAIHACHI CHEMICAL INDUSTRY CO., LTD., and the like.

The catalysts may be used alone, or two or more may be used in combination. In addition, the catalyst of the embodiment is not particularly limited, and a non-metal catalyst is preferable in order to provide a globally environmentally friendly plastic lens by polymerizing the polythiourethane resin for an optical material from the plant-derived material. The amines, the phosphonium salts, and the acids are used as the non-metal catalyst, and among them, the amines, the phosphonium salts, and the acids are particularly preferable because these catalysts can be obtained from a plant-derived compound. Among the amines, the imidazoles are particularly preferable.

The amount of the catalyst to be used is preferably 0.001 parts by weight to 10 parts by weight, and is more preferably 0.01 parts by weight to 1 part by weight, with respect to a total of 100 parts by weight of the polyisocyanate (a), the polythiol (b), and the other polymerizable compound which may be used.

(Other Components)

The polymerizable composition of the embodiment may include an additive such as a light stabilizer, an ultraviolet absorber, an antioxidant, a coloring preventing agent, a dye, a bluing agent, and a resin improver, according to the purpose.

A hindered amine-based compound may be used as the light stabilizer.

Examples of the hindered amine-based compound may include Lowilite 76 and Lowilite 92 manufactured by Chemtura Corporation, Tinuvin 123, Tinuvin 144, Tinuvin 292, Tinuvin 765, and Tinuvin 770DF manufactured by BASF SE, ADEKA STAB LA-52 and ADEKA STAB LA-72 manufactured by ADEKA CORPORATION, JF-90 and JF-95 manufactured by JOHOKU CHEMICAL CO., LTD, and the like.

Examples of the bluing agent include a bluing agent which has absorption band in a wavelength region of orange to yellow in a visible light region, and has a function of adjusting a hue of an optical material formed of a resin. More specifically, the bluing agent includes substances exhibiting a blue color to a violet color.

Examples of the ultraviolet absorber to be used include a benzophenone-based ultraviolet absorber such as 2,2'-dihydroxy-4-methoxy benzophenone, 2-hydroxy-4-acryloyl oxy benzophenone, 2-hydroxy-4-acryloyl oxy-5-tert-butyl benzophenone, and 2-hydroxy-4-acryloyl oxy-2',4'-dichlorobenzophenone, a triazine-based ultraviolet absorber such as 2-[4-[(2-hydroxy-3-dodecyl oxy propyl)oxy]-2-hydroxy phenyl]-4,6-bis(2,4-dimethyl phenyl)-1,3,5-triazine, 2-[4-(2-hydroxy-3-tridecyl oxy propyl)oxy]-2-hydroxy phenyl]-4,6-bis(2,4dimethyl phenyl)-1,3,5-triazine, 2-[4-[(2-hydroxy-3-(2'-ethyl)hexyl)oxy]-2-hydroxy phenyl]-4,6-bis(2, 4-dimethyl phenyl)-1,3,5-triazine, 2,4-bis(2-hydroxy-4-butyl oxy phenyl)-6-(2,4-bis-butyl oxy phenyl)-1,3,5-triazine, and 2-(2-hydroxy-4-[1-octyl oxy carbonyl ethoxy] phenyl)-4,6-bis(4-phenyl phenyl)-1,3,5-triazine, a benzotriazole-based ultraviolet absorber such as 2-(2H-benzotriazol-2-yl)-4-methyl phenol, 2-(2H-benzotriazol-2-yl)-4-tert-octyl phenol, 2-(2H-benzotriazol-2-yl)-4,6-bis(1-methyl-1-phenyl ethyl) phenol, 2-(2H-benzotriazol-2-yl)-4,6-di-tert-pentyl phenol, 2-(5-chloro-2H-benzotriazol-2-yl)-4-methyl-6-tert-butyl phenol, 2-(5-chloro-2H-benzotriazol-2-yl)-2,4-tert-butyl phenol, and 2,2'-methylene bis[6-(2H-benzotriazol-2-yl)-4-(1,1,3,3-tetramethyl butyl)phenol], and the like, and the benzotriazole-based ultraviolet absorber such as the 2-(2H-benzotriazol-2-yl)-4-tert-octyl phenol or the 2-(5-chloro-2H-benzotriazol-2-yl)-4-methyl-6-tert-butyl phenol is preferable. The ultraviolet absorbers may be used alone, or two or more may be used in combination.

The amount of the additive to be used is preferably 0.05 parts by weight to 2.0 parts by weight, and is more preferably 0.05 parts by weight to 1.5 parts by weight, with respect to a total of 100 parts by weight of the polyisocyanate (a), the polythiol (b), and other polymerizable compound which may be used.

The polymerizable composition for an optical material of the embodiment can be obtained by mixing the components described above. Any conventional means may be used for mixing.

In the polymerizable composition for an optical material of the embodiment, a molar ratio of the total number of mercapto groups of the polythiol contained in the polymerizable composition to the total number of isocyanate groups of the polyisocyanate contained in the polymerizable composition is in a range of 0.8 to 1.2, is preferably in a range of 0.85 to 1.15, and is more preferably in a range of 0.9 to 1.1. In the range described above, it is possible to obtain a polymerizable composition for an optical material, in particular, an optical material which is preferably used as a spectacle lens.

The effect of a preferred aspect of the present invention will be described below.

As described above, recently, a biomass product has been required to be developed in consideration of the influence on the global environment. In order to improve the degree of biomass, there is a demand for utilizing the aliphatic polyisocyanate which can be manufactured from the plant-derived material, and it has been known that a resin molding obtained by using the aliphatic polyisocyanate has low heat resistance.

In the present invention, by using the polyisocyanate (a) including the aliphatic polyisocyanate (a1) obtained from the plant-derived material, and the modified aliphatic polyisocyanate (a2), and by containing the modified aliphatic polyisocyanate (a2) in a predetermined range, it is possible to obtain a polymerizable composition for an optical material in which heat resistance is improved while maintaining the degree of biomass at a high level, and a molding having excellent other properties of transparency, a refractive index, strength, and the like can be provided.

[Moldings]

By polymerizing and curing the polymerizable composition for an optical material of the embodiment, it is possible to obtain a molding having excellent properties of transparency, refractive index, heat resistance, strength, and the like. Further, by using the plant-derived material, it is possible to obtain a molding formed by containing a globally environmentally friendly polythiourethane resin. The degree of biomass of the polythiourethane resin may be greater than or equal to 25%, may be preferably greater than or equal to 30%, and may be more preferably greater than or equal to 50%.

A plant-derived material is used, and a material having a high degree of biomass is preferably used, from the viewpoint of the utilization of non-fossil resources.

As a result of intensive studies of the present inventors, it has been found that by using polyisocyanate obtained from the plant-derived material and/or the polythiol obtained from the plant-derived material, it is possible to obtain a polythiourethane resin having a degree of biomass of greater than or equal to 25% and a molding formed by containing the resin, it is possible to contribute to the utilization of the non-fossil resources, and it is possible to obtain a polythiourethane resin having excellent transparency, heat resistance, and strength, and an excellent balance in properties of a refractive index, the Abbe number, releasability, and the like, and a molding formed by containing the resin, and thus, the present invention has been completed.

A glass transition temperature (Tg) of the molding is higher than or equal to 60° C., is preferably higher than or equal to 70° C., and is more preferably higher than or equal to 80° C. In a case where the molding of the embodiment is obtained by using the aliphatic polyisocyanate obtained from the plant-derived material as the aliphatic polyisocyanate (a1), heat resistance is improved while maintaining the degree of biomass at a high level by containing the modified aliphatic polyisocyanate (a2) in a predetermined range. Further, it is possible to provide a molding having excellent other properties of transparency, a refractive index, strength, and the like, and an excellent balance in the properties.

[Applications]

An optical material formed of the molding of the embodiment can be obtained in various shapes by changing a mold at the time of performing casting polymerization. Specifically, the optical material can be used in various applications such as a plastic lens, a camera lens, a light emitting diode (LED), a prism, an optical fiber, an information recording substrate, a filter, a light emitting diode, an optical lens for an automobile, and an optical lens for a robot. In particular, the optical material is suitable for an optical material or an optical element of a plastic lens, a camera lens, a light emitting diode, and the like.

Examples of the plastic lens may include a plastic spectacle lens formed of a polythiourethane resin and a plastic polarization lens in which a layer formed of a polythiourethane resin is laminated on at least one surface of a polarizing film.

[Manufacturing Method of Plastic Spectacle Lens]

A manufacturing method of a plastic spectacle lens of the present invention can be described by an embodiment including the following steps.

Step (1): Injecting the polymerizable composition for an optical material of the embodiment into a lens casting mold.

Step (2): Polymerizing and curing the polymerizable composition for an optical material in the lens casting mold.

Hereinafter, the manufacturing method will be sequentially described according to each of the steps.

Step (1)

In this step, the polymerizable composition of the embodiment is injected into a molding mold (the lens casting mold) held by a gasket, tape, or the like. At this time, it is preferable that, as necessary, a defoaming treatment under reduced pressure, a filtration treatment such as pressurization and depressurization, or the like, is performed according to the properties required to a molding to be obtained.

Step (2)

In this step, polymerization of the polymerizable composition casted in the casting mold at a predetermined temperature is initiated, and the composition is polymerized. The polymerization conditions are considerably different based on the kinds of polyisocyanate or polythiols to be used, the shape of the mold, and the like, and thus, the conditions are not limited, and the polymerization is performed at a temperature of 0° C. to 140° C. for 1 hour to 48 hours.

Further, the method for manufacturing a plastic spectacle lens of the present invention may be described by another embodiment including the following steps.

Step a: Mixing the polyisocyanate (a) including the aliphatic polyisocyanate (a1) and the modified aliphatic polyisocyanate (a2) with the polythiol (b) having a di- or higher functional thiol group to obtain the polymerizable composition for an optical material.

Step b: Injecting the polymerizable composition for an optical material having viscosity at 20° C. of 20 mPa·s to 1000 mPa·s into a mold.

Step c: Polymerizing and curing the polymerizable composition for an optical material in the mold.

[Step a]

In the step a, the polymerizable composition for an optical material is can be obtained by mixing the components described above. Any conventional means may be used for the mixing. In addition, the adding sequence is suitably selected in consideration of operability, safety, convenience, and the like.

In general, the mixing may be performed at a temperature of lower than or equal to 30° C., and there is a case where it is preferable that the mixing is performed at a lower temperature from the viewpoint of adjustment of viscosity or the pot life of the mixture. Further, there are many cases where it is preferable that, as necessary, a defoaming treatment under reduced pressure, a filtration treatment in pressurization or depressurization, or the like, is performed according to the properties required to a plastic lens to be obtained.

[Step b]

In the step b, the polymerizable composition for an optical material prepared in the step a is injected into a mold.

The viscosity of the polymerizable composition for an optical material at the time of being injected into the mold is a value measured at a measurement temperature of 20° C. by an E-type viscometer, and may be 20 mPa·s to 1000 mPa·s, may be preferably 20 mPa·s to 800 mPa·s, may be more preferably 25 mPa·s to 400 mPa·s, and may be particularly preferably 30 mPa·s to 300 mPa·s.

The polymerizable composition for an optical material of the embodiment is injected at the viscosity described above, and thus, even in a case where the aliphatic polyisocyanate is used, it is possible to provide an optical material formed of a polythiourethane resin having an excellent balance in the properties of transparency, a refractive index, heat resistance, and the like. In a case where the viscosity is greater than the upper limit value, filtration or injection into the mold tends to be difficult, and productivity of the optical material decreases.

In the embodiment, a method of adjusting the viscosity of the polymerizable composition for an optical material is not particularly limited, but any known method can be used, and it is possible to increase the viscosity by stirring the polymerizable composition for an optical material under a predetermined temperature which is arbitrarily selected using a general stirring device, and to adjust the viscosity to be in a preferred viscosity range.

A stirring time may be adjusted to be in the preferred viscosity range at the time of injecting the polymerizable composition for an optical material into the mold, but is not particularly limited.

Furthermore, in the embodiment, the time of injecting the polymerizable composition for an optical material into the mold indicates that a time from immediately after preparing the composition to the end of the injection of the composition through the defoaming treatment or other steps under reduced pressure. The environmental temperature at the time of injecting the polymerizable composition may be 15° C. to 35° C., may be preferably 20° C. to 30° C., and may to be more preferably 20° C. to 25° C.

Any conventional means may be used for injecting of the polymerizable composition for an optical material into the mold, and for example, the injection may be manually performed, or may be performed by using a mixing and injecting machine.

Molds having various shapes may be used as the mold of the embodiment insofar as the mold is for preparing the optical material, but the mold is not particularly limited.

Furthermore, in the embodiment, an example of a case where the plastic spectacle lens is manufactured will be described.

As illustrated in FIG. 1, a casting mold 10 for manufacturing a plastic spectacle lens is configured of two circular molds 12a and 12b which are retained by a gasket 12c.

The material of the gasket 12c includes polyvinyl chloride, an ethylene-vinyl acetate copolymer, an ethylene-ethyl acrylate copolymer, an ethylene-propylene copolymer, an ethylene-propylene-diene copolymer, a polyurethane elastomer, a fluorine rubber, or soft elastic resins in which polypropylene is blended with the copolymers.

Examples of the material of the molds 12a and 12b include glass, metal, and the like, and in general, the glass is used as the material of the molds 12a and 12b. The molds 12a and 12b may be coated with a releasing agent in advance in order to improve releasability of the obtained lens. In addition, a coating solution for providing hardcoat performance to a lens material may be applied onto the mold in advance.

Furthermore, examples of the mold include in addition to the mold described above, a mold composed of a glass mold and tape, and the like.

The polymerizable composition for an optical material is injected into the space of a lens casting mold 10 (in a mold 14) by a predetermined injecting unit (not illustrated).

[Step c]

In the step c, the injected polymerizable composition for an optical material is polymerized and cured in the mold.

Specifically, first, the casting mold into which the polymerizable composition for an optical material is injected is heated in a device in which heating can be performed, such as an oven or water according to a predetermined temperature program for several hours to several tens of hours, and thus, curing and molding is performed.

The temperature under which the polymerizing and curing is conducted is not limited since the conditions vary according to the composition of the polymerizable composition, the kinds of the catalyst, the shape of the mold, and the like, and the polymerizing and curing is performed at a temperature of −50° C. to 200° C. for 1 hour to 100 hours.

In general, the heating is initiated at a temperature in a range of 5° C. to 40° C., and then, the temperature gradually increases in a range from 80° C. to 130° C., and the heating is performed at the temperature for 1 hour to 4 hours.

After the curing and molding are completed, the obtained molding is taken from the casting mold, and thus, the plastic spectacle lens of the embodiment can be provided. In order to reduce the distortion due to the polymerization, it is desirable that the plastic spectacle lens of the embodiment is subjected to an annealing treatment by heating the released lens. An annealing temperature is generally in a range of 80° C. to 150° C., is preferably in a range of 100° C. to 130° C., and is more preferably in a range of 110° C. to 130° C. An annealing time is generally in a range of 0.5 hours to 5 hours, and is preferably in a range of 1 hour to 4 hours.

A coating layer may be provided on one surface or both surfaces of the obtained plastic spectacle lens, as necessary. Examples of the coating layer include a primer layer, a hard coat layer, an anti-reflection layer, a defogging coat layer, a stain-proofing layer, a water repellent layer, and the like. The coating layers may be used alone, or a plurality of coating layers may be used by being laminated. When the coating layer is provided on both of the surfaces of the plastic spectacle lens, the same coating layers may be provided on both of the surfaces or different coating layers may be provided on both of the surfaces.

The coating layer may be used together with an ultraviolet absorber for protecting lenses or eyes from an ultraviolet ray, an infrared absorber for protecting lenses or eyes from an infrared ray, a light stabilizer or an antioxidant for improving weather resistance of the lens, a dye or a pigment, a photochromic dye or a photochromic pigment, and an antistatic agent for increasing fashionability of the lens, and a known additive for increasing performance of the lens. In a layer which is formed by coating, various leveling agents for improving coating properties may be used.

In general, the primer layer is provided between the hard coat layer described below and the optical lens. The primer layer is utilized as a coating layer for improving adhesiveness between the hard coat layer and the lens provided on the coating layer, and possibly can improve impact resistance. In the primer layer, any material can be used as long as the material has high adhesiveness with respect to the obtained optical lens, and in general, a primer composition including a urethane-based resin, an epoxy-based resin, a polyester-based resin, a melanin-based resin, and a polyvinyl acetal as a main component, and the like are used. In the primer composition, a suitable solvent which does not affect the lens may be used in order to adjust viscosity of the composition. A solvent may not be used.

The primer composition may be provided by either a coating method or a dry method. When the coating method is used, the primer composition is applied to a lens by a known coating method such as spin coating and dip coating, and then is solidified, and thus, a primer layer is formed. When the dry method is performed, the primer layer is formed by a known dry method such as CVD method or vacuum vapor deposition method. When the primer layer is formed, in order to improve adhesiveness, the surface of the lens may be subjected to a pretreatment such as an alkali treatment, a plasma treatment, and an ultraviolet ray treatment, as necessary.

The hard coat layer is a coating layer for applying a function such as scratch resistance, abrasion resistance, moisture resistance, warm water resistance, heat resistance, and weather resistance to the surface of the lens.

In general, a hard coat composition which includes an organic silicon compound having curability and one or more kinds of oxide fine particles of an element selected from an element group consisting of Si, Al, Sn, Sb, Ta, Ce, La, Fe, Zn, W, Zr, In, and Ti and/or one or more kinds of fine particles configured of a composite oxide of two or more kinds of elements selected from the element group is used in the hard coat layer.

It is preferable that the hard coat composition includes at least one of amines, amino acids, a metal acetyl acetate complex, an organic acid metal salt, perchloric acids, a salt of perchloric acids, acids, a metal chloride, and a multifunctional epoxy compound in addition to the component described above. In the hard coat composition, a suitable solvent which does not affect the lens may be used. Naturally, a solvent may not be used.

In general, the hard coat layer is formed by coating the hard coat composition using a known coating method such as spin coating and dip coating, and then by curing the composition. Examples of a curing method include a thermal curing method, a curing method using an energy ray such as an ultraviolet ray or a visible light ray, and the like. In order to suppress the occurrence of an interference fringe, it is preferable that a difference between the refractive index of the hard coat layer and the refractive index of the lens is in a range of ±0.1.

In general, the anti-reflection layer is provided on the hard coat layer, as necessary. The anti-reflection layer includes an inorganic-based anti-reflection layer and an organic-based anti-reflection layer, and when the anti-reflection layer is the inorganic-based anti-reflection layer, the anti-reflection layer is formed by a dry method such as a vacuum vapor deposition method, a sputtering method, an ion plating method, an ion beam assist method, and a CVD method using an inorganic oxide such as $SiO_2$ and $TiO_2$. When the anti-reflection layer is the organic-based anti-reflection layer, the anti-reflection layer is formed by a wet method using an organic silicon compound and a composition including silica-based fine particles having an inner cavity.

The anti-reflection layer is configured of a single layer or a multilayer, and when the anti-reflection layer formed of a single layer is used, it is preferable that the refractive index of the anti-reflection layer is less than the refractive index of the hard coat layer by greater than or equal to at least 0.1. In order to effectively exhibit an anti-reflection function, an anti-reflection film formed of a multilayer film is preferable, and in this case, a low refractive index film and a high refractive index film are alternately laminated. Even in this case, it is preferable that a difference between the refractive indices of the low refractive index film and the high refractive index film is greater than or equal to 0.1. Examples of the high refractive index film include a film of $ZnO$, $TiO_2$, $CeO_2$, $Sb_2O_5$, $SnO_2$, $ZrO_2$, $Ta_2O_5$, and the like, and examples of the low refractive index film include a $SiO_2$ film, and the like.

A defogging coat layer, a stain-proofing layer, and a water repellent layer may be formed on the anti-reflection layer, as necessary. In a method of forming the defogging coat layer, the stain-proofing layer, and the water repellent layer, a treatment method, a treatment material, and the like are not particularly limited insofar as an anti-reflection function is adversely affected, and a known defogging coat treatment method, a known stain-proofing treatment method, a known water repellent treatment method, and a known material can be used. For example, examples of the defogging coat treatment method and the stain-proofing treatment method include a method of covering the surface with a surfactant, a method of applying water absorbency to the surface by adding a hydrophilic film, a method of increasing water absorbency by covering the surface with fine concavities and convexities, a method of applying water absorbency by using photocatalyst activity, a method of preventing a water droplet from being attached to the surface by performing a super water repellent treatment, and the like. In addition, examples of the water repellent treatment method include a method of forming a water repellent treatment layer by performing vapor deposition or sputtering with respect to a fluorine-containing silane compound and the like, a method of forming a water repellent treatment layer by dissolving a fluorine-containing silane compound in a solvent, and then by applying the compound onto the surface, and the like.

In the plastic spectacle lens of the embodiment, a coloring matter according to the purpose may be used, or the plastic spectacle lens may be used by being dyed, in order to applying fashionability or photochromic properties. The lens can be dyed by a known dyeing method, and in general, is dyed by the following method.

In general, the method for dyeing the lens is a method in which a lens material which has been finished so as to be a predetermined optical surface is dipped in a dyeing solution where a coloring matter to be used is dissolved or is homogeneously dispersed (a dyeing step), and then, as necessary, the lens is heated and the coloring matter is fixed (a step of annealing after dyeing). The coloring matter used in the dyeing step is not particularly limited as long as the coloring matter is a known coloring matter, and in general, an oil-soluble dye or a dispersion dye is used. A solvent used in the dyeing step is not particularly limited as long as the coloring substance to be used can be dissolved or can be homogeneously dispersed in the solvent. In the dyeing step, as necessary, a surfactant for dispersing the coloring matter in the dyeing solution or a carrier for accelerating dyeing may be added. In the dyeing step, the coloring matter and the surfactant which is added as necessary were dispersed in water or a mixture of water and an organic solvent, and thus, a dyeing bath is prepared, and the optical lens is dipped in the dyeing bath and is dyed at a predetermined temperature for a predetermined time. The dyeing temperature and the dyeing time are changed according to a desired coloring concentration, and in general, the dyeing temperature may be lower than or equal to 120° C. and the dyeing time may be several minutes to several tens of hours, and the dyeing is performed at a dye concentration of the dyeing bath of 0.01 weight % to 10 weight %. In addition, when it is difficult to performing dyeing, the dyeing may be performed under pressure. The step of annealing after dyeing, which is performed as necessary is a step of performing a heat treatment with respect to the dyed lens material. In the heat treatment, water remaining on the surface of the lens material which has been dyed in the dyeing step is removed by a solvent or the like, or for example, the lens is retained in a furnace such as an infrared ray heating furnace in an air atmosphere or a resistance heating furnace for a predetermined time. In the step of annealing after dyeing, water penetrating into the lens material at the time of performing dyeing is removed while preventing decoloration of the dyed lens material (a decoloration preventive treatment).

[Manufacturing Method of Plastic Polarization Lens]

A method for manufacturing a plastic polarization lens of the present invention can be described by an embodiment including the following steps.

Step (1): Fixing a polarizing film into a lens casting mold in a state where at least one surface of the polarizing film is separated from a mold.

Step (2): Injecting the polymerizable composition for an optical material of the embodiment into a gap between the polarizing film and the mold.

step (3): Laminating a layer formed of a polythiourethane resin on at least one surface of the polarizing film by polymerizing and curing the polymerizable composition for an optical material.

Hereinafter, the manufacturing method will be sequentially described according to each of the steps.

Step (1)

The polarizing film is disposed in a space of the lens casting mold such that at least one surface of the film is parallel to the facing inner surface of the mold. A gap portion is formed between the polarizing film and the mold. The polarizing film may be formed in advance.

Various films such as a polyvinyl alcohol polarizing film and a thermoplastic polyester polarizing film can be used in the polarizing film. Examples of the thermoplastic polyester may include polyethylene terephthalate, polyethylene naphthalate, polybutylene terephthalate, and the like.

Specifically, examples of the polarizing film include a dichromic dye-containing thermoplastic polyester polarizing film, an iodine-containing polyvinyl alcohol polarizing film, a dichromic dye-containing polyvinyl alcohol polarizing film, and the like.

Step (2)

Next, in the space of the lens casting mold, the polymerizable composition for an optical material of the embodiment is injected into the gap portion between the mold and the polarizing film by a predetermined injection unit.

Step (3)

Next, the lens casting mold into which the polymerizable composition for an optical material is injected and into which the polarizing film is fixed is heated in a device in which heating is may be performed, such as an oven or water according to a predetermined temperature program for several hours to several tens of hours, and thus, the molding is performed by polymerizing and curing the polymerizable composition for an optical material.

The polymerizing and curing temperature is not limited since conditions are different according to the composition of the polymerizable composition, the kinds of catalyst, the shape of the mold, and the like, but the polymerizing and curing is performed at a temperature of 0° C. to 140° C. for 1 hour to 48 hours.

The plastic polarization lens of the embodiment in which the layer formed of the polythiourethane resin is laminated on at least one surface of the polarizing film can be obtained by being extracted from the lens casting mold after the curing and molding are completed.

In order to reduce distortion due to polymerization, it is preferable that the plastic polarization lens of the embodiment is subjected to an annealing treatment by heating the released lens.

The manufacturing method of a plastic polarization lens of the present invention may be described by another embodiment including the following steps.

Step d: Fixing a polarizing film into a lens casting mold in a state where at least one surface of the polarizing film is separated from a mold.

Step e: Mixing the polyisocyanate (a) including the aliphatic polyisocyanate (a1) and the modified aliphatic polyisocyanate (a2) with the polythiol (b) having a di- or higher functional thiol group to obtain a polymerizable composition for an optical material.

Step f: Injecting the polymerizable composition for an optical material having viscosity at 20° C. of 20 mPa·s to 1000 mPa·s into a gap between the polarizing film and the mold.

Step g: Polymerizing and curing the polymerizable composition for an optical material, and laminating a layer formed of the polythiourethane resin on at least one surface of the polarizing film.

Hereinafter, each step will be sequentially described.

[Step d]

Figure 2:
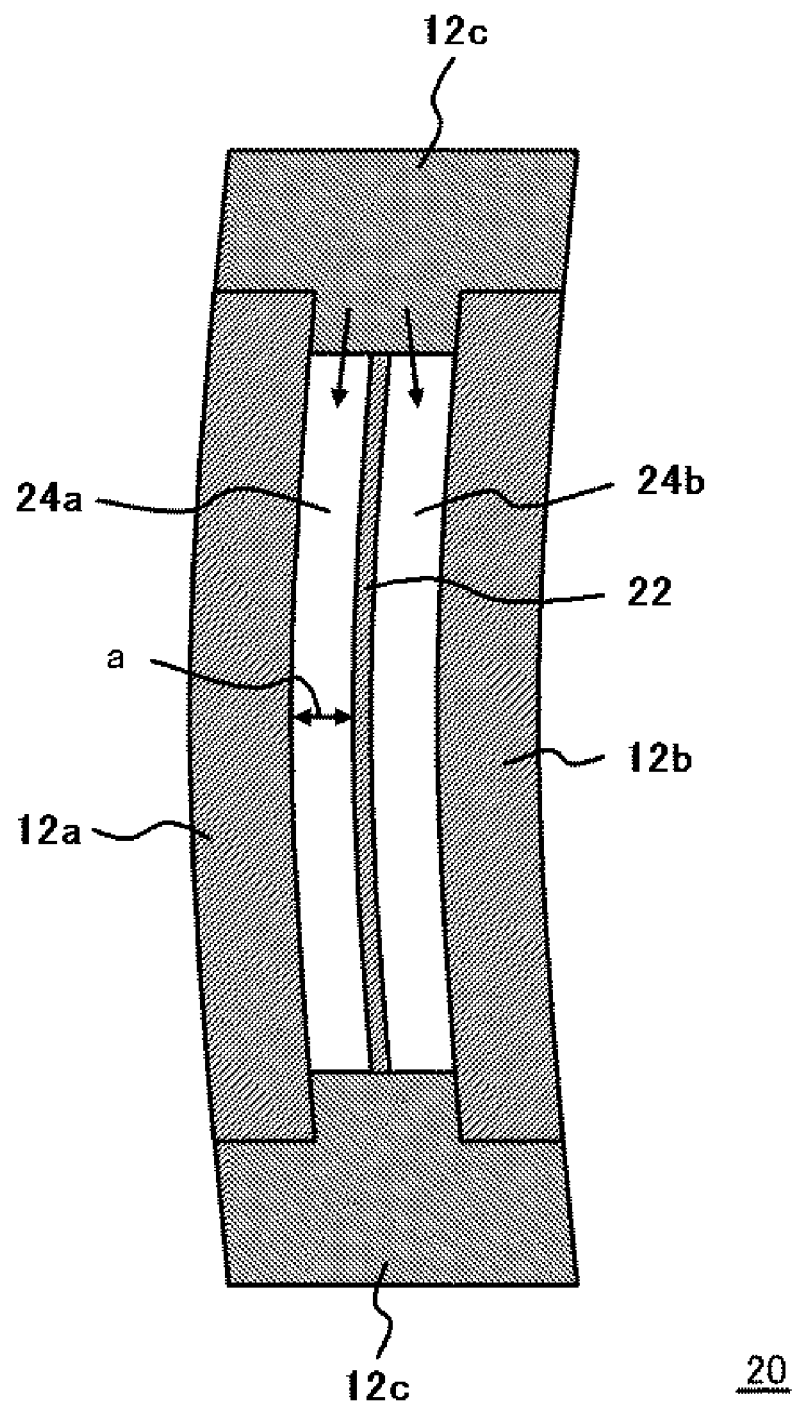
FIG. 2 is a sectional view schematically illustrating a casting mold for manufacturing a plastic polarization lens which is used in an embodiment.

As illustrated in FIG. 2, the plastic polarization lens of the embodiment may be obtained by polymerizing and curing the polymerizable composition after the polymerizable composition is injected into the casting mold 20 onto which the polarizing film 22 is fixed. Furthermore, in the embodiment, an example in which the polymerizable composition is injected into gap portions 24a and 24b has been described, and the casting mold 20 which does not include the gap 24a may be used such that a resin layer is laminated on at least one surface of the polarizing film 22. In this case, a layer containing a polythiourethane-based resin is formed on the gap portion 24b side of the polarizing film 22.

In addition, the polarizing film 22 may be formed in advance.

Various films such as a polyvinyl alcohol polarizing film and a thermoplastic polyester polarizing film may be used in the polarizing film. Examples of the thermoplastic polyester may include polyethylene terephthalate, polyethylene naphthalate, polybutylene terephthalate, and the like.

Specifically, examples of the polarizing film include a dichromic dye-containing thermoplastic polyester polarizing film, an iodine-containing polyvinyl alcohol polarizing film, a dichromic dye-containing polyvinyl alcohol polarizing film, and the like.

It is general that the lens casting mold 20 is configured of two molds 12a and 12b which are retained by the gasket 12c. The polarizing film 22 is disposed in the space of the lens casting mold 20 such that the film surface is parallel to the facing inner surface of the mold 12a on the front side. Each of the gap portions 24a and 24b is provided between the polarizing film 22 and the molds 12a and 12b. A separation distance a of the narrowest gap between the gap portions 24a and 24b is approximately 0.2 mm to 2.0 mm. In the embodiment, a predetermined polymerizable composition is used, and thus, viscosity of the polymerizable composition at the time of being injected is low, and the polymerizable composition can be easily injected into the gap portion of such a gap.

[Step e]

The step e may be conducted as with the step a of the method for manufacturing a plastic spectacle lens described above.

[Step f]

In the embodiment, a method for manufacturing a composition may performed as with the step b of the method for manufacturing a plastic spectacle lens described above. Then, the prepared composition is injected into two gap portions 24a and 24b between the molds 12a and 12b and the polarizing film 22 in the space of the casting mold 20 by a predetermined injecting unit.

[Step g]

Then, the step g may be conducted as with the step c of the method for manufacturing a plastic spectacle lens described above.

The plastic polarization lens can be obtained by the manufacturing method described above.

The plastic polarization lens of the embodiment, as necessary, is used by disposing a coating layer on one surface or both surfaces thereof. Examples of the coating layer include a primer layer, a hard coat layer, an anti-reflection layer, a defogging coat layer, a stain-proofing layer, a water repellent layer, and the like, as with the plastic spectacle lens.

As described above, the embodiments of the present invention are described, but the embodiments are examples of the present invention, and various configurations other than the configurations described above may be adopted within a range not impairing the effects of the present invention.

EXAMPLES

Hereinafter, the present invention will be described in more detail with reference to examples, but the present invention is not limited thereto. In the following description, unless otherwise particularly stated, "parts" and % are based on a weight.

Example A (Method for Measuring Concentration (%) of Unreacted 1,5-Pentamethylene Diisocyanate in Polyisocyanate (a-II) Which is Composition Containing Modified 1,5-Pentamethylene Diisocyanate)

The concentration of unreacted 1,5-pentamethylene diisocyanate in polyisocyanate (a-II) containing the modified product was obtained from a calibration curve drawn by using 1,5-pentamethylene diisocyanate obtained in Manufacturing Example A4 described below as a specimen by using the following device.

Device: Prominence (manufactured by Shimadzu Corporation)

Column: SHISEIDO SILICA SG-120

Column Temperature: 40° C.

Eluent: n-Hexane/Methanol/1,2-Dichloroethane=90/5/5 (Volume Ratio)

Flow Rate: 0.2 ml/min

Detector: UV 225 nm

R. Time: 16.9 min

Preparation of Measurement Solution: 0.1 g of a sample and dibenzyl amine having a molar ratio approximately 20 times the molar ratio of the sample were added to a volumetric flask of 50 ml, and 1,2-dichloroethane was mixed thereto, and thus, a measurement solution was obtained.

Measurement: 1 μL of the measurement solution was injected, and thus, measurement was performed.

(Method for Measuring Concentration (%) of Isocyanate Group of Polyisocyanate (a-II))

The concentration of an isocyanate group of the polyisocyanate was obtained by being measured by an n-dibutyl amine method using a potential difference titration device on the basis of JIS K-1556.

(Method of Concentration (%) of Mononuclear Isocyanurate in Polyisocyanate (a-II))

An area ratio of a peak corresponding to a molecular weight three times the molecular weight of 1,5-pentamethylene isocyanate to the total peak area was obtained as the concentration (%) of mononuclear isocyanurate in the polyisocyanate (a-II) according to a chromatogram obtained by gel permeation chromatography by using the following device.

Device: HLC-8020 (manufactured by TOSOH CORPORATION)

Column: Series Connection of G1000HXL, G2000HXL, and G3000HXL (manufactured by TOSOH CORPORATION)

Column Temperature: 40° C.

Eluent: Tetrahydrofuran

Flow Rate: 0.8 ml/min

Detector: Differential Refractometer

R. Time: Mononuclear Isocyanurate 27.2 min

Standard Substance: Polyethylene Oxide (TSK Standard Polyethylene Oxide, manufactured by TOSOH CORPORATION)

Measurement: 30 mg of a sample was dissolved in 10 ml of tetrahydrofuran, and 100 μL of the obtained solution was injected, and thus, measurement was performed.

(Method for Calculating Average Number of Functional Groups of Polyisocyanate (a-II))

The average number of functional groups of the polyisocyanate (a-II) was calculated by the following expression using a number average molecular weight obtained by the same measurement as that of the concentration of the mononuclear isocyanurate in the polyisocyanate (a-II) and the concentration of the isocyanate group of the polyisocyanate (a-II).

(Average Number of Functional Groups of Polyisocyanate($a$-$II$))=(Number Average Molecular Weight of Polyisocyanate($a$-$II$))×(Concentration (%) of Isocyanate Group of Polyisocyanate($a$-$II$))/4202

(Degree of Biomass (%))

The degree of biomass is obtained by a calculation method on a carbon basis, that is, is defined as follows.

Degree of Biomass (%)={(Number of Plant-Derived Carbon Atoms)/(Number of Plant-Derived Carbon Atoms+Number of Petroleum-Derived Carbon Atoms)}×100

(Method for Calculating Degree of Biomass (%) of Polyisocyanate (a-II))

The degree of biomass of the polyisocyanate (a-II) was calculated on a carbon basis according to the degree of biomass of the 1,5-pentamethylene diisocyanate.

(Degree of Biomass (%) of Polyisocyanate($a$-$II$))={(Number of Carbon Atoms of 1,5-Pentamethylene Diisocyanate)×(Degree of Biomass (%) of 1,5-Pentamethylene Diisocyanate)}/{(Number of Carbon Atoms of 1,5-Pentamethylene Diisocyanate)+(Number of Carbon Atoms of Added Compound at Time of Performing Reaction)}

(Method for Calculating Degree of Biomass (%) of Polythiol (b-I) or (b-II))

The degree of biomass of the synthesized polythiol was calculated on a carbon basis by using epichlorohydrin which was obtained from a plant-derived material and had a degree of biomass of 100% on a carbon basis.

Degree of Biomass of Polythiol={(Number of Epichlorohydrin-Derived Carbon Atoms in Molecules of Polythiol)×(Degree of Biomass (%) of Epichlorohydrin)}/{(Number of Carbon Atoms in Molecules of Polythiol)}

(Method for Calculating Degree of Biomass (%) of Polythiourethane Resin)

The degree of biomass of the polythiourethane resin was calculated on a carbon basis according to the degree of biomass of the polyisocyanate (a-I) or (a-II) and the polythiol (b-I) or (b-II). The degree of biomass of polythiol (b-III) or (b-IV) is 0%.

(Degree of Biomass (%) of Polythiourethane Resin)={(Number of Carbon Atoms of Used Polyisocyanate(a-I))×(Degree of Biomass (%) of Polyisocyanate(a-I))+(Number of Carbon Atoms of Used Polyisocyanate(a-II))×(Degree of Biomass (%) of Polyisocyanate(a-II))+(Number of Carbon Atoms of Used Polythiol(b-I))×(Degree of Biomass (%) of Polythiol(b-I))+(Number of Carbon Atoms of Used Polythiol(b-II))×(Degree of Biomass (%) of Polythiol(b-II))}/{(Number of Carbon Atoms of Used Polyisocyanate(a-I))+(Number of Carbon Atoms of Used Polyisocyanate(a-II))+(Total Number of Carbon Atoms of Other Polyisocyanates)+(Number of Carbon Atoms of Used Polythiol(b-I))+(Number of Carbon Atoms of Polythiol(b-II))+(Number of Carbon Atoms of Polythiol(b-III))+(Number of Carbon Atoms of Polythiol(b-IV))}

(Method for Evaluating Performance of Lens)

Handling properties were evaluated according to viscosity of a liquid monomer mixture at the time of performing polymerization.

Viscosity: The viscosity of the liquid monomer mixture at 20° C. was measured by an E-type viscometer (DVU-Ell Type, manufactured by TOKYO KEIKI INC.).

In addition, a lens obtained by polymerization was evaluated by performing a performance test. In the performance test, a refractive index, the Abbe number, and heat resistance were evaluated by the following testing method.

Refractive Index (ne) and Abbe Number (ve): Measured at 20° C. by using Pulfrich refractometer KPR-30 manufactured by Shimadzu Corporation.

Heat Resistance: Glass transition temperature (Tg) in a TMA penetration method (a load of 50 g and a pin tip of 0.5 mmφ) was set as heat resistance by using TMA-60 manufactured by Shimadzu Corporation.

Reference Preparation Example A

Synthesis of 1,5-Pentamethylene Diisocyanate Using Plant-Derived Material

Preparation Example A1 (Preparation of Fungus Body Lysate Solution)

(Cloning of Lysine Decarbonation Enzyme Gene (cadA))

Genome DNA prepared according to the routine method from a cluster of *Escherichia coli* W3110 (ATCC27325) was used for molding PCR.

In a primer for PCR, oligonucleotide (synthesized through commission to Life Technologies Japan Ltd.) having a base sequence according to Sequence Numbers 1 and 2 designed on the basis of a base sequence of lysine decarbonation enzyme gene (cadA) (GenBank Accession No. AP009048) was used. The primer has each restriction enzyme recognition sequence of KpnI and XbaI in the vicinity of a 5' terminal.

PCR was performed by using 25 μL of a PCR reaction mixture including 1 ng/μL of the genome DNA and 0.5 pmol/μL of each of the primers in conditions where a reaction cycle including Modification: 94° C. and 30 seconds, Annealing: 55° C. and 30 seconds, and Extension Reaction: 68° C. and 2 minutes was repeated 30 times.

A PCR reaction product and Plasmid pUC18 (manufactured by TAKARA SHUZO CO., LTD.) were digested with KpnI and XbaI and were connected by using Ligation High (manufactured by TOYOBO CO., LTD.), and then *Escherichia coli* DH5α (manufactured by TOYOBO CO., LTD.) was transformed by using the obtained recombinant plasmid. The transformant was cultured in an LB agar medium including 100 μg/mL of Ampicillin (Am) and X-Gal (5-bromo-4-chloro-3-indolyl-β-D-galactoside) to obtain a transformant which had resistance to Am as a white colony. The transformant was extracted to obtain a plasmid.

It was confirmed that the base sequence of a segment of DNA introduced into the plasmid was a base sequence according to Sequence Number 3 using a general determination method of a base sequence.

The plasmid having DNA which encodes the obtained lysine decarbonation enzyme was named pCADA. The transformed *escherichia coli* was cultured with pCADA to produce a lysine decarbonation enzyme having an amino acid sequence according to Sequence Number 4.

(Preparation of Transformant)

A cluster of *Escherichia coli* W3110 was transformed by a general method with pCADA, and the resulted transformant was named W/pCADA.

The transformant was inoculated into 500 ml of an LB medium including 100 μg/mL of Am in an erlenmeyer flask equipped with a baffle and was cultured with shaking at 30° C. until OD (660 nm) became 0.5, and then isopropyl-β-thiogalactopyranoside (IPTG) was added such that the amount of IPTG became 0.1 mmol/L and was further cultured with shaking for 14 hours. A culture solution was centrifuged at 8000 rpm for 20 minutes to separate a fungus body. The fungus body was suspended in 20 mmol/L of a buffer solution of sodium phosphate (pH 6.0), and was subjected to ultrasonic crushing to prepare fungus body lysate solution.

Preparation Example A2 (Manufacturing of Aqueous Solution of 1,5-Pentamethylene Diamine)

In a flask, 120 parts by weight of a substrate solution was prepared such that L-lysine monohydrochloride (manufactured by Wako Pure Chemical Industries, Ltd.) therein had the final concentration of 45 weight % and a pyridoxal phosphoric acid (manufactured by Wako Pure Chemical Industries, Ltd.) therein had the final concentration of 0.15 mmol/L. Next, the W/pCADA fungus body lysate solution described above (preparing a dried fungus body having a conversion weight of 0.3 g) was added and a reaction was initiated. The reaction conditions were 37° C. and 200 rpm. The reaction mixture was adjusted to have a pH of 6 with 6 mol/L hydrochloric acid. After 24 hours, a reaction yield of 1,5-pentamethylene diamine reached 99%. The reaction mixture after performing the reaction described above for 24 hours was adjusted to have the pH of 2 with 6 mol/L hydrochloric acid, 0.6 parts by weight of activated charcoal (powder activated charcoal PM-SX, manufactured by Sanso Chemical Company) was added to the reaction mixture and was stirred at 25° C. for 1 hour, and filtered through a filter paper (5C, manufactured by Toyo Roshi Kaisha, Ltd.). Next, pH of the filtrate was adjusted to pH 12 by sodium hydroxide, to obtain an aqueous solution of 1,5-pentamethylene diamine (an aqueous solution of 17.0 weight %).

Manufacturing Example A3 (Preparation of 1,5-Pentamethylene Diamine)

100 parts by weight of the aqueous solution of the 1,5-pentamethylene diamine and 100 parts by weight of n-butanol were charged into a separating funnel at 23° C., were mixed for 10 minutes, and then were left to stand for 30 minutes. A lower layer which was a water layer was extracted, and then an upper layer which was an organic layer (the n-butanol including the 1,5-pentamethylene diamine) was extracted. As a result of measuring an extraction rate, the extraction rate was 91.6%. Next, 80 parts by weight of an extracted organic layer was charged into a four-neck flask equipped with a thermometer, a distillation tower, a cooling pipe, and a nitrogen introduction pipe, an oil bath temperature and distilled at 120° C. under reduced pressure of 10 kPa to remove the n-butanol. Next, the oil bath temperature was set to 140° C., the 1,5-pentamethylene diamine was distilled under reduced pressure of 10 kPa, and thus, 1,5-pentamethylene diamine having a purity of 99.9 weight % was obtained.

Manufacturing Example A4 (Polyisocyanate (a-I): Manufacturing of 1,5-Pentamethylene Diisocyanate)

Into a pressurization reactor attached with a jacket in which an electromagnetic induction stirrer, an automatic pressure adjusting valve, a thermometer, a nitrogen introduction line, a phosgene introduction line, a condenser, and a material feed pump, 2000 parts by weight of o-dichlorobenzene was charged. Next, 2300 parts by weight of phosgene was added to the reactor from the phosgene introduction line, and stirred. By introducing cold water through the jacket of the reactor, the temperature inside the reactor was maintained at approximately 10° C. A solution of 400 parts by weight of the 1,5-pentamethylene diamine obtained in Manufacturing Example A3 in 2600 parts by weight of o-dichlorobenzene was fed into the reactor by a feed pump over 60 minutes, and cold phosgenation was initiated at a temperature of lower than or equal to 30° C. and under normal pressure. After the feeding was completed, the solution in the pressurization reactor became a light brown white slurry-like liquid.

Next, the solution in the reactor was pressurized to 0.25 MPa while being gradually heated up to 160° C., and was further subjected to thermal phosgenation at a pressure of 0.25 MPa and a reaction temperature of 160° C. for 90 minutes. Furthermore, 1100 parts by weight of phosgene was further added during the thermal phosgenation. The solution in the pressurization reactor became a light brown clear solution during the thermal phosgenation. After the thermal phosgenation was completed, degassing was performed by introducing nitrogen gas passed through the reactor at 100° C. to 140° C. and 100 L/hour.

Next, the o-dichlorobenzene was distilled under reduced pressure, and then similarly, the 1,5-pentamethylene diisocyanate was distilled under reduced pressure, and thus, 558 parts by weight of 1,5-pentamethylene diisocyanate having a purity of 98.7% was obtained.

Next, 558 parts by weight of 1,5-pentamethylene diisocyanate, and 0.02 parts by weight of tris(tridecyl) phosphite (manufactured by JOHOKU CHEMICAL CO., LTD., Product Name: JP-333E) with respect to 100 parts by weight of the 1,5-pentamethylene diisocyanate were charged into a four-neck flask equipped with a stirrer, a thermometer, a reflux pipe, and a nitrogen introduction pipe, and heated at 210° C. for 2 hours under normal pressure with introducing nitrogen to obtain 553 parts by weight of 1,5-pentamethine diisocyanate having a purity of 98.3%. In the heat treatment, the yield of the 1,5-pentamethylene diisocyanate was 99.6%.

Next, the 1,5-pentamethylene diisocyanate after the heat treatment was charged into a glass flask, rectified under conditions of 127° C. to 132° C. and 2.7 KPa with refluxing by using a rectification device equipped with a distillation pipe which was filled with 4 elements of a filler (manufactured by Sumitomo Heavy Industries, Ltd., Product Name: Sumitomo/Sulzer Laboratory Packing EX Type), a distillation tower (manufactured by SIBATA SCIENTIFIC TECHNOLOGY LTD., Product Name: Distillating Head K Type) which was equipped with a reflux ratio adjusting timer, and a cooler, to obtain 1,5-pentamethylene diisocyanate having a purity of 99.9 weight %. The degree of biomass of the 1,5-pentamethylene diisocyanate was measured by the following method.

(Method for Measuring Degree of Biomass (%) of 1,5-Pentamethylene Diisocyanate)

The degree of biomass (%) of the 1,5-pentamethylene diisocyanate was calculated by measuring a difference in the standard value of the content of radiative carbon (C14) from $CO_2$ generated by combusting a sample using an accelerator mass spectrometry (AMS) according to a test method of American Society for Testing and Materials (ASTM) D6866 (Standard Test Method for Determining the Biobased Content of Natural Range Materials Using Radiocarbon and Isotope Ratio Mass Spectrometry Analysis).

The 1,5-pentamethylene diisocyanate was subjected to methyl carbamation (urethanization) by using methanol, and the degree of biomass of resulted methyl carbamate was measured on the basis of the test method of ASTM D6866. The degree of biomass of the methyl carbamate product was 55.5%. From this value, the degree of biomass of the 1,5-pentamethylene diisocyanate was obtained by the following expression, and was 71%.

Degree of Biomass (%) of 1,5-Pentamethylene Diisocyanate=(Degree of Biomass (%) of Methyl Carbamate Body)×(Number of Carbon Atoms in Molecules of Methyl Carbamate Body)/(Number of Carbon Atoms in Molecules of 1,5-Pentamethylene Diisocyanate)

Synthesis Example A1

Synthesis of Modified 1,5-Pentamethylene Diisocyanate (Preparation of Polyisocyanate (a-II))

Into a four-neck flask equipped with a stirrer, a thermometer, a reflux pipe, and a nitrogen introduction pipe, 500 parts of the 1,5-pentamethylene diisocyanate obtained in Manufacturing Example A4 (hereinafter, also simply referred to as PDI), 1 part of isobutyl alcohol (hereinafter, also simply referred to as IBA), 0.3 parts of 2,6-di(tert-butyl)-4-methyl phenol (hereinafter, also simply referred to as BHT), and 0.3 parts of tris(tridecyl)phosphite (manufactured by JOHOKU CHEMICAL CO., LTD., Product Name: JP-333E) were charged and allowed to react at 80° C. for 2 hours. Next, 0.05 parts of N-(2-hydroxy propyl)-N,N,N-trimethyl ammonium-2-ethyl hexanoate (manufactured by Air Products and Chemicals, Inc., Product Name: DABCO®TMR) as a trimerization catalyst was added. After reacting for 50 minutes, 0.12 parts of o-toluene sulfone amide (hereinafter, also simply referred to as OTS) was added. The obtained reaction mixture passed through a thin film distillation device and was distilled under a vacuum of 0.09 KPa and a temperature of 150° C., to obtain 401 parts of unreacted pentamethylene diisocyanate. To 100 parts of the resulted mixture, 0.02 parts of o-toluene sulfone amide was added to obtain 100 parts of the polyisocyanate (a-II) as a mixture containing the modified 1,5-pentamethylene diisocyanate. The amount of 1,5-pentamethylene diisocyanate-derived component configuring the modified product was 98 weight %.

In the polyisocyanate (a-II), the concentration of unreacted 1,5-pentamethylene diisocyanate was less than 1 weight %, the concentration of mononuclear isocyanurate was 65 weight %, the number average molecular weight was 554.7, the concentration of the isocyanate group was 25%, the average number of functional groups was 3.3, and the degree of biomass was 71%.

The degree of biomass of the polyisocyanate (a-II) is calculated on a carbon basis by the following expression according to the degree of biomass of the 1,5-pentamethylene diisocyanate of 71%. DABCO®TMR which is the used isocyanuration catalyst was a mixture of 33.8 weight % of N-(2-hydroxy propyl)-N,N,N-trimethyl ammonium-2-ethyl hexanoate, 41.2 weight % of 2-ethyl hexanoic acid, and 25 weight % of ethylene glycol.

Degree of Biomass of Polyisocyanate(*a-II*)={500 (Part by Weight of PDI)/154.2(Molecular Weight of PDI)×7(Total Number of Carbon Atoms in One Molecule of PDI)×71(Degree of Biomass % of PDI)}/{500(Part by Weight of PDI)/154.2(Molecular Weight of PDI)×7(Total Number of Carbon Atoms in One Molecule of PDI)+1(Part by Weight of IBA)/74.1(Molecular Weight of IBA)×4(Number of Carbon Atoms in One Molecule of IBA)+0.3(Part by Weight of BHT)/220.4(Molecular Weight of BHT)×15 (Number of Carbon Atoms in One Molecule of BHT)+0.3(Part by Weight of JP-333E)/628(Molecular Weight of JP-333E)×39(Number of Carbon Atoms in One Molecule of JP-333E)+0.02 (Part by Weight of N-(2-Hydroxy Propyl)-N,N, N-Trimethyl Ammonium-2-Ethyl Hexanoate)/ 118.2(Molecular Weight of N-(2-Hydroxy Propyl)-N,N,N-Trimethyl Ammonium-2-Ethyl Hexanoate)×6(Number of Carbon Atoms in One Molecule of N-(2-Hydroxy Propyl)-N,N,N-Trimethyl Ammonium-2-Ethyl Hexanoate)+0.02 (Part by Weight of 2-Ethyl Hexanoic Acid)/ 144.2(Molecular Weight of 2-Ethyl Hexanoic Acid)×8(Number of Carbon Atoms in One Molecule of 2-Ethyl Hexanoic Acid)+0.01(Part by Weight of Ethylene Glycol)/62.1(Molecular Weight of Ethylene Glycol)×2(Number of Carbon Atoms in One Molecule of Ethylene Glycol)+0.12(Part by Weight of OTS)/171.2(Molecular Weight of OTS)×7(Number of Carbon Atoms in One Molecule of OTS)}=71%

Synthesis Example A2

Synthesis of Polythiol (Polythiol (b-I)) Containing 4,8-, 4,7-, and 5,7-Dimercaptomethyl-1,11-Dimercapto-3,6,9-Trithiaundecane as Main Component Into a reactor, 51.2 parts of 2-mercaptoethanol, 26.5 parts of degassed water (the concentration of dissolved oxygen of 2 ppm), and 0.16 parts of an aqueous solution of sodium hydroxide of 49 weight % were charged. To the resulted mixture is added 61.99 parts of plant-derived epichlorohydrin (EPICHLOROHYDRIN(ECH), manufactured by Nippon Solvay, K.K.) dropwise at 9° C. to 11° C. over 6.5 hours and was continuously stirred for 60 minutes. Next, 150.0 parts of an aqueous solution of sodium sulfide of 17.3% was added into the reactor dropwise at 7° C. to 37° C. over 5.5 hours and was stirred for 120 minutes. Then, 279.0 parts of a hydrochloric acid of 35.5% was charged into the reactor, and then, 125.8 parts of thiourea having a purity of 99.9% was added into the reactor and was stirred at 110° C. for 3 hours with reflux, to allow a thiuronium salt formation reaction to proceed. After cooling to 45° C., 214.0 parts of toluene was added and was cooled to 25° C., and then 206.2 parts of an aqueous solution of ammonia of 25% was added into the reactor at 25° C. to 50° C. over 30 minutes and was stirred at 50° C. to 65° C. for 1 hour to proceed a hydrolysis reaction, and a toluene solution of a desired polythiol compound was obtained. The toluene solution was washed two times by using 59.4 parts of a hydrochloric acid of 36% and washing at 35° C. to 40° C. for 30 minutes. Additionally, 118.7 parts of degassed water (the concentration of dissolved oxygen of 2 ppm) was added, and washing was performed five times at 35° C. to 45° C. for 30 minutes. After removing toluene and a small amount of moisture by heating under reduced pressure, the mixture was filtered under reduced pressure through a PTFE membrane filter of 1.2 µm, to obtain 115.9 parts of the polythiol (b-I) containing 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane as a main component (an isomer mixture of [4,8-]/[4,7-]/[5,7-]=85/5/10 (a molar ratio)).

The degree of biomass of the polythiol (b-I) is calculated on a carbon basis by the following expression according to the degree of biomass of the epichlorohydrin of 100%.

Degree of Biomass of Polythiol(*b-I*)={(Number of Epichlorohydrin-Derived Carbon Atoms in Molecules of Polythiol(*b-I*))×(Degree of Biomass (%) of Epichlorohydrin)}/{(Number of Carbon Atoms in Molecules of Polythiol(*b-I*))}=60%

Synthesis Example A3

Synthesis of 4-Mercaptomethyl-1,8-Dimercapto-3,6-Dithiaoctane (Polythiol (b-II))

Into a reactor, 124.6 parts by weight of 2-mercaptoethanol and 18.3 parts by weight of degassed water (the concentration of dissolved oxygen of 2 ppm) were charged. To the resulted mixture is added 101.5 parts by weight of an aqueous solution of sodium hydroxide of 32 weight % dropwise at 12° C. to 35° C. over 40 minutes, after that 73.6 parts by weight of plant-derived epichlorohydrin (EPICHLOROHYDRIN(ECH), manufactured by Nippon Solvay, K.K.) was added into the reactor dropwise at 29° C. to 36° C. over 4.5 hours and was continuously stirred for 40 minutes. From NMR data, it was confirmed that 1,3-bis(2-hydroxy ethylthio)-2-propanol was generated.

Into the reactor, 331.5 parts by weight of a hydrochloric acid of 35.5% was added, and then 183.8 parts by weight of thiourea having a purity of 99.90% was added into the reactor and was stirred at 110° C. for 3 hours with reflux, to allow a thiuronium salt formation reaction to proceed. After cooling to 45° C., and then, 320.5 parts by weight of toluene was added and was cooled to 31° C., and then 243.1 parts by weight of an aqueous solution of ammonia of 25% was added into the reactor at 31° C. to 41° C. over 44 minutes and was stirred at 54° C. to 62° C. for 3 hours, to proceed a hydrolysis reaction, and a toluene solution of polythiol containing 4-mercaptomethyl-1,8-dimercapto-3,6-dithiaoctane as a main component was obtained. The toluene solution was washed by using 162.8 parts by weight of a hydrochloric acid of 35.5% and washing at 35° C. to 43° C. for 1 hour. Additionally, 174.1 parts by weight of degassed water (the concentration of dissolved oxygen of 2 ppm) was added, and washing was performed two times at 35° C. to 45° C. for 30 minutes. By adding 162.1 parts by weight of ammonia water of 0.1%, washing was performed for 30 minutes. By adding 174.2 parts by weight of degassed water (the concentration of dissolved oxygen of 2 ppm), washing was performed two times at 35° C. to 45° C. for 30 minutes. After removing toluene and a small amount of moisture by heating under reduced pressure, the mixture was filtered under reduced pressure through a PTFE membrane filter of 1.2 μm, to obtain 205.0 parts by weight of a polythiol compound containing 4-mercaptomethyl-1,8-dimercapto-3,6-dithiaoctane as a main component.

The degree of biomass of the polythiol compound is calculated on a carbon basis by the following expression according to the degree of biomass of the epichlorohydrin of 100%.

Degree of Biomass of Polythiol={(Number of Epichlorohydrin-Derived Carbon Atoms in Polythiol Molecules)×(Degree of Biomass (%) of Epichlorohydrin)}/{(Number of Carbon Atoms in Molecules of Polythiol)}=42.9%

Example A1

To 0.20 g of Zelec UN (Acidic Phosphoric Acid Ester: Registered Trademark, manufactured by Stepan Company) was added 2.54 g of viosorb 583 (Ultraviolet Absorber: Registered Trademark, manufactured by KYODO CHEMICAL CO., LTD.), 0.05 g of N-benzyl-2-methyl imidazole, and 77.3 g of 1,5-pentamethylene diisocyanate (the polyisocyanate (a-I)), and the resulted mixture was stirred and dissolved at room temperature for 15 minutes, to prepare polyisocyanate solution. The concentration of mononuclear isocyanurate of the polyisocyanate solution was 0%. To the mixture was added 91.7 g of polythiol (the polythiol (b-I)) containing 4,8-, 4,7-, and 5,7-dimercaptomethyl-1,11-dimercapto-3,6,9-trithiaundecane as a main component, and was stirred and mixed at room temperature for 90 minutes, to obtain a homogeneous solution of a monomer mixture. The viscosity of the homogeneous solution was 33 mPa·s. The homogeneous solution was defoamed at room temperature for 30 minutes under reduced pressure, was filtered through a Teflon (Registered Trademark) filter of 1 μm, and then, was injected into a mold formed of a glass mold and tape (designed to have a center thickness of 1.2 mm). The mold was placed into an oven and was gradually heated at 25° C. to 120° C. for 24 hours, to allow polymerization to proceed. After the polymerization was completed, the mold was taken out from the oven, and released, and then annealed at 120° C. for 2 hours, to obtain a resin molding. The resin contained in the molding had a degree of biomass of 67%. The resin molding had a colorless transparent appearance, and in the resin molding, the refractive index (ne) was 1.63, the Abbe number (ve) was 37, and the heat resistance was 77° C.

Degree of Biomass (%) of Resin=[{77.3(Part by Weight of PDI)/154.2(Molecular Weight of PDI)×7(Number of Carbon Atoms in One Molecule of PDI)×71(Degree of Biomass % of PDI)}+{91.7(Part by Weight of Polythiol(*b-I*)/366.7(Molecular Weight of Polythiol(*b-I*))×10 (Number of Carbon Atoms in One Molecule of Polythiol(*b-I*))×60(Degree of Biomass % of Polythiol(*b-I*))}]/[{77.3(Part by Weight of PDI)/154.2(Molecular Weight of PDI)×7(Number of Carbon Atoms in One Molecule of PDI)}+{91.7 (Part by Weight of Polythiol(*b-I*))/366.7(Molecular Weight of Polythiol(*b-I*))×10(Number of Carbon Atoms in One Molecule of Polythiol(*b-I*))}]=67%.

Example A2

TO 0.22 g of Zelec UN (Acidic Phosphoric Acid Ester: Registered Trademark, manufactured by Stepan Company) was added 2.70 g of viosorb 583 (Ultraviolet Absorber: Registered Trademark, manufactured by KYODO CHEMICAL CO., LTD.), 0.05 g of N-benzyl-2-methyl imidazole, and 51.8 g of 1,5-pentamethylene diisocyanate (the polyisocyanate (a-I)), and the resulted mixture was stirred and dissolved at room temperature for 15 minutes, to prepare polyisocyanate solution. The concentration of mononuclear isocyanurate of the polyisocyanate solution was 0%. To the mixture was added 36.7 g of bis(isocyanato methyl)-bicyclo[2.2.1] heptane (a mixture of 2,5-bis(isocyanato methyl)-bicyclo[2.2.1] heptane and 2,6-bis(isocyanato methyl)-bicyclo[2.2.1] heptane) (a polyisocyanate compound A), and was stirred and dissolved at room temperature for 15 minutes, to prepare polyisocyanate solution. To the resulted solution was added 91.7 g of polythiol (the polythiol (b-I)) containing 4,8-, 4,7-, and 5,7-dimercaptomethyl-1,11-dimercapto-3,6,9-trithiaundecane as a main component, and was stirred at room temperature for 90 minutes. The viscosity of the liquid monomer mixture was 56 mPa·s. The monomer mixture was defoamed at room temperature for 30 minutes under reduced pressure, was filtered through a Teflon (Registered Trademark) filter of 1 μm, and then, was injected into a mold formed of a glass mold and tape (designed to have a center thickness of 1.2 mm). The mold was placed into an oven and was gradually heated at 25° C. to 120° C. for 24 hours, to allow polymerization to proceed. After the polymerization was completed, the mold was taken out from the oven, and released, and then annealed at 120° C. for 2 hours, to obtain a resin molding. The resin configuring the molding had a degree of biomass of 47%. In the resin molding, the refractive index (ne) was 1.62, the Abbe number (ve) was 37, and the heat resistance was 90° C.

Degree of Biomass (%) of Resin=[{51.8(Part by Weight of PDI)/154.2(Molecular Weight of PDI)×7(Number of Carbon Atoms in One Molecule of PDI)×71(Degree of Biomass % of PDI)}+{91.7(Part by Weight of Polythiol(*b-I*)/366.7(Molecular Weight of Polythiol(*b-I*))×10 (Number of Carbon Atoms in One Molecule of Polythiol(*b-I*))×60(Degree of Biomass % of Polythiol(*b-I*))}]/[{51.8(Part by Weight of PDI)/154.2(Molecular Weight of PDI)×7(Number of Carbon Atoms in One Molecule of PDI)}+{91.7 (Part by Weight of Polythiol(*b-I*))/366.7(Molecular Weight of Polythiol(*b-I*))×10(Number of Carbon Atoms in One Molecule of Polythiol(*b-I*))}+{36.7(Part by Weight of Polyisocyanate Compound *A*)/206.2(Molecular Weight of Polyisocyanate Compound *A*)×11(Number of Carbon Atoms in One Molecule of Polyisocyanate Compound *A*)}]=47%

Example A3

0.21 g of Zelec UN (Acidic Phosphoric Acid Ester: Registered Trademark, manufactured by Stepan Company), 2.66 g of viosorb 583 (Ultraviolet Absorber: Registered Trademark, manufactured by KYODO CHEMICAL CO., LTD.), 0.05 g of N-benzyl-2-methyl imidazole, and 51.8 g of 1,5-pentamethylene diisocyanate (the polyisocyanate (a-I)) were mixed, and were stirred and dissolved at room temperature for 15 minutes, and thus, polyisocyanate solution was prepared. The concentration of mononuclear isocyanurate of the polyisocyanate solution was 0%. 34.0 g of isophoronediisocyanate (a polyisocyanate compound B) was mixed therewith, and was stirred and dissolved at room temperature for 15 minutes, and thus, polyisocyanate solution was prepared. 91.7 g of polythiol (the polythiol (b-I)) containing 4,8-, 4,7-, and 5,7-dimercaptomethyl-1,11-dimercapto-3,6,9-trithiaundecane as a main component was added thereto, and was stirred at room temperature for 90 minutes. The viscosity of the liquid monomer mixture was 48 mPa·s. The liquid monomer mixture was defoamed at room temperature for 30 minutes under reduced pressure, was filtered through a Teflon (Registered Trademark) filter of 1 μm, and then, was injected into a mold formed of a glass mold and tape (designed to have a center thickness of 1.2 mm). The mold was put into an oven and was gradually heated at 25° C. to 120° C. for 24 hours, and thus, polymerization was performed. After the polymerization was completed, the mold was taken out from the oven, and released, and annealed at 120° C. for 2 hours, to obtain a resin molding. The resin contained in the molding had a degree of biomass of 48%. In the resin molding, the refractive index (ne) was 1.63, the Abbe number (ve) was 36, and the heat resistance was 89° C.

Degree of Biomass (%) of Resin=[{51.8(Part by Weight of PDI)/154.2(Molecular Weight of PDI)×7(Number of Carbon Atoms in One Molecule of PDI)×71(Degree of Biomass % of PDI)}+{91.7(Part by Weight of Polythiol($b$-$I$)/366.7(Molecular Weight of Polythiol($b$-$I$))×10 (Number of Carbon Atoms in One Molecule of Polythiol($b$-$I$))×60(Degree of Biomass % of Polythiol($b$-$I$))}]/[{51.8(Part by Weight of PDI)/154.2(Molecular Weight of PDI)×7(Number of Carbon Atoms in One Molecule of PDI)}+{91.7 (Part by Weight of Polythiol($b$-$I$)/366.7(Molecular Weight of Polythiol($b$-$I$))×10(Number of Carbon Atoms in One Molecule of Polythiol($b$-$I$))}+{34.0(Part by Weight of Polyisocyanate Compound $B$)/222.3(Molecular Weight of Polyisocyanate Compound $B$)×12(Number of Carbon Atoms in One Molecule of Polyisocyanate Compound $B$)}]=48%.

Example A4

TO 0.15 g of Zelec UN (Acidic Phosphoric Acid Ester: Registered Trademark, manufactured by Stepan Company) was added 1.5 g of viosorb 583 (Ultraviolet Absorber: Registered Trademark, manufactured by KYODO CHEMICAL CO., LTD.), 0.08 g of dimethyl tin dichloride, and 27.0 g of 1,5-pentamethylene diisocyanate (the polyisocyanate (a-I)), and the resulted mixture was stirred and dissolved at room temperature for 15 minutes, and then 58.7 g of a 1,5-pentamethylene diisocyanate modified product composition (the polyisocyanate (a-II)) was added to the mixture, to obtain a polyisocyanate solution. The concentration of mononuclear isocyanurate of the polyisocyanate solution was 45%. To the resultant was added 64.2 g of polythiol (the polythiol (b-I)) containing 4,8-, 4,7-, and 5,7-dimercaptomethyl-1,11-dimercapto-3,6,9-trithiaundecane as a main component, and was stirred and mixed at room temperature, to obtain a homogeneous solution of a monomer mixture. The viscosity of the homogeneous solution was 130 mPa·s. The homogeneous solution was defoamed at room temperature for 30 minutes under reduced pressure, was filtered through a Teflon (Registered Trademark) filter of 1 μm, and then, was injected into a mold formed of a glass mold and tape (designed to have a center thickness of 1.2 mm). The mold was placed into an oven and was gradually heated at 25° C. to 120° C. for 24 hours, the polymerization was allowed to proceed. After the polymerization was completed, the mold was taken out from the oven, released, and then, was annealed at 120° C. for 2 hours, to obtain a resin molding. The resin configuring the molding had a degree of biomass of 68%, the resin molding had a colorless transparent appearance, and in the resin molding, the refractive index (ne) was 1.61, the Abbe number (ve) was 38, and the heat resistance was 87° C.

Degree of Biomass (%) of Resin=[{27.0(Part by weight of PDI)/154.2(Molecular Weight of PDI)×7(Number of Carbon Atoms in One Molecule of PDI)×71(Degree of Biomass % of PDI)}+{58.7(Part by weight of Polyisocyanate ($a$-$II$))/554.7(Number Average Molecular Weight of Polyisocyanate($a$-$II$))×23(Average Number of Carbon Atoms in Molecules of Polyisocyanate ($a$-$II$))×71(Degree of Biomass % of Polyisocyanate($a$-$II$))}+{64.2(Part by weight of Polythiol ($b$-$I$)/366.7(Molecular Weight of Polythiol($b$-$I$))×10(Number of Carbon Atoms in One Molecule of Polythiol($b$-$I$))×60(Degree of Biomass % of Polythiol($b$-$I$))}]/[{27.0(Part by weight of PDI)/154.2(Molecular Weight of PDI)×7(Number of Carbon Atoms in One Molecule of PDI)}+{58.7(Part by weight of Polyisocyanate($a$-$II$))/554.7(Number Average Molecular Weight of Polyisocyanate($a$-$II$))×23 (Average Number of Carbon Atoms in Molecules of Polyisocyanate($a$-$II$))}+{64.2(Part by weight of Polythiol($b$-$I$)/366.7(Molecular Weight of Polythiol($b$-$I$))×10(Number of Carbon Atoms in One Molecule of Polythiol($b$-$I$))}]=68%

Examples A5 and A6

Polyisocyanate and polythiol were mixed at a used amount shown in Table 1, along with a catalyst and an additive by the same method as that in Example A4 except that the dimethyl tin dichloride which is a catalyst used in Example A4 was changed to N-benzyl-2-methyl imidazole, and the added amount was changed as shown in Table 1, and then, defoaming, injection into a mold, polymerization, and releasing were performed by the same method as that in Example A4, and thus, resin molded bodies were obtained. Properties of the obtained resin molded bodies are shown in Table 1.

Example A7

To 0.25 g of Zelec UN (Acidic Phosphoric Acid Ester: Registered Trademark, manufactured by Stepan Company) was added 3.2 g of viosorb 583 (Ultraviolet Absorber: Registered Trademark, manufactured by KYODO CHEMICAL CO., LTD.), 0.06 g of N-benzyl-2-methyl imidazole, and 50.3 g of 1,5-pentamethylene diisocyanate (the polyisocyanate (a-I)), and the mixture was stirred and dissolved at room temperature for 15 minutes, and then, 58.7 g of a modified 1,5-pentamethylene diisocyanate (the polyisocyanate (a-II)) was added, to obtain a polyisocyanate solution. The concentration of mononuclear isocyanurate of the polyisocyanate solution was 35%. To the resultant was added 61.4 g of polythiol (the polythiol (b-I)) containing 4,8-, 4,7-, and 5,7-dimercaptomethyl-1,11-dimercapto-3,6,9-trithiaundecane as a main component and 40.3 g of pentaerythritol tetrakis(3-mercaptopropionate) (the polythiol (b-III)), and the resulted mixture was stirred and mixed at room temperature, to obtain a homogeneous solution of a monomer mixture. The viscosity of the homogeneous solution was 40 mPa·s. The homogeneous solution was defoamed at room temperature for 30 minutes under reduced pressure, was filtered through a Teflon (Registered Trademark) filter of 1 μm, and then, was injected into a mold formed of a glass mold and tape (designed to have a center thickness of 1.2 mm). The mold was placed into an oven and was gradually heated at 25° C. to 120° C. for 24 hours, and thus, the polymerization was allowed to proceed. After the polymerization was completed, the mold was taken out from the oven, released, and annealed at 120° C. for 2 hours, to obtain a resin molding. The resin contained in the molding had a degree of biomass of 56%. The resin molding had a colorless transparent appearance, and in the resin molding, the refractive index (ne) was 1.60, the Abbe number (ve) was 39, and the heat resistance was 89° C.

Examples A8 to A10

The same polymerization as that in Example A7 was performed by changing the used amount of polyisocyanate and polythiol as shown in Table 1. In addition, the same polymerization as that in Example A7 was performed except that the ultraviolet absorber was changed to Tinuvin 326 (Registered Trademark, manufactured by BASF SE) in Example A8, and the catalyst was changed to tetrabutyl ammonium bromide in Example A10, and thus, resin molded bodies were obtained. Properties of the obtained resin molded bodies are shown in Table 1.

Examples A11 and A12

Mixing and polymerization were performed by the same method as that in Example A7 except that the pentaerythritol tetrakis(3-mercaptopropionate) (the polythiol (b-III)) which is one of polythiols used in Example A7 was changed to ethylene glycol bis(3-mercaptopropionate) (the polythiol (b-IV)), the catalyst was changed to dimethyl tin dichloride, and the added amount was changed as shown in Table 1, and thus, resin molded bodies were obtained. Properties of the obtained resin molded bodies are shown in Table 1.

Example A13

To 0.27 g of Zelec UN (Acidic Phosphoric Acid Ester: Registered Trademark, manufactured by Stepan Company) was added 3.4 g of viosorb 583 (Ultraviolet Absorber: Registered Trademark, manufactured by KYODO CHEMICAL CO., LTD.), 0.07 g of N-benzyl-2-methyl imidazole, and 38.7 g of 1,5-pentamethylene diisocyanate (the polyisocyanate (a-I)), and resulted mixture was stirred and dissolved at room temperature for 15 minutes, and then, 83.9 g of a 1,5-pentamethylene diisocyanate modified product composition (the polyisocyanate (a-II)) was added, to obtain a polyisocyanate solution. The concentration of mononuclear isocyanurate of the polyisocyanate solution was 45%. To the resultant was added 61.4 g of polythiol (the polythiol (b-I)) containing 4,8-, 4,7-, and 5,7-dimercaptomethyl-1,11-dimercapto-3,6,9-trithiaundecane as a main component and 28.7 g of 4-mercaptomethyl-1,8-dimercapto-3,6-dithiaoctane (the polythiol (b-II)), and the resulted mixture was stirred and mixed at room temperature, to obtain a homogeneous solution of a monomer mixture. The viscosity of the homogeneous solution was 108 mPa·s. The homogeneous solution was defoamed at room temperature for 30 minutes under reduced pressure, was filtered through a Teflon (Registered Trademark) filter of 1 µm, and then, was injected into a mold formed of a glass mold and tape (designed to have a center thickness of 1.2 mm). The mold was placed into an oven and was gradually heated at 25° C. to 120° C. for 24 hours, and thus, the polymerization was allowed to proceed. After the polymerization was completed, the mold was taken out from the oven, released, and annealed at 120° C. for 2 hours, to obtain a resin molding. The resin contained in the molding had a degree of biomass of 66%. The resin molding had a colorless transparent appearance, and in the resin molding, the refractive index (ne) was 1.61, the Abbe number (ve) was 38, and the heat resistance was 87° C.

Example A14

To 0.25 g of Zelec UN (Acidic Phosphoric Acid Ester: Registered Trademark, manufactured by Stepan Company) was added 3.1 g of viosorb 583 (Ultraviolet Absorber: Registered Trademark, manufactured by KYODO CHEMICAL CO., LTD.), 0.06 g of N-benzyl-2-methyl imidazole, and 27.0 g of 1,5-pentamethylene diisocyanate (the polyisocyanate (a-I)), and the resulted mixture was stirred and dissolved at room temperature for 15 minutes, and then, 55.4 g of a modified 1,5-pentamethylene diisocyanate (the polyisocyanate (a-II)) was added. The concentration of mononuclear isocyanurate of the polyisocyanate solution was 44%. To the resultant was added 33.0 g of bis(isocyanato methyl)-bicyclo[2.2.1] heptane (a mixture of 2,5-bis(isocyanato methyl)-bicyclo[2.2.1] heptane and 2,6-bis(isocyanato methyl)-bicyclo[2.2.1] heptane), and was mixed, to prepare a polyisocyanate solution. To the resulted mixture was added 91.7 g of polythiol (the polythiol (b-I)) containing 4,8-, 4,7-, and 5,7-dimercaptomethyl-1,11-dimercapto-3,6,9-trithiaundecane as a main component, and was stirred and mixed at room temperature, to obtain a homogeneous solution of a monomer mixture. The viscosity of the homogeneous solution was 45 mPa·s. The homogeneous solution was defoamed at room temperature for 30 minutes under reduced pressure, was filtered through a Teflon (Registered Trademark) filter of 1 µm, and then, was injected into a mold formed of a glass mold and tape (designed to have a center thickness of 1.2 mm). The mold was placed into an oven and was gradually heated at 25° C. to 120° C. for 24 hours, and the polymerization was allowed to proceed. After the polymerization was completed, the mold was taken out from the oven, released, and annealed at 120° C. for 2 hours, to obtain a resin molding. The resin contained in the molding had a degree of biomass of 52%. The resin molding had a colorless transparent appearance, and in the resin molding, refractive index (ne) was 1.62, the Abbe number (ve) was 37, and the heat resistance was 98° C.

Example A15

To 0.05 g of Zelec UN (Acidic Phosphoric Acid Ester: Registered Trademark, manufactured by Stepan Company) was added 0.7 g of viosorb 583 (Ultraviolet Absorber: Registered Trademark, manufactured by KYODO CHEMICAL CO., LTD.), 0.02 g of dimethyl tin dichloride, and 6.0 g of 1,5-pentamethylene diisocyanate (the polyisocyanate (a-I)), and the resulted mixture was stirred and dissolved at room temperature for 15 minutes, and then, 15.0 g of a modified 1,5-pentamethylene diisocyanate composition (the polyisocyanate (a-II)) was added. The concentration of mononuclear isocyanurate of the polyisocyanate solution was 46%. Further, 5.67 g of isophorone diisocyanate was added, and was mixed, to prepare a polyisocyanate solution. Then, to the mixture was added 20.0 g of polythiol (the polythiol (b-I)) containing 4,8-, 4,7-, and 5,7-dimercaptomethyl-1,11-dimercapto-3,6,9-trithiaundecane as a main component, and was stirred and mixed at room temperature, obtain a homogeneous solution of a monomer mixture. The viscosity of the homogeneous solution was 72 mPa·s. The homogeneous solution was defoamed at room temperature for 30 minutes under reduced pressure, was filtered through a Teflon (Registered Trademark) filter of 1 µm, and then, was injected into a mold formed of a glass mold and tape (designed to have a center thickness of 1.2 mm). The mold was placed into an oven and was gradually heated at 25° C. to 120° C. for 24 hours, and thus, the polymerization was allowed to proceed. After the polymerization was completed, the mold was taken out from the oven, released, and annealed at 120° C. for 2 hours, to obtain a resin molding. The resin contained in the molding had a degree of biomass of 56%. The resin molding had a colorless transparent appearance, and in the resin molding, the refractive index (ne) was 1.62, the Abbe number (ve) was 37, and the heat resistance was 67° C.

Example A16

To 0.21 g of Zelec UN (Acidic Phosphoric Acid Ester: Registered Trademark, manufactured by Stepan Company) was added 3.10 g of viosorb 583 (Ultraviolet Absorber: Registered Trademark, manufactured by KYODO CHEMICAL CO., LTD.), 0.10 g of dimethyl tin dichloride, and 43.5 g of 1,5-pentamethylene diisocyanate (the polyisocyanate (a-I)), the resulted mixture was stirred and dissolved at room temperature for 15 minutes, and then to the resultant was added 69.8 g of a modified 1,5-pentamethylene diisocyanate composition (the polyisocyanate (a-II)). The concentration of mononuclear isocyanurate of the polyisocyanate solution was 40%. Further, 16.5 g of isophorone diisocyanate was added to the mixture, and was mixed to prepare polyisocyanate solution. Then, to the resultant was added 77.5 g of polythiol (the polythiol (b-I)) containing 4,8-, 4,7-, and 5,7-dimercaptomethyl-1,11-dimercapto-3,6,9-trithiaundecane as a main component and 34.5 g of pentaerythritol tetrakis(3-mercaptopropionate) (the polythiol (b-III)), and was stirred and mixed at room temperature, to obtain a homogeneous solution of a monomer mixture. The viscosity of the homogeneous solution was 65 mPa·s. The homogeneous solution was defoamed at room temperature for 30 minutes under reduced pressure, was filtered through a Teflon (Registered Trademark) filter of 1 µm, and then, was injected into a mold formed of a glass mold and tape (designed to have a center thickness of 1.2 mm). The mold was placed into an oven and was gradually heated at 25° C. to 120° C. for 24 hours, and the polymerization was allowed to proceed. After the polymerization was completed, the mold was taken out from the oven, released, and annealed at 120° C. for 2 hours, to obtain a resin molding. The resin contained in the molding had a degree of biomass of 52%. The resin molding had a colorless transparent appearance, and in the resin molding, the refractive index (ne) was 1.60, the Abbe number (ve) was 39, and the heat resistance was 71° C.

Comparative Example A1

To 0.31 g of Zelec UN (Acidic Phosphoric Acid Ester: Registered Trademark, manufactured by Stepan Company) was added 3.9 g of viosorb 583 (Ultraviolet Absorber: Registered Trademark, manufactured by KYODO CHEMICAL CO., LTD.), 0.08 g of N-benzyl-2-methyl imidazole, and 167.8 g of a modified 1,5-pentamethylene diisocyanate composition (the polyisocyanate (a-II)), to prepare a polyisocyanate solution. The concentration of mononuclear isocyanurate of the polyisocyanate solution was 65%. To the resultant was added 91.7 g of polythiol (the polythiol (b-I)) containing 4,8-, 4,7-, and 5,7-dimercaptomethyl-1,11-dimercapto-3,6,9-trithiaundecane as a main component which was obtained in Synthesis Example A2, and was stirred and mixed at room temperature, to obtain a homogeneous solution of a monomer mixture. The viscosity of the homogeneous solution was 1185 mPa·s. The homogeneous solution was deformed at room temperature for 30 minutes under reduced pressure, and was attempted to be subjected to filtration, but the viscosity was high and the filtration was not easily performed, and thus, the solution was injected into the mold in this state, and the same polymerization as that in Example A was performed. After the polymerization was completed, releasing was performed from the mold, and then, annealing was further performed at 120° C. for 2 hours, and thus, a resin molding was obtained. However, remarkable distortion or air bubbles were observed in the obtained resin molding, and the properties were not able to be evaluated.

TABLE 1

| | Polyisocyanate | | | | | Polythiol | | | | |
|---|---|---|---|---|---|---|---|---|---|---|
| | Polyisocyanate (a) | | | | Total | Polythiol (b) | | | | Total |
| | (a-I) g/NCO Mol | (a-II) g/NCO Mol | Concentration of mononuclear (wt %) | Other Polyisocyanate g/NCO Mol | NCO Mol | (b-I) g/SH Mol | (b-II) g/SH Mol | (b-III) g/SH Mol | (b-IV) g/SH Mol | SH Mol |
| Example A1 | 77.3/1.00 | | 0 | | 1.00 | 91.7/1.00 | | | | 1.00 |
| Example A2 | 51.8/0.67 | | 0 | Compound A 36.7/0.33 | 1.00 | 91.7/1.00 | | | | 1.00 |
| Example A3 | 51.8/0.67 | | 0 | Compound B 34.0/0.33 | 1.00 | 91.7/1.00 | | | | 1.00 |
| Example A4 | 27.0/0.35 | 58.7/0.35 | 45 | | 0.70 | 64.2/0.70 | | | | 0.70 |
| Example A5 | 38.7/0.50 | 83.9/0.50 | 45 | | 1.00 | 91.7/1.00 | | | | 1.00 |
| Example A6 | 51.8/0.67 | 55.4/0.33 | 34 | | 1.00 | 91.7/1.00 | | | | 1.00 |
| Example A7 | 50.3/0.65 | 58.7/0.35 | 35 | | 1.00 | 61.4/0.67 | | 40.3/0.33 | | 1.00 |
| Example A8 | 14.5/0.19 | 16.9/0.10 | 35 | | 0.29 | 19.8/0.22 | | 8.8/0.07 | | 0.29 |
| Example A9 | 38.7/0.50 | 83.9/0.50 | 45 | | 1.00 | 61.4/0.67 | | 40.3/0.33 | | 1.00 |
| Example A10 | 43.5/0.56 | 94.5/0.56 | 45 | | 1.12 | 77.5/0.84 | | 34.5/0.28 | | 1.12 |
| Example A11 | 35.8/0.46 | 77.8/0.46 | 45 | | 0.92 | 79.8/0.87 | | | 6.2/0.05 | 0.92 |
| Example A12 | 34.0/0.44 | 74.9/0.44 | 45 | | 0.88 | 43.0/0.47 | | | 49.0/0.41 | 0.88 |
| Example A13 | 38.7/0.50 | 83.9/0.50 | 45 | | 1.00 | 61.4/0.67 | 28.7/0.33 | | | 1.00 |
| Example A14 | 27.0/0.35 | 55.4/0.33 | 44 | Compound A 33.0/0.32 | 1.00 | 91.7/1.00 | | | | 1.00 |
| Example A15 | 6.00/0.08 | 15.0/0.09 | 46 | Compound B 5.67/0.05 | 0.22 | 20.0/0.22 | | | | 0.22 |

TABLE 1-continued

| | | | | | | | | |
|---|---|---|---|---|---|---|---|---|
| Example A16 | 43.5/0.56 | 69.8/0.41 | 40 | Compound B 16.5/0.15 | 1.12 | 77.5/0.84 | 34.5/0.28 | 1.12 |
| Comparative Example A1 | | 167.8/1.00 | 65 | | 1.00 | 91.7/1.00 | | 1.00 |

| | | Additive | | Viscosity of Liquid | Lens Properties | | | |
|---|---|---|---|---|---|---|---|---|
| | Catalyst (g) | Zelec UN (g) | Ultraviolet Absorber (g) | Monomer Mixture (mPa · s) | Degree of Biomass (%) | Heat Resistance Tg (° C.) | Refractive Index | Abbe Number |
| Example A1 | NBMI 0.05 | 0.20 | 2.54 | 33 | 67 | 77 | 1.63 | 37 |
| Example A2 | NBMI 0.05 | 0.22 | 2.70 | 56 | 47 | 90 | 1.62 | 37 |
| Example A3 | NBMI 0.05 | 0.21 | 2.66 | 48 | 48 | 89 | 1.63 | 36 |
| Example A4 | DMC 0.08 | 0.15 | 1.5 | 130 | 68 | 87 | 1.61 | 38 |
| Example A5 | NBMI 0.06 | 0.26 | 3.2 | 123 | 67 | 89 | 1.61 | 38 |
| Example A6 | NBMI 0.05 | 0.24 | 3.0 | 37 | 67 | 86 | 1.62 | 37 |
| Example A7 | NBMI 0.06 | 0.25 | 3.2 | 40 | 56 | 89 | 1.60 | 39 |
| Example A8 | NBMI 0.02 | 0.07 | 0.3* | 58 | 59 | 86 | 1.60 | 39 |
| Example A9 | NBMI 0.07 | 0.27 | 3.4 | 136 | 57 | 88 | 1.60 | 39 |
| Example A10 | TBAB 0.05 | 0.25 | 3.8 | 132 | 60 | 85 | 1.60 | 39 |
| Example A11 | DMC 0.10 | 0.20 | 2.0 | 120 | 66 | 84 | 1.61 | 38 |
| Example A12 | DMC 0.10 | 0.20 | 2.0 | 105 | 54 | 62 | 1.58 | 40 |
| Example A13 | NBMI 0.07 | 0.27 | 3.4 | 108 | 66 | 87 | 1.61 | 38 |
| Example A14 | NBMI 0.06 | 0.25 | 3.1 | 45 | 52 | 98 | 1.62 | 37 |
| Example A15 | DMC 0.02 | 0.05 | 0.7 | 72 | 56 | 67 | 1.62 | 37 |
| Example A16 | DMC 0.10 | 0.21 | 3.1 | 65 | 52 | 71 | 1.60 | 39 |
| Comparative Example A1 | NBMI 0.08 | 0.31 | 3.9 | 1185 | Distortion and Air Bubbles Occur Molding Properties of Lens are Poor | | | |

The compounds shown in Table 1 are as follows.

Compound A: Mixture of 2,5-Bis(Isocyanato Methyl)-Bicyclo[2.2.1] Heptane and 2,6-Bis(Isocyanato Methyl)-Bicyclo[2.2.1] Heptane Compound B: Isophorone Diisocyanate DMC: Dimethyl Tin Dichloride NBMI: N-Benzyl-2-Methyl Imidazole TBAB: Tetrabutyl Ammonium Bromide Example B (Degree of Biomass (%))

The degree of biomass is obtained by a calculation method on a carbon basis, that is, the degree of biomass is defined as follows.

Degree of Biomass (%)={(Number of Plant-Derived Carbon Atoms)/(Number of Plant-Derived Carbon Atoms+Number of Petroleum-Derived Carbon Atoms)}×100

(Calculation Method of Degree of Biomass (%) of Polythiol (b))

The degree of biomass of the synthesized polythiol was calculated on a carbon basis by using epichlorohydrin which was obtained from a plant-derived material and had a degree of biomass of 100% on a carbon basis.

Degree of Biomass Polythiol={(Number of Epichlorohydrin-Derived Carbon Atoms in Polythiol Molecules)×(Degree of biomass (%) of Epichlorohydrin)}/{(Number of Carbon Atoms in Polythiol Molecules)}

(Calculation Method of Degree of Biomass (%) of Polythiourethane Resin)

The degree of biomass of the polythiourethane resin was calculated on a carbon basis according to the degree of biomass of the aliphatic polyisocyanate (a), the polythiol (b), and other polymerizable compounds.

(Degree of Biomass (%) of Polythiourethane Resin)
={(Number of Carbon Atoms of Used Polyisocyanate(a1))×(Degree of Biomass (%) of Polyisocyanate(a1))+(Number of Carbon Atoms of Used Polyisocyanate(a2))×(Degree of Biomass (%) of Polyisocyanate(a2))+(Number of Carbon Atoms of Used Polythiol(b))×(Degree of Biomass (%) of Polythiol(b))/{(Number of Carbon Atoms of Used Polyisocyanate(a1))+(Number of Carbon Atoms of Used Polyisocyanate(a2))+(Total Number of Carbon Atoms of Other Polyisocyanate)+(Number of Carbon Atoms of Used Polythiol(b))}

(Measurement Method of Unreacted 1,5-Pentamethylene Diisocyanate Concentration (%) in Polyisocyanate (a3))

The concentration of unreacted 1,5-pentamethylene diisocyanate in polyisocyanate (a3) containing the modified product was obtained from a calibration curve drawn by using 1,5-pentamethylene diisocyanate obtained in Manufacturing Example B4 described above as a specimen by using the following device.

Device: Prominence (manufactured by Shimadzu Corporation)

Column: SHISEIDO SILICA SG-120

Column Temperature: 40° C.

Eluent: n-Hexane/Methanol/1,2-Dichloroethane=90/5/5 (Volume Ratio)

Flow Rate: 0.2 ml/min

Detector: UV 225 nm

R. Time: 16.9 min

Measurement Solution Adjustment: 0.1 g of a sample and dibenzyl amine having a molar ratio approximately 20 times the molar ratio of the sample were added to a volumetric flask of 50 ml, and 1,2-dichloroethane was mixed thereto, and thus, a measurement solution was obtained.

Measurement: 1 μL of the measurement solution was injected, and thus, measurement was performed.

(Measurement Method of Concentration (%) of Isocyanate Group of Polyisocyanate (a3))

The concentration of an isocyanate group of the polyisocyanate was obtained by being measured by an n-dibutyl amine method using a potential difference titration device on the basis of JIS K-1556.

(Measurement Method of Concentration (%) of Mononuclear Isocyanurate in Polyisocyanate (a3))

An area ratio of a peak corresponding to a molecular weight three times the molecular weight of 1,5-pentamethylene isocyanate to the total peak area was obtained as the concentration (%) of mononuclear isocyanurate in the polyisocyanate (a3) according to a chromatogram obtained by gel permeation chromatography by using the following device.

Device: HLC-8020 (manufactured by TOSOH CORPORATION)

Column: Series Connection of G1000HXL, G2000HXL, and G3000HXL (manufactured by TOSOH CORPORATION)

Column Temperature: 40° C.

Eluent: Tetrahydrofuran

Flow Rate: 0.8 ml/min

Detector: Differential Refractometer

R. Time: Mononuclear Isocyanurate 27.2 min

Standard Substance: Polyethylene Oxide (TSK Standard Polyethylene Oxide, manufactured by TOSOH CORPORATION)

Measurement: 30 mg of a sample was dissolved in 10 ml of tetrahydrofuran, and 100 μL of the obtained solution was injected, and thus, measurement was performed.

(Calculation Method of Average Number of Functional Groups of Polyisocyanate (a3))

The average number of functional groups of the polyisocyanate (a3) was calculated by the following expression using a number average molecular weight obtained by the same measurement as that of the concentration of the mononuclear isocyanurate in the polyisocyanate (a3) and the concentration of the isocyanate group of the polyisocyanate (a3).

(Average Number of Functional Groups of Polyisocyanate($a3$))=(Number Average Molecular Weight of Polyisocyanate($a3$))×(Concentration (%) of Isocyanate Group of Polyisocyanate ($a3$))/4202

(Performance Testing Method of Lens)

Handling properties were evaluated according to viscosity of a liquid monomer mixture at the time of performing polymerization.

Viscosity: The viscosity of the liquid monomer mixture at 20° C. was measured by an E-type viscometer (DVU-EII Type, manufactured by TOKYO KEIKI INC.).

In addition, a lens obtained by polymerization was evaluated by performing a performance test. In the performance test, a refractive index, the Abbe number, and heat resistance were evaluated by the following testing method.

Refractive Index (ne) and Abbe Number (ve): Measured at 20° C. by using Pulfrich refractometer KPR-30 manufactured by Shimadzu Corporation.

Heat Resistance: Glass transition temperature (Tg) in a TMA penetration method (a load of 50 g and a pin tip of 0.5 mmφ) was set as heat resistance by using TMA-60 manufactured by Shimadzu Corporation.

Reference Preparation Example B

Synthesis of 1,5-Pentamethylene Diisocyanate Using Plant-Derived Material

Preparation Example B1 (Preparation of Fungus Body Lysate Solution)

(Cloning of Lysine Decarbonation Enzyme Gene (cadA))

Genome DNA prepared according to an ordinary method from a cluster of *Escherichia coli* W3110 (ATCC27325) was used for molding PCR.

In a primer for PCR, oligonucleotide (synthesized through commission to Life Technologies Japan Ltd.) having a base sequence according to Sequence Numbers 1 and 2 designed on the basis of a base sequence of lysine decarbonation enzyme gene (cadA) (GenBank Accession No. AP009048) was used. The primer has each restriction enzyme recognition sequence of KpnI and XbaI in the vicinity of a 5' terminal.

PCR was performed by using 25 μL of a PCR reaction mixture including 1 ng/μL of the genome DNA and 0.5 pmol/μL of each of the primers in conditions where a reaction cycle including Modification: 94° C. and 30 seconds, Annealing: 55° C. and 30 seconds, and Extension Reaction: 68° C. and 2 minutes was repeated 30 times.

A PCR reaction product and Plasmid pUC18 (manufactured by TAKARA SHUZO CO., LTD.) were digested by KpnI and XbaI and were connected by using Ligation High (manufactured by TOYOBO CO., LTD.), and then *Escherichia coli* DH5α (manufactured by TOYOBO CO., LTD.) was transformed by using the obtained recombinant plasmid. The transformant was cultured in an LB agar medium including 100 μg/mL of Ampicillin (Am) and X-Gal (5-bromo-4-chloro-3-indolyl-β-D-galactoside), to obtain a transformant which had resistance to Am as a white colony. The plasmid was extracted by the transformant obtained as described above.

It was confirmed that the base sequence of a segment of DNA introduced into the plasmid was a base sequence according to Sequence Number 3 using a general determination method of a base sequence.

The plasmid having DNA which encodes the obtained lysine decarbonation enzyme was named pCADA. The transformed *escherichia coli* was cultured by using pCADA, and thus, it was possible to produce a lysine decarbonation enzyme having an amino acid sequence according to Sequence Number 4.

(Preparation of Transformant)

A cluster of *Escherichia coli* W3110 was transformed by a general method using pCADA, and the obtained transformant was named W/pCADA.

The transformant was inoculated into 500 ml of an LB medium including 100 μg/mL of Am in an erlenmeyer flask which was equipped with a baffle and was subjected to shake culture at 30° C. until OD (660 nm) became 0.5, and then isopropyl-β-thiogalactopyranoside (IPTG) was added such that the amount of IPTG became 0.1 mmol/L and was subjected to shake culture for 14 hours. A culture solution was centrifuged at 8000 rpm for 20 minutes, to obtain a fungus body. The fungus body was suspended in 20 mmol/L of a buffer solution of sodium phosphate (pH 6.0), and was subjected to ultrasonic crushing, to obtain a fungus body lysate solution.

Preparation Example B2 (Manufacturing of Aqueous Solution of 1,5-Pentamethylene Diamine)

In a flask, 120 parts by weight of a substrate solution was prepared such that L-lysine monohydrochloride (manufactured by Wako Pure Chemical Industries, Ltd.) therein had the final concentration of 45 weight % and a pyridoxal phosphoric acid (manufactured by Wako Pure Chemical Industries, Ltd.) had the final concentration of 0.15 mmol/L. Next, the W/pCADA fungus body lysate solution described above (preparing a dried fungus body having a conversion weight of 0.3 g) was added and a reaction was initiated. The reaction conditions were 37° C. and 200 rpm. The reaction mixture was adjusted to have the pH of 6 with 6 mol/L hydrochloric acid. After 24 hours, a reaction yield of 1,5-pentamethylene diamine reached 99%. The reaction mixture after performing the reaction described above for 24 hours was adjusted to have the pH of 2 with 6 mol/L hydrochloric acid, and 0.6 parts by weight of activated charcoal (powder activated charcoal PM-SX, manufactured by Sanso Chemical Company) was added to the reaction mixture and was stirred at 25° C. for 1 hour, and then filtered by using filter paper (5C, manufactured by Toyo Roshi Kaisha, Ltd.). Next, the filtrate was adjusted to have the pH of 12 with sodium hydroxide, to obtain an aqueous solution of 1,5-pentamethylene diamine (an aqueous solution of 17.0 weight %).

Manufacturing Example B3 (Preparation of 1,5-Pentamethylene Diamine)

Into a separating funnel, 100 parts by weight of the aqueous solution of the 1,5-pentamethylene diamine and 100 parts by weight of n-butanol were charged at 23° C., and the resultant was mixed for 10 minutes, and then left to stand for 30 minutes. A lower layer which was a water layer was extracted, and then an upper layer which was an organic layer (the n-butanol including the 1,5-pentamethylene diamine) was extracted. As a result of measuring an extraction rate, the extraction rate was 91.6%. Next, 80 parts by weight of an extracted organic layer was charged into a four-neck flask equipped with a thermometer, a distillation tower, a cooling pipe, and a nitrogen introduction pipe, an oil bath temperature was set to 120° C., and the n-butanol was distilled under reduced pressure of 10 kPa. Next, the oil bath temperature was set to 140° C., the 1,5-pentamethylene diamine was distilled under reduced pressure of 10 kPa, and thus, 1,5-pentamethylene diamine having a purity of 99.9 weight % was obtained.

Manufacturing Example B4 (Manufacturing of 1,5-Pentamethylene Diisocyanate (Aliphatic Polyisocyanate (a1))

Into a pressurization reactor equipped with a jacket in which an electromagnetic induction stirrer, an automatic pressure adjusting valve, a thermometer, a nitrogen introduction line, a phosgene introduction line, a condenser, and a material feed pump, 2000 parts by weight of o-dichlorobenzene was charged. Into the reactor, 2300 parts by weight of phosgene was added from the phosgene introduction line, and was stirred. By introducing cold water through the jacket of the reactor, the temperature inside the reactor was maintained at approximately 10° C. A solution of 400 parts by weight of the 1,5-pentamethylene diamine obtained in Manufacturing Example B3 in 2600 parts by weight of o-dichlorobenzene was fed into the reactor by a feed pump for 60 minutes, and cold phosgenation was initiated at a temperature of lower than or equal to 30° C. and under normal pressure. After the feeding was completed, the solution in the pressurization reactor became a light brown white slurry-like liquid.

Next, the solution in the reactor was pressurized to 0.25 MPa while being gradually heated up to 160° C., and was further subjected to thermal phosgenation at a pressure of 0.25 MPa and a reaction temperature of 160° C. for 90 minutes. Furthermore, 1100 parts by weight of phosgene was added during the thermal phosgenation. The solution in the pressurization reactor became a light brown clear solution during the thermal phosgenation. After the thermal phosgenation was completed, by introducing nitrogen gas through the reactor at 100° C. to 140° C. and 100 L/hour, the reaction mixture was degassed.

Next, the o-dichlorobenzene was distilled under reduced pressure, and then similarly, the 1,5-pentamethylene diisocyanate was distilled under reduced pressure, and thus, 558 parts by weight of 1,5-pentamethylene diisocyanate having a purity of 98.7% was obtained.

Next, 558 parts by weight of 1,5-pentamethylene diisocyanate, and 0.02 parts by weight of tris(tridecyl)phosphite (manufactured by JOHOKU CHEMICAL CO., LTD., Product Name: JP-333E) with respect to 100 parts by weight of the 1,5-pentamethylene diisocyanate were charged into a four-neck flask equipped with a stirrer, a thermometer, a reflux pipe, and a nitrogen introduction pipe, and the resulted mixture was heated at 210° C. for 2 hours under normal pressure with introducing nitrogen, and thus, 553 parts by weight of 1,5-pentamethine diisocyanate having a purity of 98.3% was obtained. In the heat treatment, the yield of the 1,5-pentamethylene diisocyanate was 99.6%.

Next, the 1,5-pentamethylene diisocyanate after the heat treatment was charged into a glass flask, rectified under conditions of 127° C. to 132° C. and 2.7 KPa while refluxing by using a rectification device equipped with a distillation pipe which was filled with 4 elements of a filler (manufactured by Sumitomo Heavy Industries, Ltd., Product Name: Sumitomo/Sulzer Laboratory Packing EX Type), a distillation tower (manufactured by SIBATA SCIENTIFIC TECHNOLOGY LTD., Product Name: Distillating Head K Type) which was equipped with a reflux ratio adjusting timer, and a cooler, and thus, 1,5-pentamethylene diisocyanate (aliphatic polyisocyanate (a1)) having a purity of 99.9 weight % was obtained. The degree of biomass of the 1,5-pentamethylene diisocyanate was measured by the following method, and thus, the degree of biomass was 71%.

(Measurement Method of Degree of Biomass (%) of 1,5-Pentamethylene Diisocyanate)

The degree of biomass (%) of the 1,5-pentamethylene diisocyanate was calculated by measuring a difference in the standard value of the content of radiative carbon (C14) from $CO_2$ generated by combusting a sample using an accelerator mass spectrometry (AMS) according to a test method of American Society for Testing and Materials (ASTM) D6866 (Standard Test Method for Determining the Biobased Content of Natural Range Materials Using Radiocarbon and Isotope Ratio Mass Spectrometry Analysis).

The 1,5-pentamethylene diisocyanate was subjected to methyl carbamation (urethanization) by methanol, and the degree of biomass of a methyl carbamate body was measured on the basis of the test method of ASTM D6866. As a result, the degree of biomass of the methyl carbamate body was 55.5%. From this value, the degree of biomass of the 1,5-pentamethylene diisocyanate was obtained by the following expression, and was 71%.

Degree of Biomass (%) of 1,5-Pentamethylene Diisocyanate=(Degree of Biomass (%) of Methyl Carbamate Body)×(Number of Carbon Atoms in Molecules of Methyl Carbamate Body)/(Number of Carbon Atoms in Molecules of 1,5-Pentamethylene Diisocyanate)

Synthesis Example B1

Synthesis of Polythiol (Polythiol (b) Compound F) Containing 4,8-, 4,7-, and 5,7-Dimercaptomethyl-1, 11-Dimercapto-3,6,9-Trithiaundecane as Main Component Into a reactor, 51.2 parts of 2-mercaptoethanol, 26.5 parts of degassed water (the concentration of dissolved oxygen of 2 ppm), and 0.16 parts of a 49 weight % aqueous solution of sodium hydroxide were charged. Into the reactor, 61.99 parts of plant-derived epichlorohydrin (EPICHLOROHYDRIN (ECH), manufactured by Nippon Solvay, K.K.) was added dropwise at 9° C. to 11° C. over 6.5 hours and was continuously stirred for 60 minutes. Next, 150.0 parts of an aqueous solution of sodium sulfide of 17.3% was added dropwise into the reactor at 7° C. to 37° C. over 5.5 hours and was stirred for 120 minutes. Then, 279.0 parts of a hydrochloric acid of 35.5% was added into the reactor, and then, 125.8 parts of thiourea having a purity of 99.9% was added into the reactor and was stirred at 110° C. for 3 hours with reflux, to allow a thiuronium salt formation reaction to proceed. After cooling to 45° C., 214.0 parts of toluene was added, cooled to 25° C., and 206.2 parts of an aqueous solution of ammonia of 25% was added into the reactor at 25° C. to 50° C. over 30 minutes and was stirred at 50° C. to 65° C. for 1 hour, and the hydrolysis reaction was allowed to proceed, and a toluene solution of a desired polythiol compound was obtained. To the toluene solution was washed two times with 59.4 parts of a hydrochloric acid of 36% at 35° C. to 40° C. for 30 minutes. The solution was washed with 118.7 parts of degassed water (the concentration of dissolved oxygen of 2 ppm) five times at 35° C. to 45° C. for 30 minutes. After removing toluene and a small amount of moisture by heating under reduced pressure, the resultant was filtered reduced pressure through a PTFE membrane filter of 1.2 µm, and thus, 115.9 parts of the polythiol containing 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane as a main component was obtained (an isomer mixture of [4,8-]/[4,7-]/[5,7-]=85/5/10 (a molar ratio)).

The degree of biomass of the polythiol compound is calculated on a carbon basis by the following expression according to the degree of biomass of the epichlorohydrin of 100%.

Degree of Biomass of Polythiol={(Number of Epichlorohydrin-Derived Carbon Atoms in Molecules of Polythiol)×(Degree of Biomass (%) of Epichlorohydrin)}/{(Number of Carbon Atoms in Molecules of Polythiol)}=60%

Synthesis Example B2

Synthesis of 4-Mercaptomethyl-1,8-Dimercapto-3,6-Dithiaoctane (Polythiol (b) Compound G)

Into a reactor, 124.6 parts by weight of 2-mercaptoethanol and 18.3 parts by weight of degassed water (the concentration of dissolved oxygen of 2 ppm) were charged. Into the reactor, 101.5 parts by weight of an aqueous solution of sodium hydroxide of 32 weight % was added dropwise at 12° C. to 35° C. over 40 minutes, and then, 73.6 parts by weight of plant-derived epichlorohydrin (EPICHLOROHYDRIN(ECH), manufactured by Nippon Solvay, K.K.) was added dropwise into the reactor at 29° C. to 36° C. over 4.5 hours and was continuously stirred for 40 minutes. From NMR data, it was confirmed that 1,3-bis(2-hydroxy ethylthio)-2-propanol was generated.

Into the reactor, 331.5 parts by weight of a hydrochloric acid of 35.5% was added, and then, 183.8 parts by weight of thiourea having a purity of 99.90% was added into the reactor and was stirred at 110° C. for 3 hours with reflux, and thus, a thiuronium salt formation reaction was allowed to proceed. After cooling to 45° C., 320.5 parts by weight of toluene was added, cooled to 31° C., then 243.1 parts by weight of an aqueous solution of ammonia of 25% was added into the reactor at 31° C. to 41° C. over 44 minutes and was stirred at 54° C. to 62° C. for 3 hours, and thus, a hydrolysis reaction was allowed to proceed, and a toluene solution of polythiol containing 4-mercaptomethyl-1,8-dimercapto-3,6-dithiaoctane as a main component was obtained. To the toluene solution was washed with 162.8 parts by weight of a hydrochloric acid of 35.5% at 35° C. to 43° C. for 1 hour. The toluene solution was washed with 174.1 parts by weight of degassed water (the concentration of dissolved oxygen of 2 ppm) two times at 35° C. to 45° C. for 30 minutes. The toluene solution was washed with 162.1 parts by weight of ammonia water of 0.1% for 30 minutes. The toluene solution was washed with 174.2 parts by weight of degassed water (the concentration of dissolved oxygen of 2 ppm) two times at 35° C. to 45° C. for 30 minutes. After removing toluene and a small amount of moisture by heating under reduced pressure, the resultant was filtered under reduced pressure through a PTFE membrane filter of 1.2 µm, and thus, 205.0 parts by weight of a polythiol compound containing 4-mercaptomethyl-1,8-dimercapto-3,6-dithiaoctane as a main component was obtained.

The degree of biomass of the polythiol compound is calculated on a carbon basis by the following expression according to the degree of biomass of the epichlorohydrin of 100%.

Degree of Biomass of Polythiol={(Number of Epichlorohydrin-Derived Carbon Atoms in Polythiol Molecules)×(Degree of Biomass (%) of Epichlorohydrin)}/{(Number of Carbon Atoms in Molecules of Polythiol)}=42.9%

Synthesis Example B3

Synthesis of 1,5-Pentamethylene Diisocyanate Modified Product (Polyisocyanate (a3))

In a four-neck flask equipped with a stirrer, a thermometer, a reflux pipe, and a nitrogen introduction pipe, 500 parts of the 1,5-pentamethylene diisocyanate obtained in Manufacturing Example B4 (hereinafter, also simply referred to as PDI), 1 part of isobutyl alcohol (hereinafter, also simply referred to as IBA), 0.3 parts of 2,6-di(tert-butyl)-4-methyl phenol (hereinafter, also simply referred to as BHT), and 0.3 parts of tris(tridecyl)phosphite (manufactured by JOHOKU CHEMICAL CO., LTD., Product Name: JP-333E) were mixed and were reacted at 80° C. for 2 hours. Next, 0.05 parts of N-(2-hydroxy propyl)-N,N,N-trimethyl ammonium-2-ethyl hexanoate (manufactured by Air Products and Chemicals, Inc., Product Name: DABCO®TMR) as a trimerization catalyst was added. After reacting for 50 minutes, 0.12 parts of o-toluene sulfone amide (hereinafter, also simply referred to as OTS) was added. The obtained reaction mixture passed through a thin film distillation device and was distilled at a vacuum degree of 0.09 KPa and a temperature of 150° C., to obtain 401 parts of unreacted pentamethylene diisocyanate. Further, 0.02 parts of o-toluene sulfone amide was added to 100 parts of the obtained composition, and thus, 100 parts of the polyisocyanate (a3) including the modified 1,5-pentamethylene diisocyanate was obtained. The amount of 1,5-pentamethylene diisocyanate-derived component configuring the modified product was 98 weight %.

In the polyisocyanate (a3), the concentration of unreacted 1,5-pentamethylene diisocyanate was less than 1 weight %, the concentration of mononuclear isocyanurate was 65 weight %, the number average molecular weight was 554.7, the concentration of the isocyanate group was 25%, the average number of functional groups was 3.3, and the degree of biomass was 71%.

Example B1

To 0.20 g of Zelec UN (Acidic Phosphoric Acid Ester: Registered Trademark, manufactured by Stepan Company) was added 2.54 g of viosorb 583 (Ultraviolet Absorber: Registered Trademark, manufactured by KYODO CHEMICAL CO., LTD.), 0.05 g of N-benzyl-2-methyl imidazole, and 77.3 g of 1,5-pentamethylene diisocyanate, and the resulted mixture was stirred and dissolved at room temperature for 15 minutes, to prepare a polyisocyanate. To the resultant was added 91.7 g of polythiol (the polythiol (b) compound F) containing 4,8-, 4,7-, and 5,7-dimercaptomethyl-1,11-dimercapto-3,6,9-trithiaundecane as a main component, and was stirred at room temperature for 90 minutes. The viscosity of the liquid monomer mixture was 33 mPa·s. The liquid monomer mixture was defoamed at room temperature for 30 minutes under reduced pressure, was filtered through a Teflon (Registered Trademark) filter of 1 µm, and then, was injected into a mold formed of a glass mold and tape (designed to have a center thickness of 1.2 mm) at room temperature (approximately 20° C.). The mold was placed into an oven and was gradually heated at 25° C. to 130° C. for 24 hours, and the polymerization was allowed to proceed. After the polymerization was completed, the mold was taken out from the oven, and released, to obtain a resin molding. The obtained resin molding became a lens having a colorless transparent appearance, and in the resin molding, the degree of biomass was 67%, the refractive index (ne) was 1.63, the Abbe number (ve) was 37, and the heat resistance was 77° C.

Degree of Biomass (%) of Resin=[{77.3(Part by Weight of PDI)/154.2(Molecular Weight of PDI)×7(Number of Carbon Atoms in One Molecule of PDI)×71(Degree of Biomass % of PDI)}+{91.7(Part by Weight of Polythiol(b) Compound F)/366.7(Molecular Weight of Polythiol(b)Compound F)×10(Number of Carbon Atoms in One Molecule of Polythiol(b)Compound F)×60(Degree of Biomass % of Polythiol (b)Compound F)}]/[{77.3(Part by Weight of PDI)/154.2(Molecular Weight of PDI)×7(Number of Carbon Atoms in One Molecule of PDI)}+{91.7(Part by Weight of Polythiol(b) Compound F)/366.7(Molecular Weight of Polythiol(b)Compound F)×10(Number of Carbon Atoms in One Molecule of Polythiol(b)Compound F)}]=67%

Comparative Example B1

To 0.20 g of Zelec UN (Acidic Phosphoric Acid Ester: Registered Trademark, manufactured by Stepan Company) was added 2.54 g of viosorb 583 (Ultraviolet Absorber: Registered Trademark, manufactured by KYODO CHEMICAL CO., LTD.), 0.05 g of N-benzyl-2-methyl imidazole, and 77.3 g of 1,5-pentamethylene diisocyanate, and was stirred and dissolved at room temperature for 15 minutes, to prepare a polyisocyanate solution. To the resultant was added 91.7 g of polythiol containing 4,8-, 4,7-, and 5,7-dimercaptomethyl-1,11-dimercapto-3,6,9-trithiaundecane as a main component, and was stirred at room temperature for 15 minutes. The viscosity of the liquid monomer mixture was 11 mPa·s. The liquid monomer mixture was defoamed at room temperature for 30 minutes under reduced pressure, was filtered through a Teflon (Registered Trademark) filter of 1 µm, and then, was injected into a mold formed of a glass mold and tape (designed to have a center thickness of 1.2 mm) at room temperature (approximately 20° C.). The mold was placed into an oven and was gradually heated at 25° C. to 130° C. for 24 hours, and the polymerization was allowed to proceed. After the polymerization was completed, the mold was taken out from the oven, and released, to obtain a resin molding. The resin molding having a degree of biomass of 67% and heat resistance of 77° C. was obtained, but it was found that clouding was observed on the appearance, and thus, a material functioning as an optical lens was not able to be obtained.

Example B2

The components were mixed by the same method as that in Example B1 except that the polythiol containing 4,8-, 4,7-, and 5,7-dimercaptomethyl-1,11-dimercapto-3,6,9-trithiaundecane as a main component, which is the polythiol used in Example B1, was changed to the 4-mercaptomethyl-1,8-dimercapto-3,6-dithiaoctane (the polythiol (b) compound G) obtained in Synthesis Example B2, and the added amount of each of the components was changed as shown in Table 2. The viscosity of the liquid monomer mixture was 32 mPa·s. After that, defoaming, injection into a mold, polymerization, and releasing were performed by the same method as that in Example B1, and thus, a resin molding was obtained. The obtained resin became a lens having a colorless transparent appearance, in the resin, the degree of biomass was 60%, the refractive index (ne) was 1.63, the Abbe number (ve) was 37, and the heat resistance was 71° C.

Degree of Biomass (%) of Resin=[{77.3(Part by Weight of PDI)/154.2(Molecular Weight of PDI)×7(Number of Carbon Atoms in One Molecule of PDI)×71(Degree of Biomass % of PDI)}+{86.9(Part by Weight of Polythiol(*b*) Compound G)/260.5(Molecular Weight of Polythiol(*b*)Compound G)×7(Number of Carbon Atoms in One Molecule of Polythiol(*b*)Compound G)×42.9(Degree of Biomass % Polythiol (*b*)Compound G)}]/[{77.3(Part by Weight of PDI)/154.2(Molecular Weight of PDI)×7(Number of Carbon Atoms in One Molecule of PDI)}+{86.9(Part by Weight of Polythiol(*b*) Compound G)/260.5(Molecular Weight of Polythiol(*b*)Compound G)×7(Number of Carbon Atoms in One Molecule of Polythiol(*b*)Compound G)}]=60%

Examples B3 and B4

The components were stirred at room temperature for 90 minutes by the same method as that in Example B1 except that bis(isocyanato methyl)-bicyclo[2.2.1] heptane (a mixture of 2,5-bis(isocyanato methyl)-bicyclo[2.2.1] heptane and 2,6-bis(isocyanato methyl)-bicyclo[2.2.1] heptane) was added as the polyisocyanate in addition to the 1,5-pentamethylene diisocyanate, polythiol containing 4,8-, 4,7-, and 5,7-dimercaptomethyl-1,11-dimercapto-3,6,9-trithiaundecane as a main component was used in Example B3 as the polythiol, 4-mercaptomethyl-1,8-dimercapto-3,6-dithiaoctane was used in Example B4 as the polythiol, and the added amount of each of the components was changed as shown in Table 2. The viscosity of the liquid monomer mixture is shown in Table 2. After that, defoaming, injection into a mold, polymerization, and releasing were performed by the same method as that in Example B1, and thus, resin molded bodies were obtained. Each of the obtained resin molded bodies became a lens having a colorless transparent appearance. The properties of the obtained resin molded bodies are shown in Table 2.

Examples B5 and B6

The components were stirred at room temperature for 90 minutes by the same method as that in Example B1 except that isophorone diisocyanate was added as the polyisocyanate in addition to the 1,5-pentamethylene diisocyanate, polythiol containing 4,8-, 4,7-, and 5,7-dimercaptomethyl-1,11-dimercapto-3,6,9-trithiaundecane as a main component was used in Example B5 as the polythiol, 4-mercaptomethyl-1,8-dimercapto-3,6-dithiaoctane was used in Example B6 as the polythiol, and the added amount of each of the components was changed as shown in Table 2. The viscosity of the liquid monomer mixture is shown in Table 2. After that, defoaming, injection into a mold, polymerization, and releasing were performed by the same method as that in Example B1, and thus, resin molded bodies were obtained. Each of the obtained resin molded bodies became a lens having a colorless transparent appearance. The properties of the obtained resin molded bodies are shown in Table 2.

Examples B7 and B8

The components were stirred at room temperature for 90 minutes by the same method as that in Example B1 except that m-xylylene diisocyanate (the aliphatic polyisocyanate (a2)) was added as the polyisocyanate in addition to the 1,5-pentamethylene diisocyanate, polythiol containing 4,8-, 4,7-, and 5,7-dimercaptomethyl-1,11-dimercapto-3,6,9-trithiaundecane as a main component was used in Example B7 as the polythiol, 4-mercaptomethyl-1,8-dimercapto-3,6-dithiaoctane was used in Example B8 as the polythiol, and the added amount of each of the components was changed as shown in Table 2. The viscosity of the liquid monomer mixture is shown in Table 2. After that, defoaming, injection into a mold, polymerization, and releasing were performed by the same method as that in Example B1, and thus, resin molded bodies were obtained. Each of the obtained resin molded bodies became a lens having a colorless transparent appearance. The properties of the obtained resin molded bodies are shown in Table 2.

Examples B9 and B10

The components were stirred at room temperature for 90 minutes by the same method as that in Example B1 except that a mixture of 2,4-tolylene diisocyanate and 2,6-tolylene diisocyanate was added as the polyisocyanate in addition to the 1,5-pentamethylene diisocyanate, polythiol containing 4,8-, 4,7-, and 5,7-dimercaptomethyl-1,11-dimercapto-3,6, 9-trithiaundecane as a main component was used in Example B9 as the polythiol, 4-mercaptomethyl-1,8-dimercapto-3,6-dithiaoctane was used in Example B10 as the polythiol, and the added amount of each of the components was changed as shown in Table 2. The viscosity of the liquid monomer mixture is shown in Table 2. After that, defoaming, injection into a mold, polymerization, and releasing were performed by the same method as that in Example B1, and thus, resin molded bodies were obtained. Each of the obtained resin molding became a lens having a colorless transparent appearance. The properties of the obtained resin molded bodies are shown in Table 2.

Example B11

To 0.21 g of Zelec UN (Acidic Phosphoric Acid Ester: Registered Trademark, manufactured by Stepan Company) was added 2.62 g of viosorb 583 (Ultraviolet Absorber: Registered Trademark, manufactured by KYODO CHEMICAL CO., LTD.), 0.05 g of dimethyl tin dichloride, 37.1 g of 1,5-pentamethylene diisocyanate, and 45.18 g of a mixture of 2,4-tolylene diisocyanate and 2,6-tolylene diisocyanate, and was stirred and dissolved at room temperature for 15 minutes, to prepare a polyisocyanate solution. To the resultant was added 91.7 g of polythiol (the polythiol (b) compound F) containing 4,8-, 4,7-, and 5,7-dimercaptomethyl-1,11-dimercapto-3,6,9-trithiaundecane as a main component, and was stirred at room temperature for 90 minutes. The viscosity of the liquid monomer mixture was 291 mPa·s. The liquid monomer mixture was defoamed at room temperature for 30 minutes under reduced pressure, was filtered through a Teflon (Registered Trademark) filter of 1 μm, and then, was injected into a mold formed of a glass mold and tape (designed to have a center thickness of 1.2 mm) at room temperature (approximately 20° C.). The mold was placed into an oven and was gradually heated at 25° C. to 130° C. for 24 hours, and the polymerization was allowed to proceed. After the polymerization was completed, the mold was taken out from the oven, and released, to obtain a resin molding. The obtained resin molding became a lens having a colorless transparent appearance, and in the resin molding, the degree of biomass was 41%, the refractive index (ne) was 1.67, the Abbe number (ve) was 32, and the heat resistance was 108° C.

Comparative Examples B2 to B10

The components were stirred for 15 minutes by the same method as that in Comparative Example B1 except that the kinds and the used amounts of the polyisocyanate, the polythiol, the catalyst, and the additive were changed as shown in Table 2. The viscosity of the liquid monomer mixture is shown in Table 2. After that, defoaming, injection into a mold, polymerization, and releasing were performed by the same method as that in Example B1, and thus, a resin molding was obtained. The properties of the obtained resin molding are shown in Table 2. It was found that clouding was observed on the appearance in the obtained resin molding, and thus, a material functioning as an optical lens was not able to be obtained.

Comparative Example B11

To 0.31 g of Zelec UN (Acidic Phosphoric Acid Ester: Registered Trademark, manufactured by Stepan Company) was added 3.9 g of viosorb 583 (Ultraviolet Absorber: Registered Trademark, manufactured by KYODO CHEMICAL CO., LTD.), 0.08 g of N-benzyl-2-methyl imidazole, and 167.8 g of the polyisocyanate (a3) including a modified 1,5-pentamethylene diisocyanate, to obtain a polyisocyanate solution. The concentration of mononuclear isocyanurate of the polyisocyanate solution was 65%. To the resultant was added 91.7 g of polythiol (the compound F, the polythiol (b)) containing 4,8-, 4,7-, and 5,7-dimercaptomethyl-1,11-dimercapto-3,6,9-trithiaundecane as a main component, which was obtained in Synthesis Example B2, and was stirred and mixed at room temperature, to obtain a homogeneous solution of a monomer mixture. The viscosity of the homogeneous solution was 1185 mPa·s. The homogeneous solution was deformed at room temperature for 30 minutes under reduced pressure, and was attempted to be subjected to filtration, but the viscosity was high and the filtration was not easily performed, and thus, the solution was injected into the mold in this state, and the same polymerization as that in Example B was performed. After the polymerization was completed, releasing was performed from the mold, and then, annealing was further performed at 120° C. for 2 hours, and thus, resin molded bodies were obtained. However, remarkable distortion or air bubbles were observed in the obtained resin molded bodies, and the properties were not able to be evaluated.

TABLE 2

| | Polyisocyanate | | | | | | Polythiol | |
|---|---|---|---|---|---|---|---|---|
| | Aliphatic Polyisocyanate (a1) g/NCO Mol | Aliphatic Polyisocyanate (a2) g/NCO Mol | Aliphatic Polyisocyanate (a3) g/NCO Mol | Concentration of mononuclear (wt %) | Other Polyisocyanate g/NCO Mol | Total NCO Mol | Polythiol (b) g/SH Mol | Total SH Mol |
| Example B1 | 77.3/1.00 | | | 0 | | 1.00 | Compound F 91.7/1.00 | 1.00 |
| Example B2 | 77.3/1.00 | | | 0 | | 1.00 | Compound G 86.9/1.00 | 1.00 |
| Example B3 | 51.8/0.67 | | | 0 | Compound A 36.7/0.33 | 1.00 | Compound F 91.7/1.00 | 1.00 |
| Example B4 | 51.8/0.67 | | | 0 | Compound A 36.7/0.33 | 1.00 | Compound G 86.9/1.00 | 1.00 |
| Example B5 | 51.8/0.67 | | | 0 | Compound B 34.0/0.33 | 1.00 | Compound F 91.7/1.00 | 1.00 |
| Example B6 | 51.8/0.67 | | | 0 | Compound B 34.0/0.33 | 1.00 | Compound G 86.9/1.00 | 1.00 |
| Example B7 | 51.8/0.67 | Compound C 31.1/0.33 | | 0 | | 1.00 | Compound F 91.7/1.00 | 1.00 |
| Example B8 | 51.8/0.67 | Compound C 31.1/0.33 | | 0 | | 1.00 | Compound G 86.9/1.00 | 1.00 |
| Example B9 | 51.8/0.67 | | | 0 | Compound D 28.8/0.33 | 1.00 | Compound F 91.7/1.00 | 1.00 |
| Example B10 | 51.8/0.67 | | | 0 | Compound D 28.8/0.33 | 1.00 | Compound G 86.9/1.00 | 1.00 |
| Example B11 | 37.1/0.48 | | | 0 | Compound D 45.18/0.52 | 1.00 | Compound F 91.7/1.00 | 1.00 |
| Comparative Example B1 | 77.3/1.00 | | | 0 | | 1.00 | Compound F 91.7/1.00 | 1.00 |
| Comparative Example B2 | 77.3/1.00 | | | 0 | | 1.00 | Compound G 86.9/1.00 | 1.00 |
| Comparative Example B3 | 51.8/0.67 | | | 0 | Compound A 36.7/0.33 | 1.00 | Compound F 91.7/1.00 | 1.00 |
| Comparative Example B4 | 51.8/0.67 | | | 0 | Compound A 36.7/0.33 | 1.00 | Compound G 86.9/1.00 | 1.00 |

TABLE 2-continued

| | | | | | | | | |
|---|---|---|---|---|---|---|---|---|
| Comparative Example B5 | 51.8/0.67 | | | 0 | Compound B 34.0/0.33 | 1.00 | Compound F 91.7/1.00 | 1.00 |
| Comparative Example B6 | 51.8/0.67 | | | 0 | Compound B 34.0/0.33 | 1.00 | Compound G 86.9/1.00 | 1.00 |
| Comparative Example B7 | 51.8/0.67 | Compound C 31.1/0.33 | | 0 | | 1.00 | Compound F 91.7/1.00 | 1.00 |
| Comparative Example B8 | 51.8/0.67 | Compound C 31.1/0.33 | | 0 | | 1.00 | Compound G 86.9/1.00 | 1.00 |
| Comparative Example B9 | 51.8/0.67 | | | 0 | Compound D 28.8/0.33 | 1.00 | Compound F 91.7/1.00 | 1.00 |
| Comparative Example B10 | 51.8/0.67 | | | 0 | Compound D 28.8/0.33 | 1.00 | Compound G 86.9/1.00 | 1.00 |
| Comparative Example B11 | | | 167.8/1.00 | 65 | | 1.00 | Compound F 91.7/1.00 | 1.00 |

| | Catalyst (g) | Additive | | Viscosity of Liquid monomer mixture (mPa·s) | Degree of Biomass (%) | Lens Properties | | |
|---|---|---|---|---|---|---|---|---|
| | | Zelec UN (g) | Ultraviolet Absorber (g) | | | Heat Resistance Tg (° C.) | Refractive Index | Abbe Number |
| Example B1 | 0.05 | 0.20 | 2.54 | 33 | 67 | 77 | 1.63 | 37 |
| Example B2 | 0.05 | 0.20 | 2.46 | 32 | 60 | 71 | 1.63 | 37 |
| Example B3 | 0.05 | 0.22 | 2.70 | 56 | 47 | 90 | 1.62 | 37 |
| Example B4 | 0.05 | 0.21 | 2.63 | 52 | 40 | 80 | 1.62 | 37 |
| Example B5 | 0.05 | 0.21 | 2.66 | 48 | 48 | 89 | 1.63 | 36 |
| Example B6 | 0.05 | 0.21 | 2.59 | 38 | 41 | 78 | 1.62 | 37 |
| Example B7 | 0.05 | 0.21 | 2.62 | 52 | 49 | 86 | 1.64 | 33 |
| Example B8 | 0.05 | 0.20 | 2.55 | 50 | 42 | 72 | 1.64 | 33 |
| Example B9 | 0.05 | 0.21 | 2.58 | 283 | 50 | 110 | 1.65 | 32 |
| Example B10 | 0.05 | 0.20 | 2.51 | 240 | 43 | 97 | 1.65 | 32 |
| Example B11 | 0.05 | 0.21 | 2.62 | 291 | 41 | 108 | 1.67 | 32 |
| Comparative Example B1 | 0.05 | 0.20 | 2.54 | 11 | 67 | 77 | Clouding Occurs in Lens | |
| Comparative Example B2 | 0.05 | 0.20 | 2.46 | 10 | 60 | 71 | Clouding Occurs in Lens | |
| Comparative Example B3 | 0.05 | 0.22 | 2.70 | 16 | 47 | 90 | Clouding Occurs in Lens | |
| Comparative Example B4 | 0.05 | 0.21 | 2.63 | 15 | 40 | 80 | Clouding Occurs in Lens | |
| Comparative Example B5 | 0.05 | 0.21 | 2.66 | 15 | 48 | 89 | Clouding Occurs in Lens | |
| Comparative Example B6 | 0.05 | 0.21 | 2.59 | 12 | 41 | 78 | Clouding Occurs in Lens | |
| Comparative Example B7 | 0.05 | 0.21 | 2.62 | 13 | 49 | 86 | Clouding Occurs in Lens | |
| Comparative Example B8 | 0.05 | 0.20 | 2.55 | 10 | 42 | 72 | Clouding Occurs in Lens | |
| Comparative Example B9 | 0.05 | 0.21 | 2.58 | 14 | 50 | 110 | Clouding Occurs in Lens | |
| Comparative Example B10 | 0.05 | 0.20 | 2.51 | 12 | 43 | 97 | Clouding Occurs in Lens | |

TABLE 2-continued

| | | | | | |
|---|---|---|---|---|---|
| Comparative Example B11 | 0.08 | 0.31 | 3.9 | 1185 | Distortion and Air Bubbles Occur Molding Properties of Lens are Poor |

The compounds shown in Table 2 are as follows.

Compound A: Mixture of 2,5-Bis(Isocyanato Methyl)-Bicyclo[2.2.1] Heptane and 2,6-Bis(Isocyanato Methyl)-Bicyclo[2.2.1] Heptane Compound B: Isophorone Diisocyanate Compound C: m-Xylylene Diisocyanate Compound D: Mixture of 2,4- and 2,6-Tolylene Diisocyanate Compound F: 4,8-, 4,7-, or 5,7-Dimercaptomethyl-1,11-Dimercapto-3,6,9-Trithiaundecane Compound G: 4-Mercaptomethyl-1,8-Dimercapto-3,6-Dithiaoctane The present application claims priority on the basis of Japanese Patent Application No. 2014-21774, filed on Feb. 6, 2014 and Japanese Patent Application No. 2014-21775, filed on Feb. 6, 2014, and the entire disclosure thereof is incorporated herein.

The present invention includes the following aspects.

[A1] A polymerizable composition for an optical material, containing: polyisocyanate (a) including aliphatic polyisocyanate (a1) and a modified aliphatic polyisocyanate (a2), and polythiol (b) having a di- or higher functional thiol group, in which the modified aliphatic polyisocyanate (a2) is contained in the polyisocyanate (a) in the amount of 0 weight % to 60 weight %.

[A2] The polymerizable composition for an optical material according to [A1], in which the modified aliphatic polyisocyanate (a2) is a mononuclear isocyanurate of the aliphatic polyisocyanate.

[A3] The polymerizable composition for an optical material according to [A1] or [A2], in which the aliphatic polyisocyanate (a1) and/or the aliphatic polyisocyanate in the modified aliphatic polyisocyanate (a2) is obtained from a plant-derived material.

[A4] The polymerizable composition for an optical material according to any one of [A1] to [A3], in which the aliphatic polyisocyanate (a1) and/or the aliphatic polyisocyanate in the modified aliphatic polyisocyanate (a2) is at least one selected from 1,5-pentamethylene diisocyanate, 1,6-hexamethylene diisocyanate, 1,7-heptamethylene diisocyanate, lysine diisocyanate, lysine triisocyanate, dimer acid diisocyanate, octamethylene diisocyanate, and decamethylene diisocyanate.

[A5] The polymerizable composition for an optical material according to any one of [A1] to [A4], in which the polythiol (b) is at least one selected from 4-mercaptomethyl-1,8-dimercapto-3,6-dithiaoctane, 4,8-, 4,7-, or 5,7-dimercaptomethyl-1,11-dimercapto-3,6,9-trithiaundecane, pentaerythritol tetrakis(2-mercaptoacetate), pentaerythritol tetrakis(3-mercaptopropionate), 2,5-bis(mercaptomethyl)-1,4-dithiane, bis(mercaptoethyl)sulfide, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithietane, 1,1,2,2-tetrakis(mercaptomethylthio)ethane, 3-mercaptomethyl-1,5-dimercapto-2,4-dithiapentane, tris(mercaptomethylthio)methane, and ethylene glycol bis(3-mercaptopropionate).

[A6] The polymerizable composition for an optical material according to any one of [A1] to [A5], in which the polythiol (b) is polythiol obtained from a plant-derived material, and is at least one selected from 4-mercaptomethyl-1,8-dimercapto-3,6-dithiaoctane, and 4,8-, 4,7-, or 5,7-dimercaptomethyl-1,11-dimercapto-3,6,9-trithiaundecane.

[A7] The polymerizable composition for an optical material according to any one of [A1] to [A6], further containing: a non-metal catalyst.

[A8] A molding, containing: a resin obtained by polymerizing and curing the polymerizable composition for an optical material according to any one of [A1] to [A7].

[A9] The molding according to [A8], in which a degree of biomass of the resin is greater than or equal to 25%.

[A10] The molding according to [A8] or [A9], in which Tg is higher than or equal to 60° C.

[A11] An optical material formed of the molding according to any one of [A8] to [A10].

[A12] A plastic spectacle lens formed of the molding according to any one of [A8] to [A10].

[A13] A plastic polarization lens, in which a layer formed of the molding according to any one of [A8] to [A10] is laminated on at least one surface of a polarizing film.

[A14] A manufacturing method of a plastic spectacle lens, including: a step of injecting the polymerizable composition for an optical material according to any one of [A1] to [A7] into a lens casting mold; and a step of polymerizing and curing the polymerizable composition for an optical material.

[A15] A manufacturing method of a plastic polarization lens, including: a step of fixing a polarizing film into a lens casting mold in a state in which at least one surface of the polarizing film is separated from a mold; a step of injecting the polymerizable composition for an optical material according to any one of [A1] to [A7] into a gap between the polarizing film and the mold; and a step of laminating a layer formed of a polythiourethane resin on at least one surface of the polarizing film by polymerizing and curing the polymerizable composition for an optical material.

[B1] A manufacturing method of an optical material, including: a step of obtaining a polymerizable composition for an optical material by mixing at least one aliphatic polyisocyanate (a) and at least one polythiol (b) having a di- or higher functional thiol group; a step of injecting the polymerizable composition for an optical material which has viscosity at 20° C. of 20 mPa·s to 1000 mPa·s into a mold; and a step of polymerizing and curing the polymerizable composition for an optical material in the mold.

[B2] The manufacturing method of an optical material according to [B1], in which the aliphatic polyisocyanate (a) includes aliphatic polyisocyanate obtained from a plant-derived material.

[B3] The manufacturing method of an optical material according to [B1] or [B2], in which the aliphatic polyisocyanate (a) is at least one selected from 1,5-pentamethylene diisocyanate, 1,6-hexamethylene diisocyanate, 1,7-heptamethylene diisocyanate, lysine diisocyanate, lysine triisocyanate, dimer acid diisocyanate, octamethylene diisocyanate, and decamethylene diisocyanate.

[B4] The manufacturing method of an optical material according to any one of [B1] to [B3], in which in the step of obtaining the polymerizable composition for an optical material, a step of mixing at least one selected from aliphatic polyisocyanate, aromatic polyisocyanate, and heterocyclic polyisocyanate is further included.

[B5] The manufacturing method of an optical material according to any one of [B1] to [B4], in which the polythiol (b) is at least one selected from 4-mercaptomethyl-1,8-dimercapto-3,6-dithiaoctane, 4,8-, 4,7-, or 5,7-dimercaptomethyl-1,11-dimercapto-3,6,9-trithiaundecane, pentaerythritol tetrakis(2-mercaptoacetate), pentaerythritol tetrakis(3-mercaptopropionate), 2,5-bis(mercaptomethyl)-1,4-dithiane, bis(mercaptoethyl)sulfide, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithietane, 1,1,2,2-tetrakis(mercaptomethylthio)ethane, 3-mercaptomethyl-1,5-dimercapto-2,4-dithiapentane, tris(mercaptomethylthio)methane, and ethylene glycol bis(3-mercaptopropionate).

[B6] The manufacturing method of an optical material according to any one of [B1] to [B5], in which the polythiol (b) is polythiol obtained from a plant-derived material, and is selected from 4-mercaptomethyl-1,8-dimercapto-3,6-dithiaoctane, and 4,8-, 4,7-, or 5,7-dimercaptomethyl-1,11-dimercapto-3,6,9-trithiaundecane.

[B7] The manufacturing method of an optical material according to any one of [B1] to [B6], in which in the step of obtaining the polymerizable composition for an optical material, a step of mixing a non-metal catalyst is further included.

[B8] An optical material formed of a polythiourethane resin which is obtained by the manufacturing method of an optical material according to any one of [B1] to [B7].

[B9] The optical material according to [B8], in which a degree of biomass of the polythiourethane resin is greater than or equal to 25%.

[B10] The optical material according to [B8] or [B9], in which Tg is higher than or equal to 60° C.

[B11] A plastic spectacle lens formed of the optical material according to any one of [B8] to [B10].

[B12] A plastic polarization lens formed by laminating the optical material according to any one of [B8] to [B10] on at least one surface of a polarizing film as a substrate layer.

[B13] A manufacturing method of a plastic spectacle lens, including the steps of the manufacturing method of an optical material according to any one of [B1] to [B7].

[B14] A manufacturing method of a plastic polarization lens, including: a step of fixing a polarizing film into a lens casting mold in a state in which at least one surface of the polarizing film is separated from a mold; a step of obtaining a polymerizable composition for an optical material by mixing at least one aliphatic polyisocyanate (a) and at least one polythiol (b) having a di- or higher functional thiol group; a step of injecting the polymerizable composition for an optical material which has viscosity at 20° C. of 20 mPa·s to 1000 mPa·s into a gap between the polarizing film and the mold; and a step of laminating a layer formed of a polythiourethane resin on at least one surface of the polarizing film by polymerizing and curing the polymerizable composition for an optical material.

The invention claimed is:

1. A polymerizable composition for an optical material, containing:
    polyisocyanate (a) including aliphatic polyisocyanate (a1) and a modified aliphatic polyisocyanate (a2); and
    polythiol (b) having a di- or higher functional thiol group,
    wherein the modified aliphatic polyisocyanate (a2) is contained in the polyisocyanate (a) in the amount of more than or equal to 1 weight % and less than or equal to 60 weight %,
    the aliphatic polyisocyanate (a1) and/or the aliphatic polyisocyanate in the modified aliphatic polyisocyanate (a2) is at least one selected from 1,5-pentamethylene diisocyanate, 1,6-hexamethylene diisocyanate, 1,7-heptamethylene diisocyanate, lysine diisocyanate, lysine triisocyanate, dimer acid diisocyanate, octamethylene diisocyanate, and decamethylene diisocyanate,
    the modified aliphatic polyisocyanate (a2) is a mononuclear isocyanurate of the aliphatic polyisocyanate, and
    the polythiol (b) is polythiol obtained from a plant-derived material, and is at least one selected from 4-mercaptomethyl-1,8-dimercapto-3,6-dithiaoctane, and 4,8-, 4,7-, or 5,7-dimercaptomethyl-1,11-dimercapto-3,6,9-trithiaundecane.

2. The polymerizable composition for an optical material according to claim 1,
    wherein the aliphatic polyisocyanate (a1) and/or the aliphatic polyisocyanate in the modified aliphatic polyisocyanate (a2) is obtained from a plant-derived material.

3. The polymerizable composition for an optical material according to claim 1, further containing:
    a non-metal catalyst.

4. A molding, containing:
    a resin obtained by polymerizing and curing the polymerizable composition for an optical material according to claim 1.

5. The molding according to claim 4,
    wherein the resin has a degree of biomass of greater than or equal to 25%.

6. The molding according to claim 4,
    wherein the molding has a Tg of higher than or equal to 60° C.

7. An optical material formed of the molding according to claim 4.

8. A plastic spectacle lens formed of the molding according to claim 4.

9. A plastic polarization lens, comprising:
    a polarizing film; and
    a layer formed of the molding according to claim 4, wherein the layer is laminated on at least one surface of the polarizing film.

10. A method for manufacturing a plastic spectacle lens, comprising:
    a step of injecting the polymerizable composition for an optical material according to claim 1 which has viscosity at 20° C. of 20 mPa·s to 1000 mPa·s into a lens casting mold; and
    a step of polymerizing and curing the polymerizable composition for an optical material.

11. The method for manufacturing a plastic spectacle lens according to claim 10,
    wherein in the step of injecting the polymerizable composition for an optical material, the viscosity of the polymerizable composition for an optical material at 20° C. is 20 mPa·s to 800 mPa·s.

12. A method for manufacturing a plastic polarization lens, comprising:
    a step of fixing a polarizing film into a lens casting mold in a state in which at least one surface of the polarizing film is separated from a mold;
    a step of injecting the polymerizable composition for an optical material according to claim 1 which has viscosity at 20° C. of 20 mPa·s to 1000 mPa·s into a gap between the polarizing film and the mold; and
    a step of laminating a layer formed of a polythiourethane resin on at least one surface of the polarizing film by polymerizing and curing the polymerizable composition for an optical material.

13. The method for manufacturing a plastic polarization lens according to claim 12,
    wherein in the step of injecting the polymerizable composition for an optical material, the viscosity of the polymerizable composition for an optical material at 20° C. is 20 mPa·s to 800 mPa·s.

* * * * *